(12) United States Patent
Chuai et al.

(10) Patent No.: US 12,452,699 B2
(45) Date of Patent: Oct. 21, 2025

(54) NETWORK PARAMETER CONFIGURATION METHOD AND APPARATUS

(71) Applicant: HUAWEI TECHNOLOGIES CO., LTD., Guangdong (CN)

(72) Inventors: Jie Chuai, Hong Kong (CN); Zhitang Chen, Hong Kong (CN); Min Cheng, Hong Kong (CN); Wenlong Lv, Shenzhen (CN); Chongming Zhu, Shanghai (CN); Zhijie Xu, Shanghai (CN); Feiyi Shen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 544 days.

(21) Appl. No.: 17/752,851

(22) Filed: May 25, 2022

(65) Prior Publication Data

US 2022/0295311 A1 Sep. 15, 2022

Related U.S. Application Data

(63) Continuation of application No. PCT/CN2020/126645, filed on Nov. 5, 2020.

(30) Foreign Application Priority Data

Nov. 25, 2019 (CN) .......................... 201911180245.6

(51) Int. Cl.
*H04W 24/02* (2009.01)
*H04L 41/0823* (2022.01)
*H04L 41/085* (2022.01)

(52) U.S. Cl.
CPC ......... *H04W 24/02* (2013.01); *H04L 41/0823* (2013.01); *H04L 41/085* (2013.01)

(58) Field of Classification Search
CPC ... H04W 24/02; H04L 41/0823; H04L 41/085
See application file for complete search history.

(56) References Cited

U.S. PATENT DOCUMENTS

| 9,602,345 B2 | 3/2017 | Saha et al. |
| 10,305,758 B1 * | 5/2019 | Bhide ................... G06F 11/328 |

(Continued)

FOREIGN PATENT DOCUMENTS

| CN | 105813017 A | 7/2016 |
| CN | 108174413 A | 6/2018 |

(Continued)

OTHER PUBLICATIONS

Colahs blog, Understanding LSTM Networks, https://colah.github.io/posts/2015-08-Understanding-LSTMs/, Posted on Aug. 27, 2015, 6 pages.

(Continued)

*Primary Examiner* — Qun Shen

(57) ABSTRACT

A network parameter configuration method includes obtaining operational state information of a network device. The operational state information includes a state information set of each of N areas covered by the network device, and the state information set includes state information subsets in D dimensions. Negotiations are performed based on the state information subsets in the D dimensions of each of the N areas to obtain target parameter subsets in the D dimensions of each of the N areas. A configuration instruction is sent to the network device covering the N areas to instruct the network device to perform parameter configuration based on a target parameter set of each of the N areas that is carried in the configuration instruction. The method can improve network parameter configuration efficiency.

20 Claims, 25 Drawing Sheets

(56) References Cited

U.S. PATENT DOCUMENTS

| | | | |
|---|---|---|---|
| 2013/0122885 A1 | 5/2013 | Kojima | |
| 2013/0235738 A1* | 9/2013 | Siomina | H04W 72/1263 |
| | | | 370/252 |
| 2014/0241296 A1* | 8/2014 | Shattil | H04L 27/2646 |
| | | | 370/329 |
| 2015/0195136 A1 | 7/2015 | Mermoud et al. | |
| 2015/0379428 A1* | 12/2015 | Dirac | G06N 20/00 |
| | | | 706/12 |
| 2016/0050116 A1 | 2/2016 | Sheshadri et al. | |
| 2016/0162783 A1* | 6/2016 | Tan | H04W 24/02 |
| | | | 706/13 |
| 2017/0181027 A1* | 6/2017 | Raleigh | H04W 24/02 |
| 2019/0141580 A1 | 5/2019 | Oktay et al. | |
| 2020/0220591 A1* | 7/2020 | Zhang | H04B 7/046 |
| 2021/0409991 A1* | 12/2021 | Park | H04L 5/0057 |

FOREIGN PATENT DOCUMENTS

| | | | | |
|---|---|---|---|---|
| CN | 108306699 A | 7/2018 | | |
| CN | 109905287 A | 6/2019 | | |
| CN | 110139289 A | 8/2019 | | |
| WO | WO-2016004075 A1 * | 1/2016 | | G06F 9/5066 |
| WO | WO-2019197715 A1 * | 10/2019 | | G06N 3/0454 |

OTHER PUBLICATIONS

Jay Alammar, The Illustrated Transformer, https://jalammar.github.io/illustrated-transformer/, 2018, 15 pages.

* cited by examiner

NETWORK PARAMETER CONFIGURATION METHOD AND APPARATUS

CROSS-REFERENCE TO RELATED APPLICATIONS

This application is a continuation of International Application No. PCT/CN2020/126645, filed on Nov. 5, 2020, which claims priority to Chinese Patent Application No. 201911180245.6, filed on Nov. 25, 2019. The disclosures of the aforementioned applications are hereby incorporated by reference in their entireties.

TECHNICAL FIELD

The present disclosure relates to the field of wireless communication, and in particular, to a network parameter configuration method and apparatus.

BACKGROUND

With development of wireless communications technologies, mobile communication is increasingly popular in people's lives and has become an indispensable part of people's lives. A wireless cellular network is a core part of a mobile communications infrastructure. A mobile operator provides mobile data and call services for users by constructing a wireless cellular network. The wireless cellular network includes a large quantity of radio base stations. Signals transmitted by each base station cover a specific area around the base station, and a user in the area can communicate with the base station by using a mobile terminal (for example, a mobile phone) to obtain a data service (for example, access the Internet) or a call service. When the user moves between different areas, the user may be handed over to different base stations to obtain uninterrupted mobile communications services.

An area covered by each radio base station may be divided into different radio cells based on different geographical locations or different signal frequency bands, and different radio cells may be considered as independent network control units.

Multitudinous parameters need to be configured for each radio cell. These parameters determine many features of the cell, such as a coverage area, a communications mode with a user terminal, and handover control between cells. Therefore, these parameters have great impact on quality of service of the radio cell. Therefore, the mobile operator needs to continuously optimize parameters of radio cells to ensure good user experience and meet requirements of a majority of users. Therefore, parameter optimization of the radio cells is critical for the mobile operator.

However, a quantity of parameters that need to be adjusted for a radio cell is relatively large, and parameters configured for neighboring cells affect each other. This increases difficulty in parameter configuration. In addition, complexity of a networking structure of the wireless cellular network further increases the difficulty in parameter configuration.

SUMMARY

Embodiments of the present disclosure provide a network parameter configuration method and apparatus. The disclosed embodiments help reduce difficulty in network parameter configuration and improve network parameter configuration efficiency.

According to a first aspect, an embodiment provides a network configuration method, including:
  obtaining operational state information of a network device, where the operational state information includes a state information set of each of N areas covered by the network device, the state information set includes state information subsets in D dimensions, and both N and D are integers greater than 0; performing negotiations based on the state information subsets in the D dimensions of each of the N areas to obtain target parameter subsets in the D dimensions of each of the N areas; and sending a configuration instruction to the network device covering the N areas, to instruct the network device to perform parameter configuration based on a target parameter set of each of the N areas that is carried in the configuration instruction, where the target parameter set of each area is obtained based on the target parameter subsets in the D dimensions of each area.

It should be noted herein that the D dimensions may be at least one of a local area dimension, a horizontal dimension, and a vertical dimension.

It can be learned that, when parameters of areas are determined, impact between neighboring areas is considered. Therefore, accuracy of configuration parameters obtained through negotiation is improved, and adaptive adjustment of network configuration parameters is implemented. This overcomes a problem that a quantity of network configuration parameters is relatively large, reduces difficulty in network parameter configuration, and improves network parameter configuration efficiency.

In a negotiation process, the neighboring areas are divided based on dimensions, so that accuracy of negotiated parameters is further improved.

In a feasible embodiment, the performing negotiations based on the state information subsets in the D dimensions of each of the N areas to obtain target parameter subsets in the D dimensions of each of the N areas includes:
  performing T rounds of negotiations based on the state information subsets in the D dimensions of each of the N areas to obtain T reference parameter sets and T performance indicator expected value sets, where the T reference parameter sets are in a one-to-one correspondence with the T performance indicator expected value sets, the T reference parameter sets include reference parameter subsets in the D dimensions of each of the N areas, the T performance indicator expected value sets include performance indicator expected value subsets in the D dimensions of each of the N areas, and T is an integer greater than 0; and
  determining the target parameter set from the T reference parameter sets based on the T performance indicator expected value sets, where the target parameter set includes the target parameter subsets in the D dimensions of each of the N areas.

In a feasible embodiment, operational state information of the N areas includes neighboring area information in the D dimensions of the N areas, and the performing T rounds of negotiations based on the state information subsets in the D dimensions of each of the N areas to obtain T reference parameter sets and T performance indicator expected value sets includes:
  when performing a $k^{th}$ round of negotiations, initializing a parameter set of each of the N areas to obtain an initial parameter set of each area, where the initial parameter set of each area includes parameter subsets in the D dimensions of the area;

obtaining a neighboring area in each of the D dimensions of each of the N areas based on the neighboring area information in the D dimensions of the N areas, where k=1, 2, . . . , T; and performing W inter-group negotiations based on the state information subsets in the D dimensions and initial parameter subsets in the D dimensions of each of the N areas and neighboring areas thereof in the D dimensions to obtain a $k^{th}$ one of the T reference parameter sets and a $k^{th}$ one of the T performance indicator expected value sets, where W is an integer greater than 0.

In an embodiment, the performing W inter-group negotiations based on the state information subsets in the D dimensions and initial parameter subsets in the D dimensions of each of the N areas and neighboring areas thereof in the D dimensions to obtain a $k^{th}$ one of the T reference parameter sets and a $k^{th}$ one of the T performance indicator expected value sets includes:

S1: when performing a $g^{th}$ inter-group negotiation, marking each of the N areas as a non-negotiated area in the D dimensions, where g=1, 2, . . . , W;

S2: selecting, from non-negotiated areas, an area j marked as a non-negotiated area in any dimension A, performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A, marking the area j as a negotiated area in the dimension A, and marking an area that is marked as a non-negotiated area in the dimension A among neighboring areas of the area j in the dimension A, as a negotiated area in the dimension A, where the dimension A is any one of the D dimensions, and when g is equal to 1, the first parameter subset in the dimension A of the area j is an initial parameter subset in the dimension A of the area j, and among the neighboring areas of the area j in the dimension A, a first parameter subset in the dimension A of a non-negotiated area is an initial parameter subset in the dimension A of the area, and a first parameter subset in the dimension A of a negotiated area is obtained based on an initial parameter subset in the dimension A of the negotiated area; or when g is greater than 1, the first parameter subset in the dimension A of the area j is a second parameter subset in the dimension A of the area j after a $(g-1)^{th}$ inter-group negotiation is performed, and among the neighboring areas of the area j in the dimension A, a first parameter subset in the dimension A of a non-negotiated area is a second parameter subset in the dimension A of the area, and a first parameter subset in the dimension A of a negotiated area is obtained based on a second parameter subset of the area that is obtained after the $(g-1)^{th}$ inter-group negotiation is performed; and S3: repeating step S2 until each of the N areas is marked as a negotiated area in the D dimensions, where the $k^{th}$ one of the T reference parameter sets includes a reference parameter subset in each of the D dimensions of the area j, and the $k^{th}$ one of the T performance indicator expected value sets includes performance indicator expected value subsets in the D dimensions, obtained based on reference parameter subsets in the D dimensions of the area j and neighboring areas thereof in the D dimensions and state information subsets in the D dimensions of the area j and the neighboring areas thereof in the D dimensions; and reference parameter subsets in the dimension A of the area j and the neighboring area thereof in the dimension A are respectively second parameter subsets in the dimension A of the area j and the neighboring area thereof in the dimension A after a $W^{th}$ inter-group negotiation is performed.

Further, if an intersection set exists between a parameter subset in the dimension A and a parameter subset in another one of the D dimensions, when g=1, a value of a parameter P in a first parameter subset in the dimension A of a non-negotiated area in the dimension A is a value of the parameter P in a second parameter subset in a dimension B, and a value of a parameter other than the parameter P in the first parameter subset in the dimension A is a value in an initial parameter subset in the dimension A, where the dimension B is a dimension negotiated before the dimension A, and the parameter P is any parameter in the intersection set between the parameter subset in the dimension A and the parameter subset in the dimension B.

In a further embodiment, the performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A includes:

performing a $q^{th}$ intra-group negotiation, and obtaining a third parameter subset $a_{Aqj}$ in the dimension A from a preconfigured parameter set based on a search algorithm, so that a preset performance indicator expected value of the area j is maximized, where the preset performance indicator expected value of the area j is obtained based on a performance indicator expected value subset in the dimension A of the area j, and the performance indicator expected value subset in the dimension A of the area j is obtained based on the state information subset in the dimension A and the third parameter subset $a_{Aqj}$ in the dimension A of the area j, the state information subset in the dimension A and a third parameter subset in the dimension A of the neighboring area of the area j in the dimension A, and a parameter configuration model of the area j;

obtaining, based on the search algorithm, a third configuration parameter $a_{Aqj}$ in the dimension A from the preconfigured parameter set, so that a preset performance indicator expected value of an area n is maximized, where the preset performance indicator expected value of the area n is obtained based on a performance indicator expected value in the dimension A of the area n, and the performance indicator expected value in the dimension A of the area n is obtained based on a state information subset in the dimension A and a third parameter subset $a_{Aqn}$ in the dimension A of the area n, a state information subset in the dimension A and a third parameter subset in the dimension A of a neighboring area of the area n in the dimension A, and a parameter configuration model of the area n, where the area n is any one of the neighboring areas of the area j in the dimension A, and the third parameter subset in the dimension A of the neighboring area of the area n in the dimension A includes the third parameter subset $a_{Aqj}$ in the dimension A of the area j; and when q=1, a third parameter subset $a_{A(q-1)n}$ in the dimension A of the area n is a first parameter subset in the dimension A of the area n; or when q=S, the second parameter subset in the dimension A of the area j is the third parameter subset $a_{Aqj}$ in the dimension A of the area j, and a second parameter subset in the dimension A of the area n is the third parameter subset $a_{Aqn}$ in the dimension A of the area n.

Optionally, a preset performance indicator expected value of an area V is:
  obtained based on a performance indicator expected value subset in the dimension A of the area V; or obtained based on a performance indicator expected value subset in the dimension A of the area V and a performance indicator expected value subset in the dimension A of a neighboring area of the area V in the dimension A; or obtained based on performance indicator expected value subsets in the D dimensions of the area V; or obtained based on performance indicator expected value subsets in the D dimensions of the area V and performance indicator expected value subsets in the D dimensions of neighboring areas of the area V.

In a further embodiment, the determining the target parameter set from the T reference parameter sets based on the T performance indicator expected value sets includes:
  separately calculating a performance value of each of the T reference parameter sets based on the T performance indicator expected value sets, where the performance value of each reference parameter set is a sum or a weighted sum of performance indicator expected value subsets in the D dimensions in a performance indicator expected value set corresponding to the reference parameter set; and
  determining, from the T reference parameter sets, a reference parameter set with a largest performance value as the target parameter set.

In another embodiment, if D=1, the D dimensions include only a dimension C, and the dimension C is a horizontal dimension or a vertical dimension; and a parameter configuration model of any area V of the N areas includes a neighboring area information encoding model in the dimension C and a performance prediction model in the dimension C, parameter sets of the area V and a neighboring area thereof include parameter subsets in the dimension C, and state information sets of the area V and the neighboring area thereof include state information subsets in the dimension C;
  input data of the neighboring area information encoding model of the area V includes the state information subset in the dimension C and the parameter subset in the dimension C of the neighboring area of the area V in the dimension C, or the state information subsets in the dimension C and the parameter subsets in the dimension C of the area V and the neighboring area thereof in the dimension C, and output data of the neighboring area information encoding model of the area V is an encoding result in the dimension C; and
  input data of the performance prediction model in the dimension C of the area V includes the encoding result in the dimension C, and the state information subset in the dimension C and the parameter subset in the dimension C of the area V, and output data of the performance prediction model in the dimension C of the area V is a performance indicator expected value subset in the dimension C of the area V.

The neighboring area information encoding model is introduced to resolve a problem of mutual impact of configuration parameters between neighboring areas, and further improve accuracy of the configuration parameters.

In another embodiment, if the D dimensions include a local area dimension and a horizontal dimension, a parameter configuration model of any area V of the N areas includes a neighboring area information encoding model, a local area performance prediction model, and a horizontal performance prediction model, parameter sets of the area V and a neighboring area thereof include local area parameter subsets and horizontal parameter subsets, and state information sets of the area V and the neighboring area thereof include local area state information subsets and horizontal state information subsets;
  input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;
  input data of the local area performance prediction model of the area V includes the encoding result, and the local area state information subset and the local area parameter subset of the area V, and output data of the local area performance prediction model of the area V is a local area performance indicator expected value subset of the area V; and
  input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V.

Further, the neighboring area information encoding model includes a local area neighboring area information encoding model and a horizontal neighboring area information encoding model, the state information set of the neighboring area of the area V includes a horizontal state information subset of a horizontal neighboring area of the area V and a local area state information subset of the neighboring area of the area V, the parameter set of the neighboring area of the area V includes a horizontal parameter subset of the horizontal neighboring area of the area V and a local area parameter subset of the neighboring area of the area V, and the encoding result includes a local area encoding result and a horizontal encoding result;
  input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V includes the local area encoding result; and
  input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result.

In a further embodiment, if the D dimensions include a local area dimension and a vertical dimension, a parameter configuration model of any area V of the N areas includes a neighboring area information encoding model, a local area performance prediction model, and a vertical performance prediction model, parameter sets of the area V and a neighboring area thereof include local area parameter subsets and vertical parameter subsets, and state information sets of the area V and the neighboring area thereof include local area state information subsets and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Further, the neighboring area information encoding model includes a local area neighboring area information encoding model and a vertical neighboring area information encoding model, the state information set of the neighboring area of the area V includes a vertical state information subset of a vertical neighboring area of the area V and a local area state information subset of the neighboring area of the area V, the parameter set of the neighboring area of the area V includes a vertical parameter subset of the vertical neighboring area of the area V and a local area parameter subset of the neighboring area of the area V, and the encoding result includes a local area encoding result and a vertical encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V includes the local area encoding result; and input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result.

In a further embodiment, if the D dimensions include a horizontal dimension and a vertical dimension, a parameter configuration model of any area V of the N areas includes a neighboring area information encoding model, a horizontal performance prediction model, and a vertical performance prediction model, parameter sets of the area V and a neighboring area thereof include horizontal parameter subsets and vertical parameter subsets, and state information sets of the area V and the neighboring area thereof include horizontal state information subsets and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Further, the neighboring area information encoding model includes a horizontal neighboring area information encoding model and a vertical neighboring area information encoding model, the state information set of the neighboring area of the area V includes a vertical state information subset of a vertical neighboring area of the area V and a horizontal state information subset of a horizontal neighboring area of the area V, the parameter set of the neighboring area of the area V includes a vertical parameter subset of the vertical neighboring area of the area V and a horizontal parameter subset of the horizontal neighboring area of the area V, and the encoding result includes a horizontal encoding result and a vertical encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result; and input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result.

In another embodiment, if the D dimensions include a local area dimension, a horizontal dimension, and a vertical dimension, a parameter configuration model of any area V of the N areas includes a neighboring area information encoding model, a local area performance prediction model, a horizontal performance prediction model, and a vertical performance prediction model, parameter sets of the area V and a neighboring area thereof include local area parameter subsets, horizontal parameter subsets, and vertical parameter subsets, and state information sets of the area V and the neighboring area thereof include local area state information subsets, horizontal state information subsets, and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V;

input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Further, the neighboring area information encoding model includes a local area neighboring area information encoding model, a horizontal neighboring area information encoding model, and a vertical neighboring area information encoding model, the state information set of the neighboring area of the area V includes a local area state information subset of the neighboring area of the area V, a vertical state information subset of a vertical neighboring area of the area V, and a horizontal state information subset of a horizontal neighboring area of the area V, the parameter set of the neighboring area of the area V includes a local area parameter subset of the neighboring area of the area V, a vertical parameter subset of the vertical neighboring area of the area V, and a horizontal parameter subset of the horizontal neighboring area of the area V, and the encoding result includes a local area encoding result, a horizontal encoding result, and a vertical encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V is the local area encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result; and input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result.

In a further embodiment, the horizontal dimension includes an intra-frequency dimension and an inter-frequency dimension, the horizontal performance prediction model includes an intra-frequency performance prediction model and an inter-frequency performance prediction model, the horizontal performance indicator expected value subset includes an intra-frequency performance indicator expected value subset and an inter-frequency performance indicator expected value subset, the horizontal state information subsets of the area V and the horizontal neighboring area of the area V include intra-frequency state information subsets and inter-frequency state information subsets, and the horizontal parameter subsets of the area V and the horizontal neighboring area of the area V include intra-frequency parameter subsets and inter-frequency parameter subsets;

input data of the intra-frequency performance prediction model includes the encoding result, and the intra-frequency parameter subset in the horizontal parameter subset and the intra-frequency state information subset in the horizontal state information subset of the area V, and output data of the intra-frequency performance prediction model is the intra-frequency performance indicator expected value subset; and input data of the inter-frequency performance prediction model includes the encoding result, and the inter-frequency parameter subset in the horizontal parameter subset and the inter-frequency state information subset in the horizontal state information subset of the area V, and output data of the inter-frequency performance prediction model is the inter-frequency performance indicator expected value subset.

Further, the horizontal neighboring area information encoding model includes an intra-frequency neighboring area information encoding model and an inter-frequency neighboring area information encoding model, the horizontal state information subset of the horizontal neighboring area of the area V includes an intra-frequency state information subset of an intra-frequency neighboring area of the area V and an inter-frequency state information subset of an inter-frequency neighboring area of the area V among horizontal neighboring areas of the area V, the horizontal parameter subset of the horizontal neighboring area of the area V includes an intra-frequency parameter subset of the intra-frequency neighboring area of the area V and an inter-frequency parameter subset of the inter-frequency neighboring area of the area V among the horizontal neighboring areas of the area V, and the horizontal encoding result includes an intra-frequency encoding result and an inter-frequency encoding result;

input data of the intra-frequency neighboring area information encoding model includes the intra-frequency state information subset and the intra-frequency parameter subset of the intra-frequency neighboring area of the area V, or the intra-frequency state information subset in the horizontal state information subset of the area V and the intra-frequency parameter subset in the horizontal parameter subset of the area V and the intra-frequency state information subset and the intra-frequency parameter subset of the intra-frequency neighboring area of the area V, and output data of the intra-frequency neighboring area information encoding model is the intra-frequency encoding result; and input data of the inter-frequency neighboring area information encoding model includes the inter-frequency state information subset and the inter-frequency parameter subset of the inter-frequency neighboring area of the area V, or the inter-frequency state information subset in the horizontal state information subset of the area V and the inter-frequency parameter subset in the horizontal parameter subset of the area V and the inter-frequency state information subset and the inter-frequency parameter subset of the inter-frequency neighboring area of the area V, and output data of the inter-frequency neighboring area information encoding model is the inter-frequency encoding result.

Performance prediction models and neighboring area information encoding models in different dimensions are introduced to resolve a problem of difficulty in network parameter configuration adjustment caused by a complex network structure, and improve network parameter configuration efficiency.

In another embodiment, before the performing negotiations based on the state information subsets in the D dimensions of each of the N areas to obtain target parameter subsets in the D dimensions of each of the N areas, the method further includes:

obtaining a parameter configuration model of each of the N areas from a training device.

In another embodiment, when the network is a wireless cellular network, the network device is a base station, and the area is a cell covered by the base station.

In another embodiment, when the network is a Wi-Fi network, the network device is a Wi-Fi device, and the area is an area covered by the Wi-Fi device.

In a further embodiment, the area V is covered by signals of D frequency bands, and the D dimensions are in a one-to-one correspondence with the D frequency bands.

According to a second aspect, an embodiment provides a method for training a parameter configuration model, including:

obtaining operational state information of a network device, where the operational state information includes state information sets, parameter sets, and first performance indicator expected value sets of N areas covered by the network device, the state information sets include state information subsets in D dimensions of each of the N areas, the parameter sets include parameter subsets in the D dimensions of each of the N areas, and the first performance indicator expected value sets include first performance indicator expected value subsets in the D dimensions of each of the N areas;

inputting state information subsets in the D dimensions and parameter subsets in the D dimensions of any area V of the N areas, and state information subsets in the D dimensions and parameter subsets in the D dimensions of a neighboring area in each of the D dimensions of the area V into an initial configuration model of the area V, and performing calculation to obtain second performance indicator expected value subsets; and adjusting parameters in the initial configuration model based on the first performance indicator expected value subsets and the second performance indicator expected value subsets to obtain a parameter configuration model of the area V, where the parameter configuration model of the area V includes a neighboring area information encoding model and performance prediction models in the D dimensions.

In a feasible embodiment, if D=1, the D dimensions include only a dimension C, and the dimension C is a horizontal dimension or a vertical dimension; and the parameter configuration model of the area V of the N areas includes a neighboring area information encoding model in the dimension C and a performance prediction model in the dimension C, parameter sets of the area V and the neighboring area thereof include parameter subsets in the dimension C, and state information sets of the area V and the neighboring area thereof include state information subsets in the dimension C;

input data of the neighboring area information encoding model of the area V includes the state information subset in the dimension C and the parameter subset in the dimension C of the neighboring area of the area V in the dimension C, or the state information subsets in the dimension C and the parameter subsets in the dimension C of the area V and the neighboring area thereof in the dimension C, and output data of the neighboring area information encoding model of the area V is an encoding result in the dimension C; and input data of the performance prediction model in the dimension C of the area V includes the encoding result in the dimension C, and the state information subset in the dimension C and the parameter subset in the dimension C of the area V, and output data of the performance prediction model in the dimension C of the area V is a performance indicator expected value subset in the dimension C of the area V.

In a further embodiment, if the D dimensions include a local area dimension and a horizontal dimension, the parameter configuration model of any area V of the N areas includes a neighboring area information encoding model, a local area performance prediction model, and a horizontal performance prediction model, parameter sets of the area V and the neighboring area thereof include local area parameter subsets and horizontal parameter subsets, and state information sets of the area V and the neighboring area thereof include local area state information subsets and horizontal state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V; and input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V.

Further, the neighboring area information encoding model includes a local area neighboring area information encoding model and a horizontal neighboring area information encoding model, the state information set of the neighboring area of the area V includes a horizontal state information subset of a horizontal neighboring area of the area V and a local area state information subset of the neighboring area of the area V, the parameter set of the neighboring area of the area V includes a horizontal parameter subset of the horizontal neighboring area of the area V and a local area parameter subset of the neighboring area of the area V, and the encoding result includes a local area encoding result and a horizontal encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V includes the local area encoding result; and input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result.

In another embodiment, if the D dimensions include a local area dimension and a vertical dimension, the parameter configuration model of any area V of the N areas includes a neighboring area information encoding model, a local area performance prediction model, and a vertical performance prediction model, parameter sets of the area V and the neighboring area thereof include local area parameter subsets and vertical parameter subsets, and state information sets of the area V and the neighboring area thereof include local area state information subsets and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Further, the neighboring area information encoding model includes a local area neighboring area information encoding model and a vertical neighboring area information encoding model, the state information set of the neighboring area of the area V includes a vertical state information subset of a vertical neighboring area of the area V and a local area state information subset of the neighboring area of the area V, the parameter set of the neighboring area of the area V includes a vertical parameter subset of the vertical neighboring area of the area V and a local area parameter subset of the neighboring area of the area V, and the encoding result includes a local area encoding result and a vertical encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V includes the local area encoding result; and input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result.

In another embodiment, if the D dimensions include a horizontal dimension and a vertical dimension, the parameter configuration model of any area V of the N areas includes a neighboring area information encoding model, a horizontal performance prediction model, and a vertical performance prediction model, parameter sets of the area V and the neighboring area thereof include horizontal parameter subsets and vertical parameter subsets, and state information sets of the area V and the neighboring area thereof include horizontal state information subsets and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Further, the neighboring area information encoding model includes a horizontal neighboring area information encoding model and a vertical neighboring area information encoding model, the state information set of the neighboring area of the area V includes a vertical state information subset of a vertical neighboring area of the area V and a horizontal state information subset of a horizontal neighboring area of the area V, the parameter set of the neighboring area of the area V includes a vertical parameter subset of the vertical neighboring area of the area V and a horizontal parameter subset of the horizontal neighboring area of the area V, and the encoding result includes a horizontal encoding result and a vertical encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result; and input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result.

In a feasible embodiment, if the D dimensions include a local area dimension, a horizontal dimension, and a vertical dimension, the parameter configuration model of any area V of the N areas includes a neighboring area information encoding model, a local area performance prediction model, a horizontal performance prediction model, and a vertical performance prediction model, parameter sets of the area V and the neighboring area thereof include local area parameter subsets, horizontal parameter subsets, and vertical parameter subsets, and state information sets of the area V and the neighboring area thereof include local area state information subsets, horizontal state information subsets, and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V;

input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Further, the neighboring area information encoding model includes a local area neighboring area information encoding model, a horizontal neighboring area information encoding model, and a vertical neighboring area information encoding model, the state information set of the neighboring area of the area V includes a local area state information subset of the neighboring area of the area V, a vertical state information subset of a vertical neighboring area of the area V, and a horizontal state information subset of a horizontal neighboring area of the area V, the parameter set of the neighboring area of the area V includes a local area parameter subset of the neighboring area of the area V, a vertical parameter subset of the vertical neighboring area of the area V, and a horizontal parameter subset of the horizontal neighboring area of the area V, and the encoding result includes a local area encoding result, a horizontal encoding result, and a vertical encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V is the local area encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result; and input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result.

In a feasible embodiment, the horizontal dimension includes an intra-frequency dimension and an inter-frequency dimension, the horizontal performance prediction model includes an intra-frequency performance prediction model and an inter-frequency performance prediction model, the horizontal performance indicator expected value subset includes an intra-frequency performance indicator expected value subset and an inter-frequency performance indicator expected value subset, the horizontal state information subsets of the area V and the horizontal neighboring area of the area V include intra-frequency state information subsets and inter-frequency state information subsets, and the horizontal parameter subsets of the area V and the horizontal neighboring area of the area V include intra-frequency parameter subsets and inter-frequency parameter subsets;

input data of the intra-frequency performance prediction model includes the encoding result, and the intra-frequency parameter subset in the horizontal parameter subset and the intra-frequency state information subset in the horizontal state information subset of the area V, and output data of the intra-frequency performance prediction model is the intra-frequency performance indicator expected value subset; and input data of the inter-frequency performance prediction model includes the encoding result, and the inter-frequency parameter subset in the horizontal parameter subset and the inter-frequency state information subset in the horizontal state information subset of the area V, and output data of the inter-frequency performance prediction model is the inter-frequency performance indicator expected value subset.

Further, the horizontal neighboring area information encoding model includes an intra-frequency neighboring area information encoding model and an inter-frequency neighboring area information encoding model, the horizontal state information subset of the horizontal neighboring area of the area V includes an intra-frequency state information subset of an intra-frequency neighboring area of the area V and an inter-frequency state information subset of an inter-frequency neighboring area of the area V among horizontal neighboring areas of the area V, the horizontal parameter subset of the horizontal neighboring area of the area V includes an intra-frequency parameter subset of the intra-frequency neighboring area of the area V and an inter-frequency parameter subset of the inter-frequency neighboring area of the area V among the horizontal neighboring areas of the area V, and the horizontal encoding result includes an intra-frequency encoding result and an inter-frequency encoding result;

input data of the intra-frequency neighboring area information encoding model includes the intra-frequency state information subset and the intra-frequency parameter subset of the intra-frequency neighboring area of the area V, or the intra-frequency state information subset in the horizontal state information subset of the area V and the intra-frequency parameter subset in the horizontal parameter subset of the area V and the intra-frequency state information subset and the intra-frequency parameter subset of the intra-frequency neighboring area of the area V, and output data of the intra-frequency neighboring area information encoding model is the intra-frequency encoding result; and input data of the inter-frequency neighboring area information encoding model includes the inter-frequency state information subset and the inter-frequency parameter subset of the inter-frequency neighboring area of the area V, or the inter-frequency state information subset in the horizontal state information subset of the area V and the inter-frequency parameter subset in the horizontal parameter subset of the area V and the inter-frequency state information subset and the inter-frequency parameter subset of the inter-frequency neighboring area of the area V, and output data of the inter-frequency neighboring area information encoding model is the inter-frequency encoding result.

Performance prediction models and neighboring area information encoding models in different dimensions are introduced to resolve a problem of difficulty in network parameter configuration adjustment caused by a complex network structure, and improve network parameter configuration efficiency.

In an embodiment, when the network is a wireless cellular network, the network device is a base station, and the area is a cell covered by the base station.

In another embodiment, when the network is a Wi-Fi network, the network device is a Wi-Fi device, and the area is an area covered by the Wi-Fi device.

In yet an other embodiment, the area V is covered by signals of D frequency bands, and the D dimensions are in a one-to-one correspondence with the D frequency bands.

According to a third aspect, a parameter configuration apparatus is provided. The apparatus includes modules configured to perform the method in the first aspect.

According to a fourth aspect, a training apparatus is provided. The apparatus includes modules configured to perform the method in the second aspect.

According to a fifth aspect, a parameter configuration apparatus is provided. The apparatus includes: a memory, configured to store a program; and a processor, configured to execute the program stored in the memory. When the program stored in the memory is executed, the processor is configured to perform the method in the first aspect.

According to a sixth aspect, a training apparatus is provided. The apparatus includes: a memory, configured to store a program; and a processor, configured to execute the program stored in the memory. When the program stored in the memory is executed, the processor is configured to perform the method in the second aspect.

According to a seventh aspect, a computer-readable medium is provided. The computer-readable medium stores program code executed by a device, and the program code includes instructions used to perform the method in the first aspect or the second aspect.

According to an eighth aspect, a computer program product including instructions is provided. When the computer program product runs on a computer, the computer is enabled to perform the method in the first aspect or the second aspect.

According to a ninth aspect, a chip is provided. The chip includes a processor and a data interface, and the processor reads, through the data interface, instructions stored in a memory, to perform the method in the first aspect or the second aspect.

Optionally, in an implementation, the chip may further include the memory, the memory stores the instructions, the processor is configured to execute the instructions stored in the memory, and when the instructions are executed, the processor is configured to perform the method in the first aspect or the second aspect.

According to a tenth aspect, an electronic device is provided. The electronic device includes the apparatus in any one of the third aspect to the seventh aspect, and the ninth aspect.

BRIEF DESCRIPTION OF DRAWINGS

To describe the technical solutions in the embodiments of the present disclosure or in the conventional technology more clearly, the following briefly describes the accompanying drawings provided for describing the embodiments. It is clear that the accompanying drawings in the following descriptions show merely some embodiments of the present disclosure, and a person of ordinary skill in the art may derive other drawings from these accompanying drawings without creative efforts.

DESCRIPTION OF EMBODIMENTS

The following describes embodiments of this disclosure with reference to accompanying drawings.

Figure 1A:
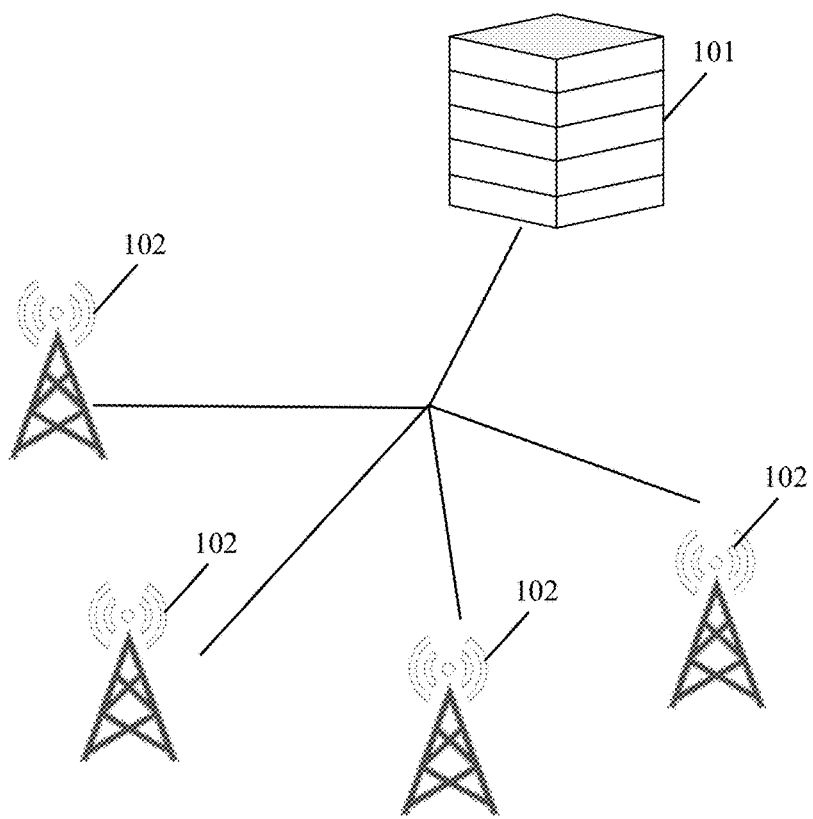
FIG. 1a is a schematic diagram of a network architecture according to an embodiment.

FIG. 1a is a schematic diagram of a network architecture according to an embodiment. As shown in FIG. 1a, the network architecture includes a network control center 101 and a plurality of radio base stations 102.

A signal coverage area of each radio base station 102 may be further divided into a plurality of cells. The network control center 101 is connected to each radio base station 102.

The radio base station 102 may be a macro base station, or may be a network access device such as a small cell. Both transmit power and coverage of the small cell are smaller than those of a macro base station. For example, the small cell may be a home evolved NodeB (HeNodeB), a micro base station (micro base station), a wireless access point (AP), a pico base station (pico base station), or the like. The wireless AP is an access point for a mobile computer user to access a wired network, and is mainly used in homes, buildings, and campus equipped with broadband, and can cover tens of meters to hundreds of meters.

The network control center 101 collects operational state information of cells covered by the radio base station 102, models each cell based on the operational state information of each cell to obtain a parameter configuration model of each cell, then obtains a parameter subset of each cell based on the parameter configuration model and the operational state information of each cell, and sends the obtained parameter subset of the cell to the radio base station 102 covering the cell, so that the radio base station 102 performs configuration based on the parameter subset of the cell.

Figure 1B:
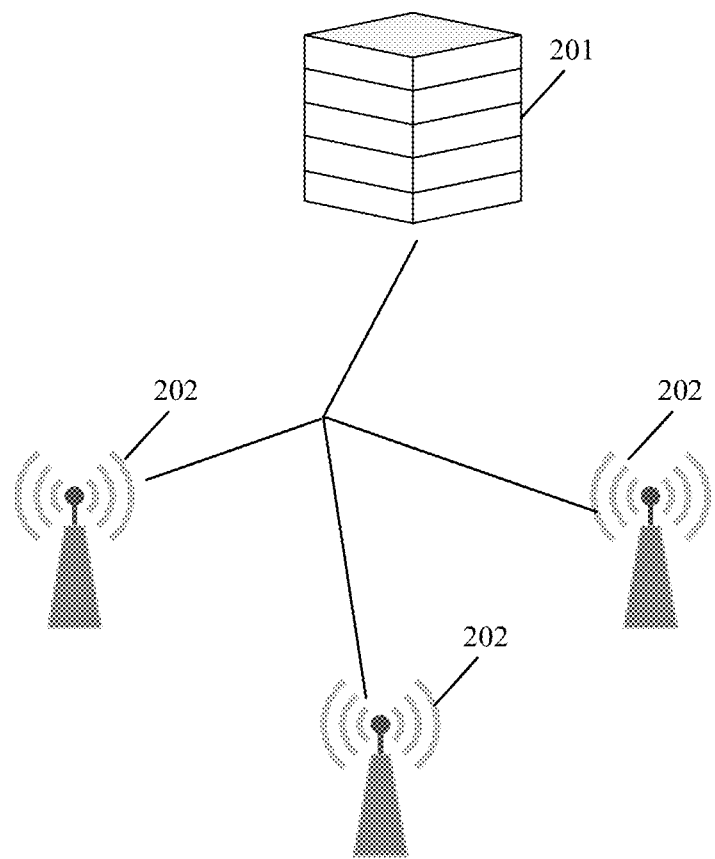
FIG. 1b is a schematic diagram of another network architecture according to an embodiment.

FIG. 1B is a schematic diagram of another network architecture according to an embodiment of this application. As shown in FIG. 1B, the network architecture includes a network control center 201 and a plurality of Wi-Fi devices 202. The network control center 201 is connected to each Wi-Fi device 202.

The network control center 201 collects operational state information of areas covered by the Wi-Fi device 202, models each area based on the operational state information of each area to obtain a parameter configuration model of each area, then obtains a parameter subset of each area based on the parameter configuration model and the operational state information of each area, and sends the obtained parameter subset of the area to the Wi-Fi device 202 covering the area, so that the Wi-Fi device 202 performs configuration based on the parameter subset of the area.

Figure 2:
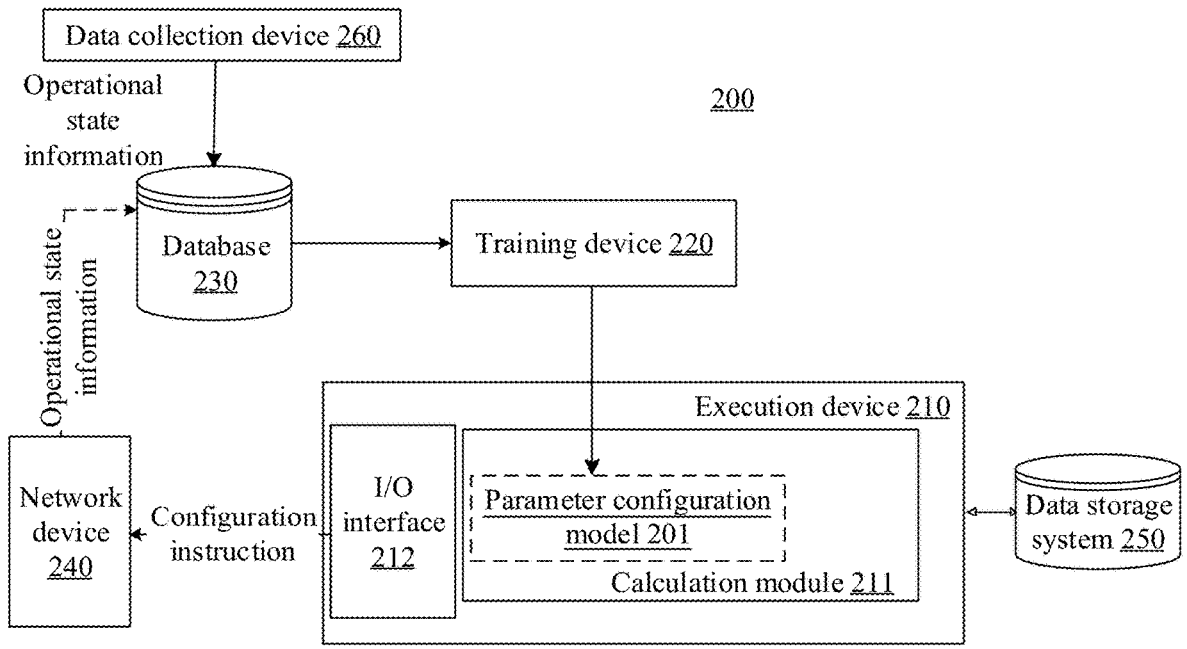
FIG. 2 is a schematic diagram of a system architecture according to an embodiment.

Refer to FIG. 2. An embodiment provides a system architecture 200. A data collection device 260 is configured to collect operational state information of a network device, and store the information in a database 230. A training device 220 generates a parameter configuration model 201 based on the operational state information of the network device that is maintained in the database 230. The following describes in more detail how the training device 220 obtains the parameter configuration model 201 based on the operational state information of the network device. The parameter configuration model 201 can provide a basis for determining a target parameter subset of the network device.

The parameter configuration model 201 may be implemented based on a deep neural network. The operational state information includes a parameter subset, a state information subset, and a performance indicator expected value subset of a coverage area of the network device.

Work of each layer in the deep neural network may be described by using a mathematical expression: $\vec{y}=a(W \cdot \vec{x}+b)$. The work of each layer in the deep neural network may physically be understood as completing transformation from input space to output space (to be specific, row space to column space of a matrix) by performing five operations on the input space (a set of input vectors). The five operations include: 1. dimension raising/dimension reduction, 2. scaling out/scaling in, 3. rotation, 4. translation, and 5. "bending". The operations 1, 2, and 3 are completed by $W \cdot \vec{x}$, the operation 4 is completed by $+b$, and the operation 5 is implemented by $a(\ )$. The word "space" is used herein for expression because a classified object is not a single object, but a type of object. The space refers to a set of all individuals of this type of object. W is a weight vector, and each value in the vector represents a weight value of one neuron in a neural network at this layer. The vector W determines space transformation from the input space to the output space described above. In other words, a weight W of each layer controls how to transform space. A purpose of training the deep neural network is to finally obtain a weight matrix (a weight matrix formed by vectors W of a plurality of layers) of all layers of a trained neural network. Therefore, a process of training the neural network is essentially a manner of learning control of the space transformation, and more specifically, learning the weight matrix.

Because an output of the deep neural network expects to be as much as possible close to a value that actually wants to be predicted, a current predicted value of the network and an expected target value are compared, so that a weight vector of each layer of neural network can be updated based on a difference between the predicted value and the target value (certainly, there is usually an initialization process before first updating, to be specific, a parameter subset is preconfigured for each layer of the deep neural network). For example, if the predicted value of the network is excessively large, the weight vector is adjusted to obtain a smaller predicted value, and is continuously adjusted until the neural network can predict the expected target value. Therefore, "how to obtain, through comparison, the difference between the predicted value and the target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

The parameter configuration model 201 obtained by the training device 220 may be applied to different systems or devices. In FIG. 2, an execution device 210 is configured with an I/O interface 212, and exchanges data with an external device. The execution device 210 may obtain the parameter configuration model 201 from another device through the I/O interface 212.

The execution device 210 may invoke data, code, and the like that are in a data storage system 250, or may store the data, instructions, and the like in the data storage system 250.

A calculation module 211 inputs the parameter subset and the state information subset of the area into the parameter configuration model 201, performs calculation to obtain the performance indicator expected value subset of the area, and determines the target parameter subset of the area based on the performance indicator expected value subset.

Finally, the target parameter subset is returned to the network device 240 through the I/O interface 212, and provided for a user to perform parameter configuration on the network device based on the target parameter subset.

More deeply, the training device 220 may generate, for different targets, corresponding parameter configuration models 201 based on different data, to provide a better result for the user.

Alternatively, the network device 240 may serve as a data collector end to store the collected operational state information in the database 230.

It should be noted that, FIG. 2 is merely a schematic diagram of a system architecture according to an embodiment. A position relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210.

Figure 3:
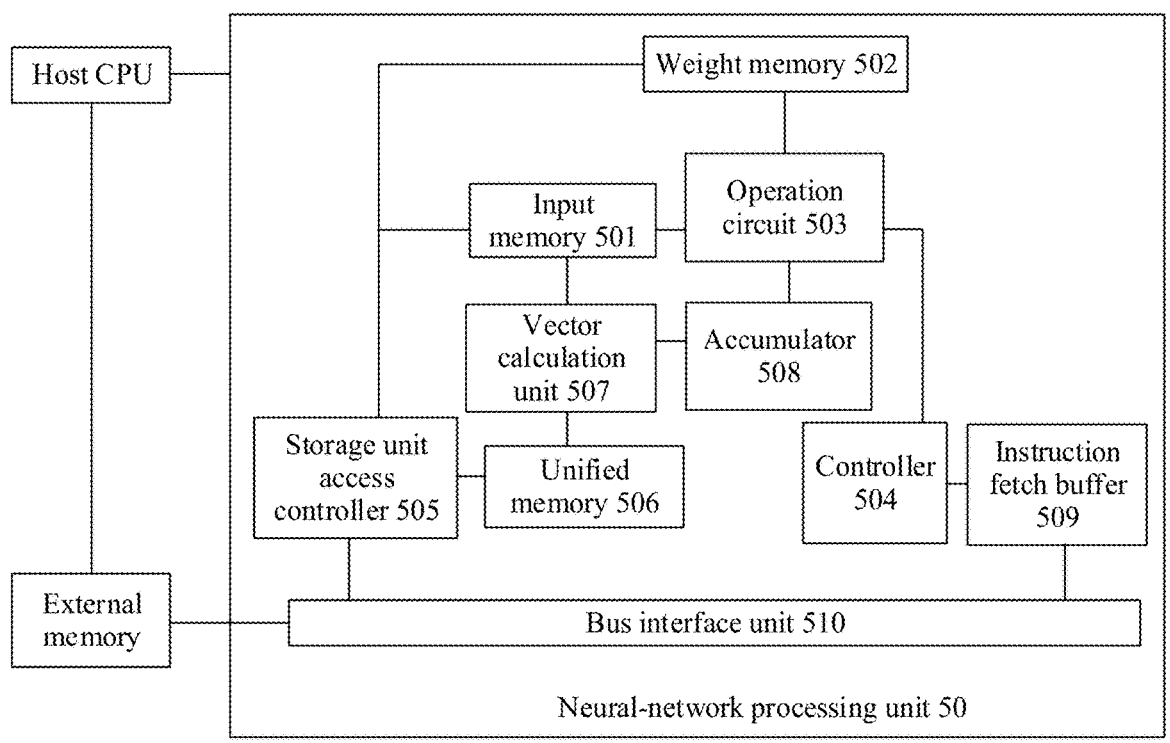
FIG. 3 is a schematic diagram of a structure of a chip according to an embodiment.

FIG. 3 is a diagram of a hardware structure of a chip according to an embodiment.

A neural-network processing unit NPU 50, as a coprocessor, is mounted to a host CPU (Host CPU), and the host CPU assigns a task. A core part of the NPU is an operation circuit 50, and a controller 504 controls the operation circuit 503 to extract data in a memory (a weight memory or an input memory) and perform an operation.

In some implementations, the operation circuit 503 includes a plurality of processing units (Process Engine, PE) inside. In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit extracts corresponding data of the matrix B from the weight memory 502, and buffers the corresponding data into each PE in the operation circuit. The operation circuit fetches data of the matrix A from an input memory 501, to perform a matrix operation on the matrix B, and a partial result or a final result of an obtained matrix is stored in an accumulator (accumulator) 508.

A vector calculation unit 507 may perform further processing on the output of the operation circuit, for example, perform vector multiplication, vector addition, an exponential operation, a logarithmic operation, and value comparison. For example, the vector calculation unit 507 may be configured to perform network computing, such as pooling (Pooling), batch normalization (Batch Normalization), or local response normalization (Local Response Normalization), at a non-convolutional/non-FC layer in a neural network.

In some implementations, the vector calculation unit 507 can store a processed output vector in a unified memory 506. For example, the vector calculation unit 507 may apply a non-linear function to the output, for example, a vector of an accumulated value, of the operation circuit 503 to generate an activation value. In some implementations, the vector calculation unit 507 generates a normalized value, a combined value, or both. In some implementations, the processed output vector can be used as an activation input to the operation circuit 503, for example, used in a subsequent layer in the neural network.

A step of inputting a parameter subset and a state information subset of an area V and a neighboring area thereof into a parameter configuration model for calculation to obtain a performance indicator expected value subset may be performed by the operation circuit 503 or the vector calculation unit 507.

The unified memory 506 is configured to store input data and output data.

A storage unit access controller 505 (Direct Memory Access Controller, DMAC) is configured to transfer input data in an external memory to the input memory 501 and/or the unified memory 506, stores weight data in the external memory in the weight memory 502, and stores data in the unified memory 506 in the external memory.

A bus interface unit (Bus Interface Unit, BIU) 510 is configured to implement interaction between the host CPU, the DMAC, and an instruction fetch buffer 509 through a bus.

The instruction fetch buffer (instruction fetch buffer) 509 connected to the controller 504 is configured to store instructions used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip (On-Chip) memory. The external memory is a memory outside the NPU. The external memory may be a double data rate synchronous dynamic random access memory (Double Data Rate Synchronous Dynamic Random Access Memory, DDR SDRAM for short), a high bandwidth memory (High Bandwidth Memory, HBM), or another readable and writable memory.

The host CPU is configured to obtain operational state information of a network device, where the operational state information includes a state information set of each of N areas covered by the network device, and the state information set includes state information subsets in D dimensions; and perform negotiations based on the state information subsets in the D dimensions of each of the N areas to obtain target parameter subsets in the D dimensions of each of the N areas. In a process of performing the step "performing negotiations based on the state information subsets in the D dimensions of each of the N areas to obtain target parameter subsets in the D dimensions of each of the N areas", a step "inputting a parameter subset and a state information subset into a parameter configuration model for calculation to obtain a performance indicator expected value subset" is performed by the NPU.

Figure 4:
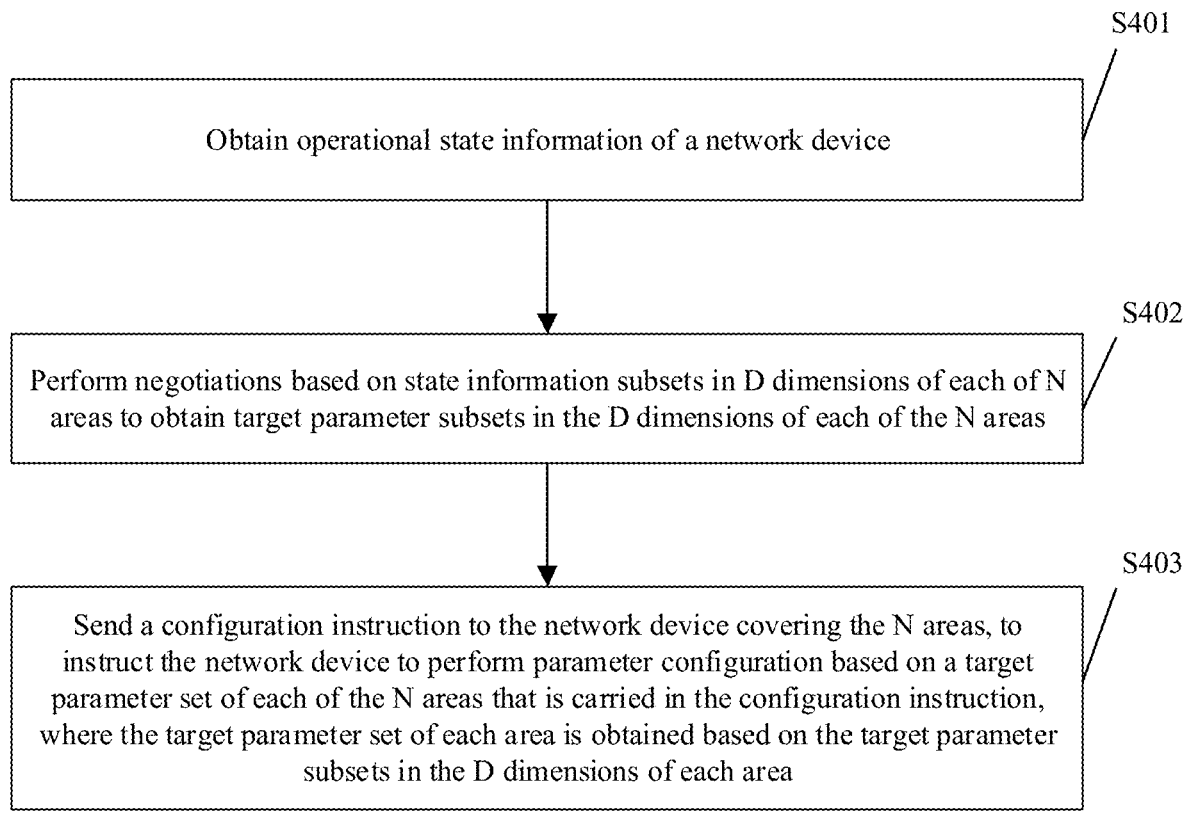
FIG. 4 is a schematic flowchart of a parameter configuration method according to an embodiment.

FIG. 4 is a schematic flowchart of a network parameter configuration method according to an embodiment of this application. As shown in FIG. 4, the method includes the following steps.

S401. Obtain operational state information of a network device.

The operational state information includes a state information set, a parameter set, an optimization performance indicator set, and a neighbor relationship table in each of D dimensions of each of N areas covered by the network device. The state information set includes state information subsets in the D dimensions. The parameter set includes parameter subsets in the D dimensions. The optimization performance indicator set includes D optimization performance indicator subsets. The state information subsets in the D dimensions, the parameter subsets in the D dimensions, and the D optimization performance indicator subsets are in a one-to-one correspondence. N is an integer greater than 0.

It should be noted herein that the D dimensions may be at least one of a local area dimension, a horizontal dimension, and a vertical dimension.

It should be noted herein that, for a performance indicator in a dimension A, a correlation between each piece of state information in all state information sets and the performance indicator may be counted, and sorting is performed in descending order based on the correlations, and top K pieces of state information are selected as the state information subset in the dimension A; or for a performance indicator in a dimension A, a correlation between each piece of state information in all state information sets and the performance indicator and a divergence degree of each piece of state information in all the state information sets may be counted, sorting is performed in descending order based on correlations and the divergence degree, and top K pieces of state information are selected as the state information subset in the dimension A.

When the network device is a radio base station, or the method in this application is applied to a wireless cellular network, state information sets, parameter sets, and optimization performance indicator sets of the N areas covered by the network device, and a neighbor relationship table in each of the D dimensions are respectively cell state information sets, cell parameter sets, cell optimization performance indicator sets, and a neighboring cell relationship table in each of D dimensions of cells.

Elements in a cell state information set include but are not limited to an average quantity of users in a cell unit time period, an average quantity of active users in the cell unit time period, a ratio of low channel quality indicator (channel quality indicator, CQI) reports in the cell unit time period, a ratio of small packets in the cell unit time period, and an average length of data packets sent in the cell unit time.

Elements in a cell parameter set include but are not limited to cell antenna transmit power, a reference signal received power (reference signal received power, RSRP) threshold for starting inter-frequency handover measurement by a cell user, and an RSRP threshold for stopping inter-frequency handover measurement by the cell user.

Elements in a cell optimization performance indicator set include but are not limited to an average downlink user-perceived rate in the cell unit time, an average uplink user-perceived rate in the cell unit time, an average latency in sending data packets by users in the cell unit time, and a proportion of users whose rates are lower than 5 Mbit/s in the cell unit time.

The cell state information set, optimization performance indicator set, and parameter set may be represented by the following vectors.

$$S_t = \begin{bmatrix} s_{1,t} \\ \ldots \\ s_{N,t} \end{bmatrix}, r_t = \begin{bmatrix} r_{1,t} \\ \ldots \\ r_{M,t} \end{bmatrix}, \text{and } a_t = \begin{bmatrix} a_{1,t} \\ \ldots \\ a_{L,t} \end{bmatrix},$$

where $S_t$ represents a state information set of the cell at a time t, N is a quantity of elements in the state information set, and each element represents a state with a physical meaning (for example, the average quantity of users in the cell unit time period, or the average length of data packets sent in the cell unit time period); $r_t$ represents an optimization performance indicator set of the cell, elements in the set are measurement values of optimization performance indicators at the time t, there are a total of M optimization performance indicators in the set, and each optimization performance indicator is a measurement indicator for network performance (for example, the average downlink user-perceived rate in the cell unit time, or the average latency in sending data packets by users in the cell unit time); and $a_t$ represents a parameter set of the cell, elements in the set are configuration values of to-be-optimized parameters at the time t, there are a total of L parameters in the set, and each parameter represents a control variable that can be adjusted (for example, a threshold for initiating handover by the cell user, or a scheduling fairness weight).

A neighboring cell relationship table of the cell is used to represent a neighboring cell relationship of the cell, and may include a plurality of dimensions, such as a neighboring cell table in a vertical dimension, a neighboring cell table in a horizontal dimension, a neighboring cell table in an intra-frequency dimension, and a neighboring cell table in an inter-frequency dimension.

The neighboring cell relationship table in each dimension may be represented in the following Table 1.

TABLE 1

| Primary cell | First cell | Second cell | Third cell |
| --- | --- | --- | --- |
| Cell A | Cell B | Cell C | |
| Cell B | Cell C | Cell A | Cell D |
| Cell C | Cell B | Cell D | Cell E |
| ... | ... | ... | ... |

It should be noted herein that a distance between the first cell and the primary cell is shorter than a distance between the primary cell and the second cell, and the distance between the primary cell and the second cell is shorter than a distance between the primary cell and the third cell.

Optionally, the primary cell, the first cell, the second cell, and the third cell are sorted based on a frequency of handover with the primary cell, an order of vertical frequency bands, or other characteristic parameters.

In a feasible embodiment, because a large amount of redundant information irrelevant to an optimization indicator exists in the state information set of the area, before the state information set of the area is used, state information in the state information set of each area is filtered, to obtain a filtered state information set of the area.

A correlation value between each type of state information in the state information set of the area and an optimization performance indicator is calculated, where the correlation value is used to represent a correlation degree between the state information and the optimization performance indicator; and state information of a type corresponding to a correlation value less than a first threshold is deleted from the state information set of the area, to obtain a filtered state information set of the area; or a divergence value of each type of state information in the state information set of the area is calculated, where the divergence value is used to represent divergence of each type of state information in the state information set of the area; and state information of a type corresponding to a divergence value less than a second threshold is deleted from the state information set of the area, to obtain a filtered state information set of the area; or a divergence value of each type of state information in the state information set of the area and a correlation between the type of state information and an optimization performance indicator are calculated; then a score of the type of state information is calculated based on the correlation and divergence value of each type; and based on a magnitude relationship between the score and a score threshold, whether to delete the type of state information corresponding to the score from the state information set of the area is determined, to obtain a filtered state information set of the area, where the divergence value of each type of state information refers to a variance of normalized state information of the type.

It should be noted herein that the foregoing three manners of filtering the state information of the area are merely examples, and are not intended to limit this application.

Certainly, another manner may be used to filter the state information of the area.

Optionally, in a feasible embodiment, after the state information sets, the parameter sets, and the optimization performance indicator sets (which may be referred to as first performance indicator expected value sets) of the N areas are obtained, state information sets and parameter sets of any area V of the N areas and a neighboring area thereof are input into an initial configuration model of the area V for calculation, to obtain second performance indicator expected value sets; and parameters in the initial configuration model of the area V are adjusted based on the first performance indicator expected value set and the second performance indicator expected value set of the area V, to obtain a parameter configuration model of the area V.

Optionally, in another feasible embodiment, after the state information sets, the parameter sets, and the optimization performance indicator sets of the N areas are obtained, an initial shared model is trained based on the state information sets, the parameter sets, and the optimization performance indicator sets of the N areas, to obtain a shared parameter configuration model, where a parameter configuration model of each of the N areas is the shared parameter configuration model, that is, parameter configuration models of the N areas are the same.

Optionally, in another feasible embodiment, after the state information sets, the parameter sets, and the optimization performance indicator sets of the N areas are obtained, an initial shared model is trained based on the state information sets, the parameter sets, and the optimization performance indicator sets of the N areas, to obtain a shared parameter configuration model; and then parameters in the shared parameter configuration model are adjusted based on state information sets, parameter sets, and optimization performance indicator sets of any area V of the N areas and a neighboring area thereof, to obtain a parameter configuration model of the area V.

In another feasible embodiment, before a parameter negotiation is performed, the method in this application further includes:

obtaining a parameter configuration model of each of the N areas from a training device.

Figure 5:
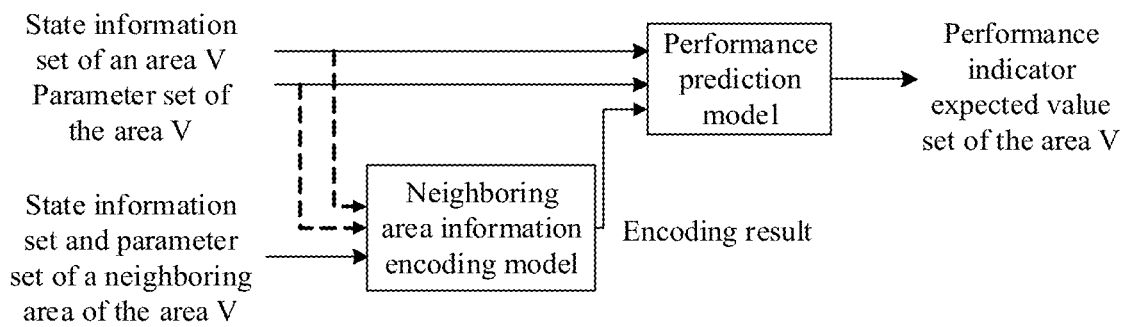
FIG. 5 is a schematic diagram of a structure of a parameter configuration model according to an embodiment.

Optionally, in a feasible embodiment, a parameter configuration model of any area V of the N areas includes a performance prediction model and a neighboring area information encoding model;

input data of the neighboring area information encoding model of the area V includes a state information set and a parameter set of a neighboring area of the area V, or state information sets and parameter sets of the area V and a neighboring area thereof, and output data of the neighboring area information encoding model of the area V is an encoding result; and input data of the performance prediction model of the area V includes the encoding result output by the neighboring area information encoding model of the area V and the state information set and the parameter set of the area V, and output data of the performance prediction model of the area V is a performance indicator expected value set of the area V, as shown in FIG. 5.

Figure 6:
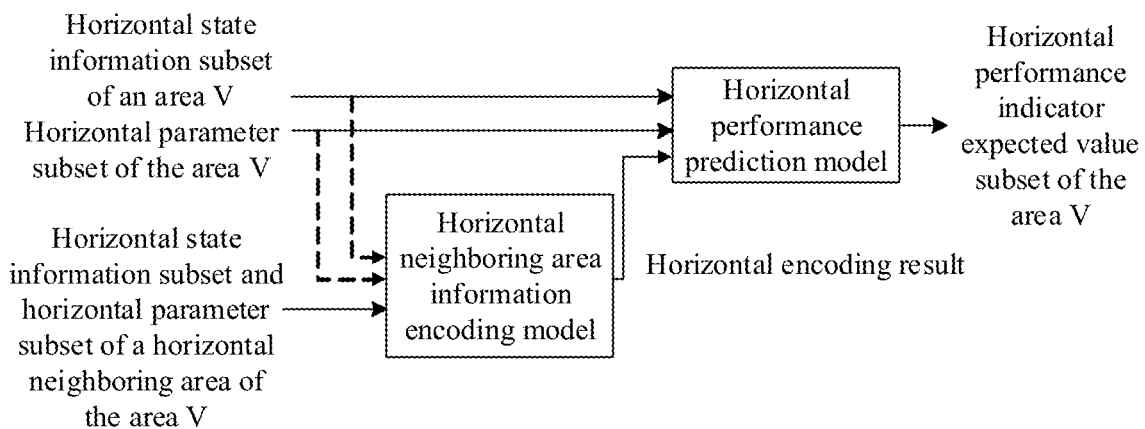
FIG. 6 is a schematic diagram of a structure of another parameter configuration model according to an embodiment.

Optionally, in a feasible embodiment, if the D dimensions include a horizontal dimension, a parameter configuration model of any area V of the N areas includes a horizontal performance prediction model and a horizontal neighboring area information encoding model, state information sets of the area V and a neighboring area thereof include horizontal state information subsets, parameter sets include horizontal parameter subsets, and performance indicator expected value sets include horizontal performance indicator expected value subsets;

input data of the horizontal neighboring area information encoding model of the area V includes a horizontal state information subset and a horizontal parameter subset of a horizontal neighboring area of the area V, or horizontal state information subsets and horizontal parameter subsets of the area V and a horizontal neighboring area thereof, and output data of the horizontal neighboring area information encoding model of the area V is a horizontal encoding result; and input data of the horizontal performance prediction model of the area V includes the horizontal encoding result output by the horizontal neighboring area information encoding model of the area V and the horizontal state information subset and the horizontal parameter subset of the area V, and output data of the horizontal performance prediction model of the area V is the horizontal performance indicator expected value subset of the area V, as shown in FIG. 6.

Figure 7:
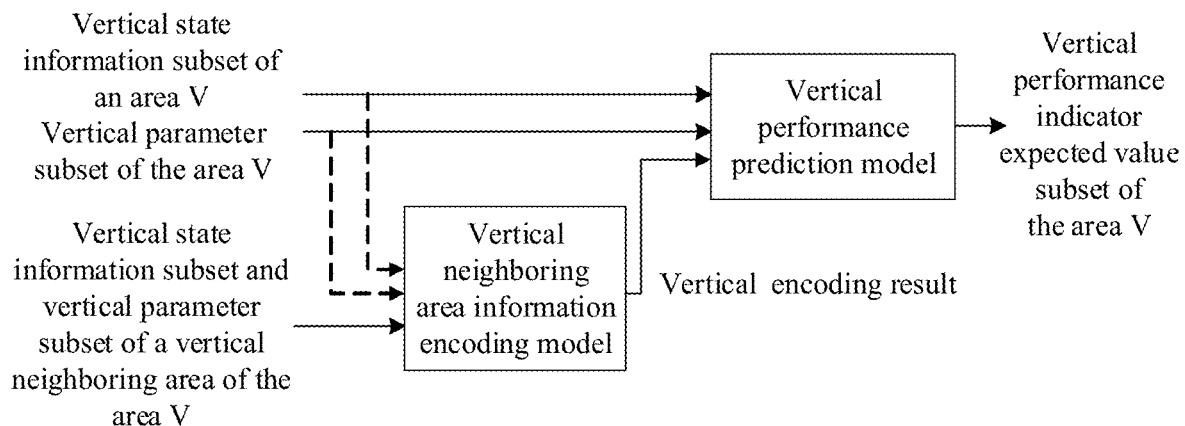
FIG. 7 is a schematic diagram of a structure of another parameter configuration model according to an embodiment.

Optionally, in a feasible embodiment, if the D dimensions include a vertical dimension, a parameter configuration model of any area V of the N areas includes a vertical performance prediction model and a vertical neighboring area information encoding model, state information sets of the area V and a neighboring area thereof include vertical state information subsets, parameter sets include vertical parameter subsets, and performance indicator expected value sets include vertical performance indicator expected values;

input data of the vertical neighboring area information encoding model of the area V includes a vertical state information subset and a vertical parameter subset of a vertical neighboring area of the area V, or vertical state information subsets and vertical parameter subsets of the area V and a vertical neighboring area thereof, and output data of the vertical neighboring area information encoding model of the area V is a vertical encoding result; and input data of the vertical performance prediction model of the area V includes the vertical encoding result output by the vertical neighboring area information encoding model of the area V and the vertical state information subset and the vertical parameter subset of the area V, and output data of the vertical performance prediction model of the area V is a vertical performance indicator expected value subset of the area V, as shown in FIG. 7.

Figure 8:
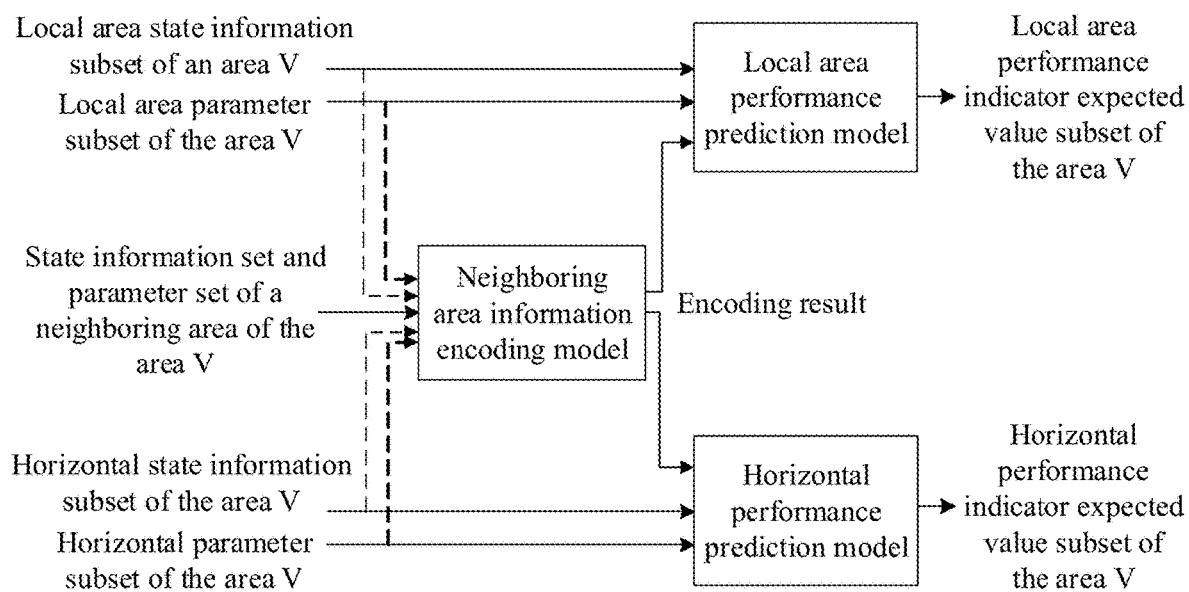
FIG. 8 is a schematic diagram of a structure of another parameter configuration model according to an embodiment.

Optionally, in another specific embodiment, as shown in FIG. 8, if the D dimensions include a local area dimension and a horizontal dimension, a parameter configuration model of the area V includes a neighboring area information encoding model, a local area performance prediction model, and a horizontal performance prediction model, parameter sets of the area V and a neighboring area thereof include local area parameter subsets and horizontal parameter subsets, and state information sets of the area V and the neighboring area thereof include local area state information subsets and horizontal state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V; and input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V.

Figure 9:
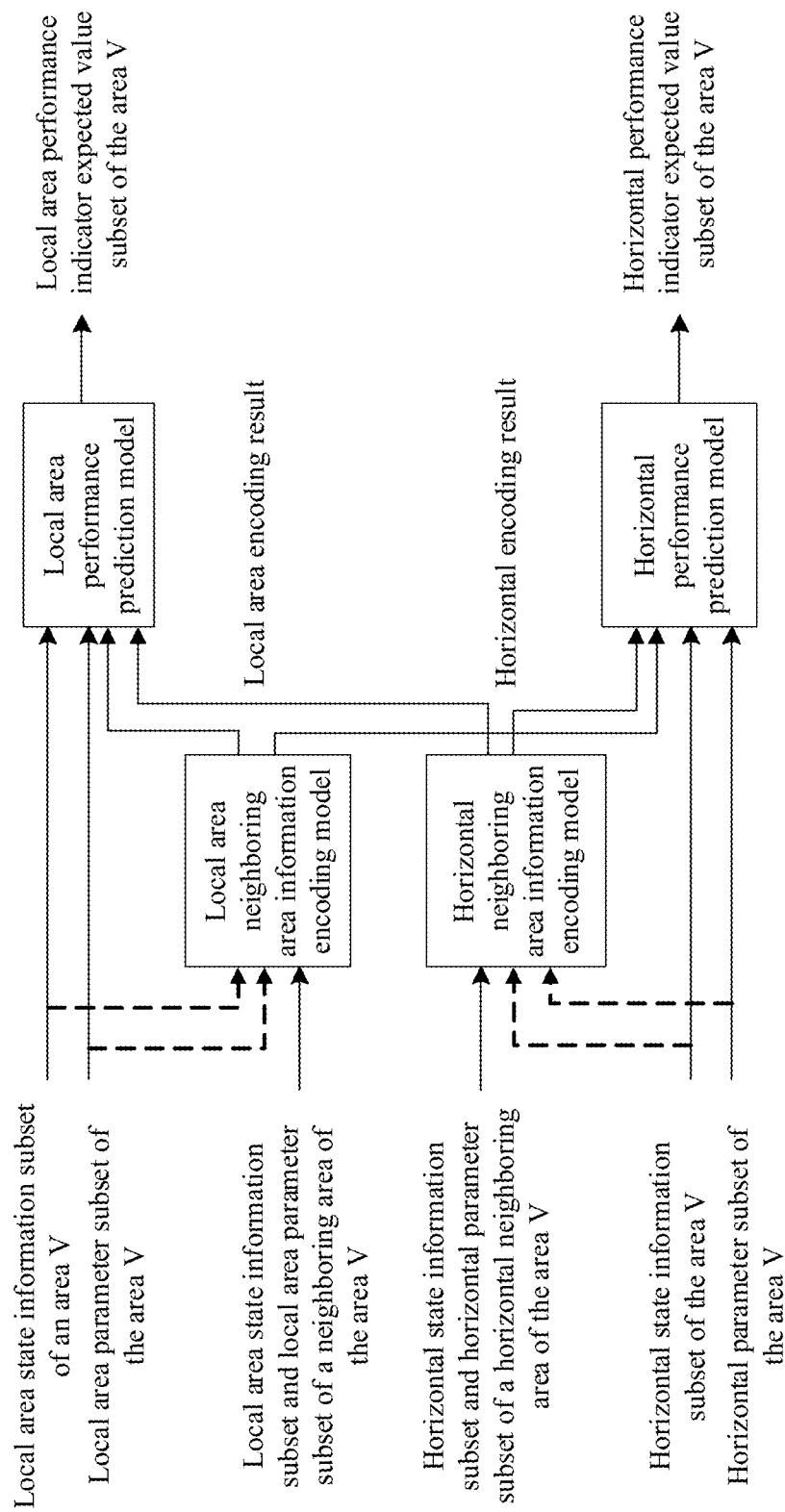
FIG. 9 is a schematic diagram of a structure of another parameter configuration model according to an embodiment.

Further, as shown in FIG. 9, the neighboring area information encoding model of the area V includes a local area neighboring area information encoding model and a horizontal neighboring area information encoding model, the state information set of the neighboring area of the area V includes a horizontal state information subset of a horizontal neighboring area of the area V and a local area state information subset of the neighboring area of the area V, the parameter set of the neighboring area of the area V includes a horizontal parameter subset of the horizontal neighboring area of the area V and a local area parameter subset of the neighboring area of the area V, and the encoding result includes a local area encoding result and a horizontal encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V includes the local area encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result; and input data of the local area performance prediction model of the area V includes the local area encoding result, the horizontal encoding result, and the local area state information subset and the local area parameter subset of the area V; and input data of the horizontal performance prediction model of the area V includes the local area encoding result, the horizontal encoding result, and the horizontal state information subset and the horizontal parameter subset of the area V.

Figure 10:
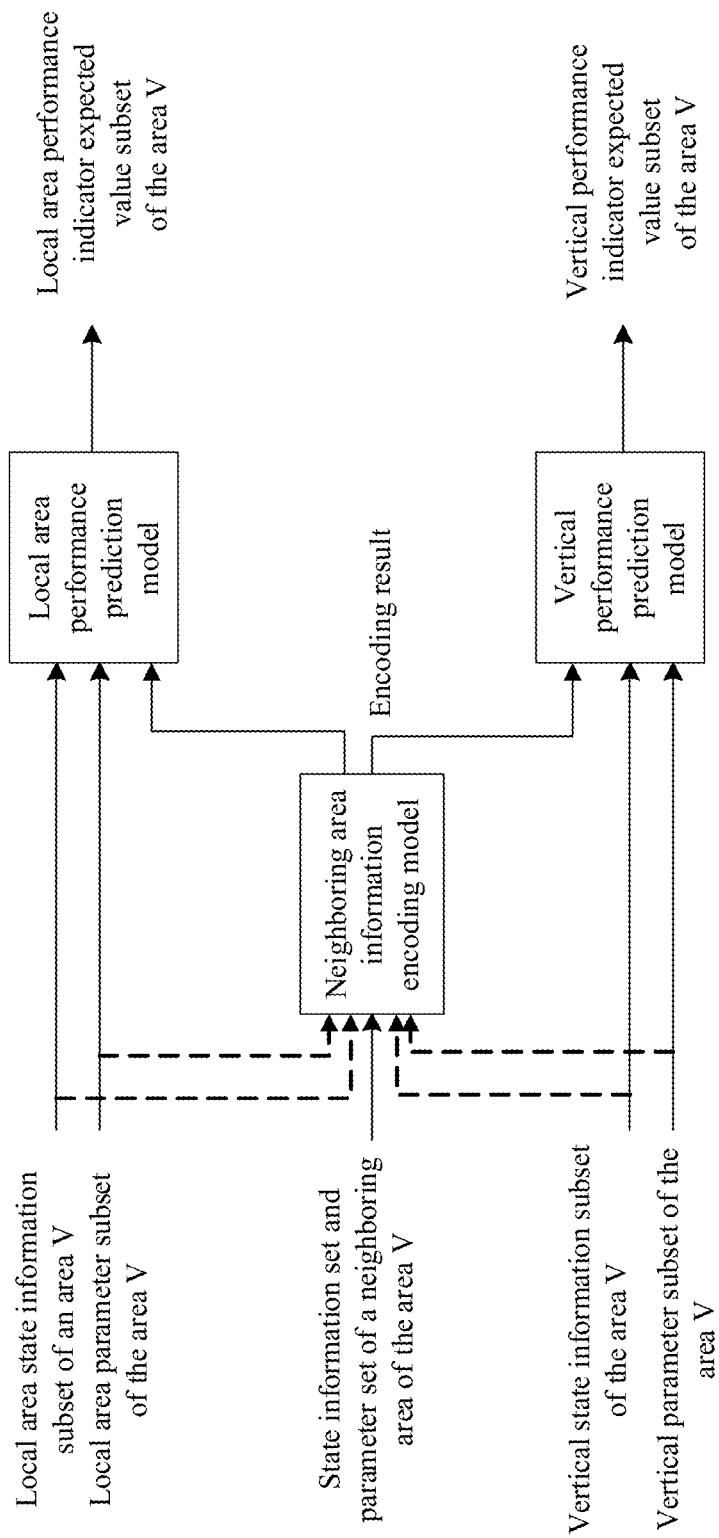
FIG. 10 is a schematic diagram of a structure of another parameter configuration model according to an embodiment.

Optionally, in another specific embodiment, as shown in FIG. 10, if the D dimensions include a local area dimension and a vertical dimension, a parameter configuration model of the area V includes a neighboring area information encoding model, a local area performance prediction model, and a vertical performance prediction model, parameter sets of the area V and a neighboring area thereof include local area parameter subsets and vertical parameter subsets, and state information sets of the area V and the neighboring area thereof include local area state information subsets and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Figure 11:
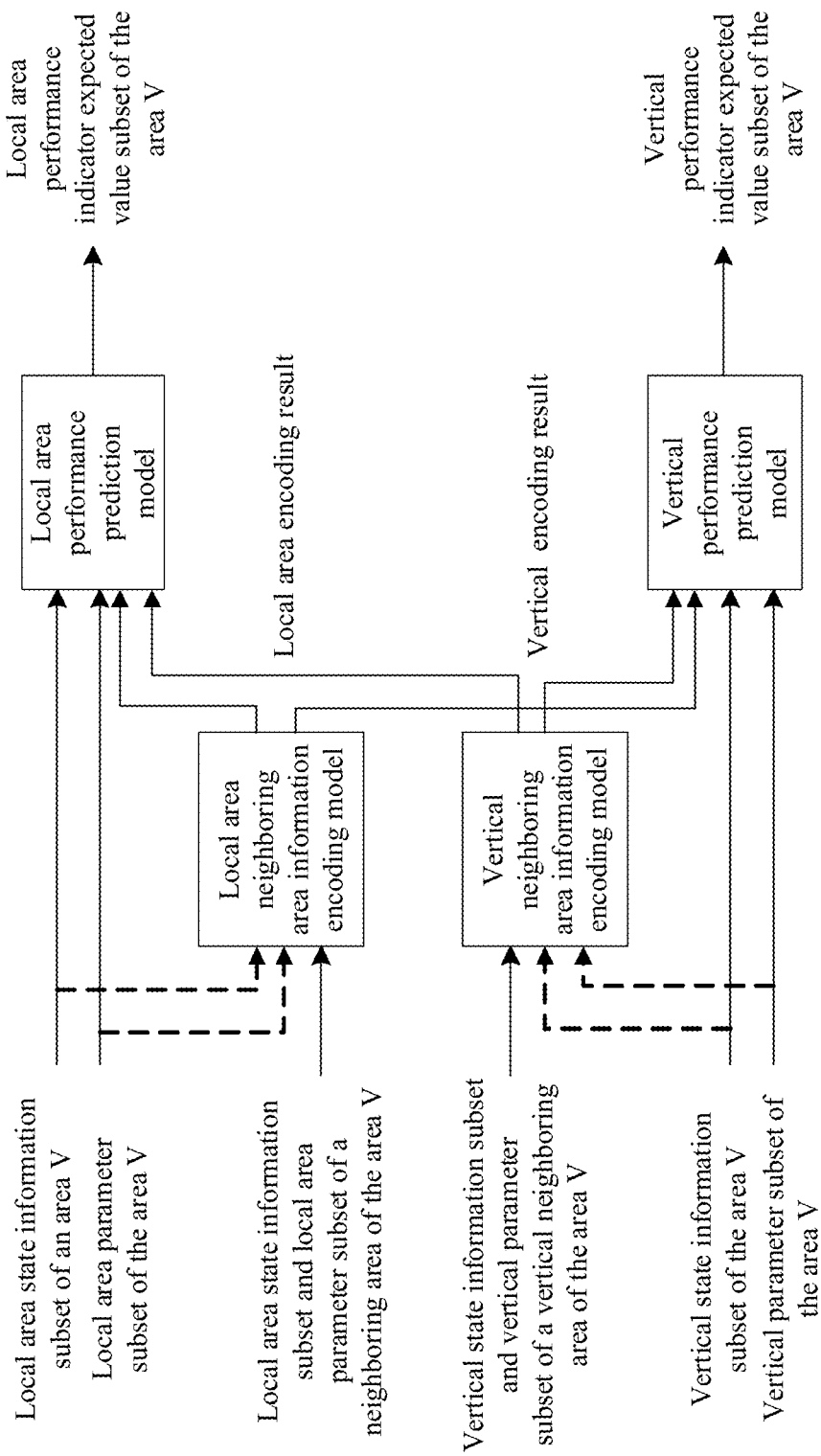
FIG. 11 is a schematic diagram of a structure of another parameter configuration model according to an embodiment.

Further, as shown in FIG. 11, the neighboring area information encoding model of the area V includes a local area neighboring area information encoding model and a vertical neighboring area information encoding model, the state information set of the neighboring area of the area V includes a vertical state information subset of a vertical neighboring area of the area V and a local area state information subset of the neighboring area of the area V, the parameter set of the neighboring area of the area V includes a vertical parameter subset of the vertical neighboring area of the area V and a local area parameter subset of the neighboring area of the area V, and the encoding result includes a local area encoding result and a vertical encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V includes the local area encoding result;

input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result; and input data of the local area performance prediction model of the area V includes the local area encoding result, the vertical encoding result, and the local area state information subset and the local area parameter subset of the area V; and input data of the vertical performance prediction model of the area V includes the local area encoding result, the vertical encoding result, and the vertical state information subset and the vertical parameter subset of the area V.

Figure 12:
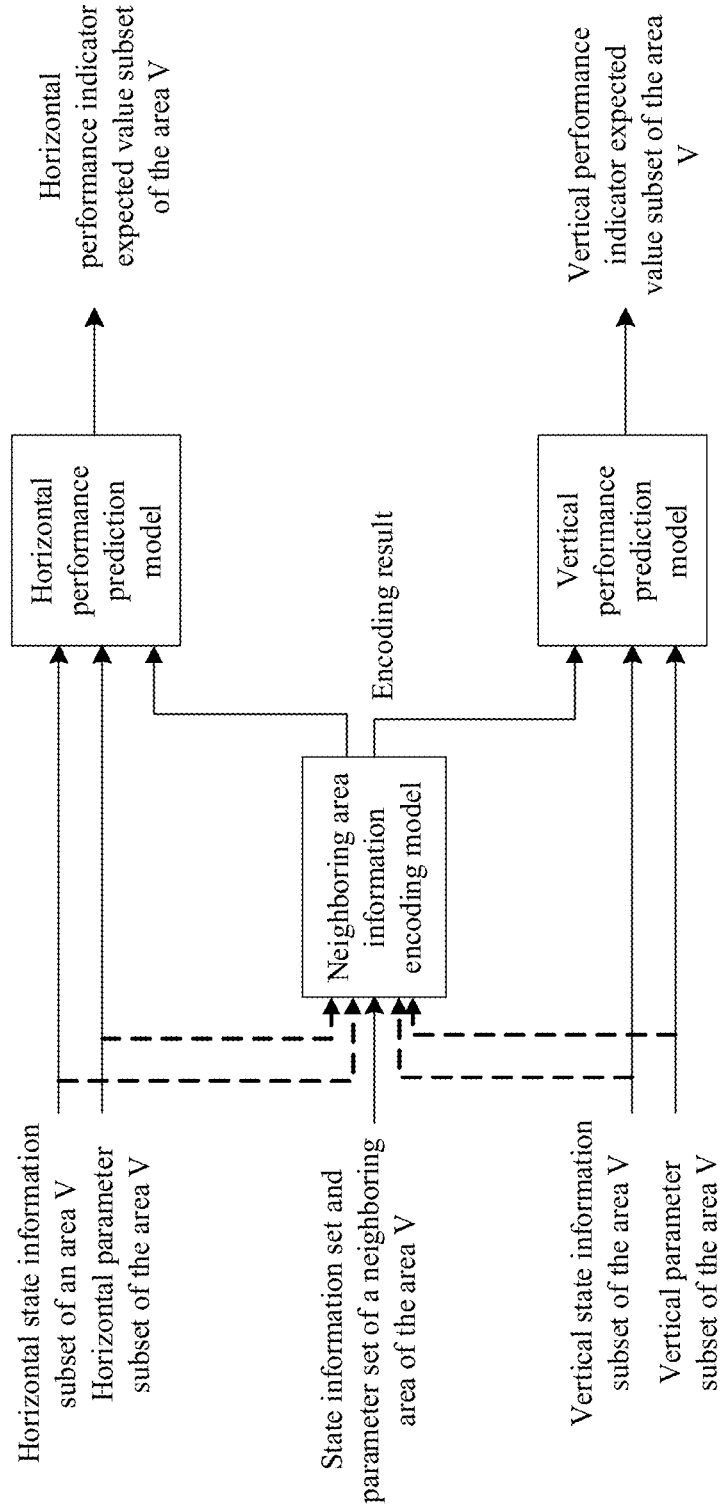
FIG. 12 is a schematic diagram of a structure of another parameter configuration model according to an embodiment.

Optionally, in another specific embodiment, as shown in FIG. 12, if the D dimensions include a horizontal dimension and a vertical dimension, a parameter configuration model of the area V includes a neighboring area information encoding model, a horizontal performance prediction model, and a vertical performance prediction model, parameter sets of the area V and a neighboring area thereof include horizontal parameter subsets and vertical parameter subsets, and state information sets of the area V and the neighboring area thereof include horizontal state information subsets and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Figure 13:
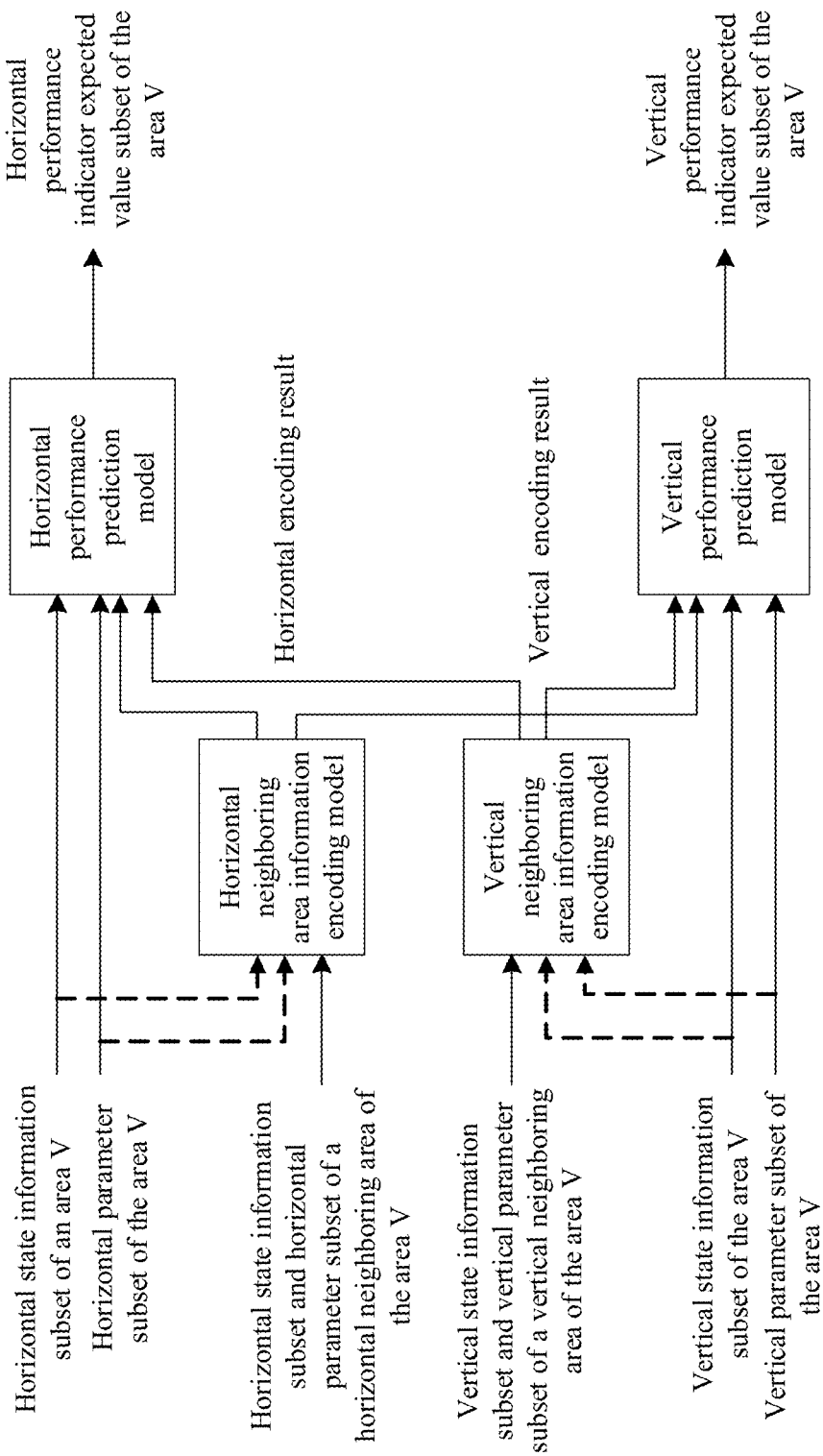
FIG. 13 is a schematic diagram of a structure of another parameter configuration model according to an embodiment.

Further, as shown in FIG. 13, the neighboring area information encoding model of the area V includes a horizontal neighboring area information encoding model and a vertical neighboring area information encoding model, the state information set of the neighboring area of the area V includes a vertical state information subset of a vertical neighboring area of the area V and a horizontal state information subset of a horizontal neighboring area of the area V, the parameter set of the neighboring area of the area V includes a vertical parameter subset of the vertical neighboring area of the area V and a horizontal parameter subset of the horizontal neighboring area of the area V, and the encoding result includes a horizontal encoding result and a vertical encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result;

input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result; and input data of the horizontal performance prediction model of the area V includes the horizontal encoding result, the vertical encoding result, and the horizontal state information subset and the vertical state information subset of the area V, and input data of the vertical performance prediction model of the area V includes the horizontal encoding result, the vertical encoding result, and the horizontal state information subset and the vertical state information subset of the area V.

Figure 14:
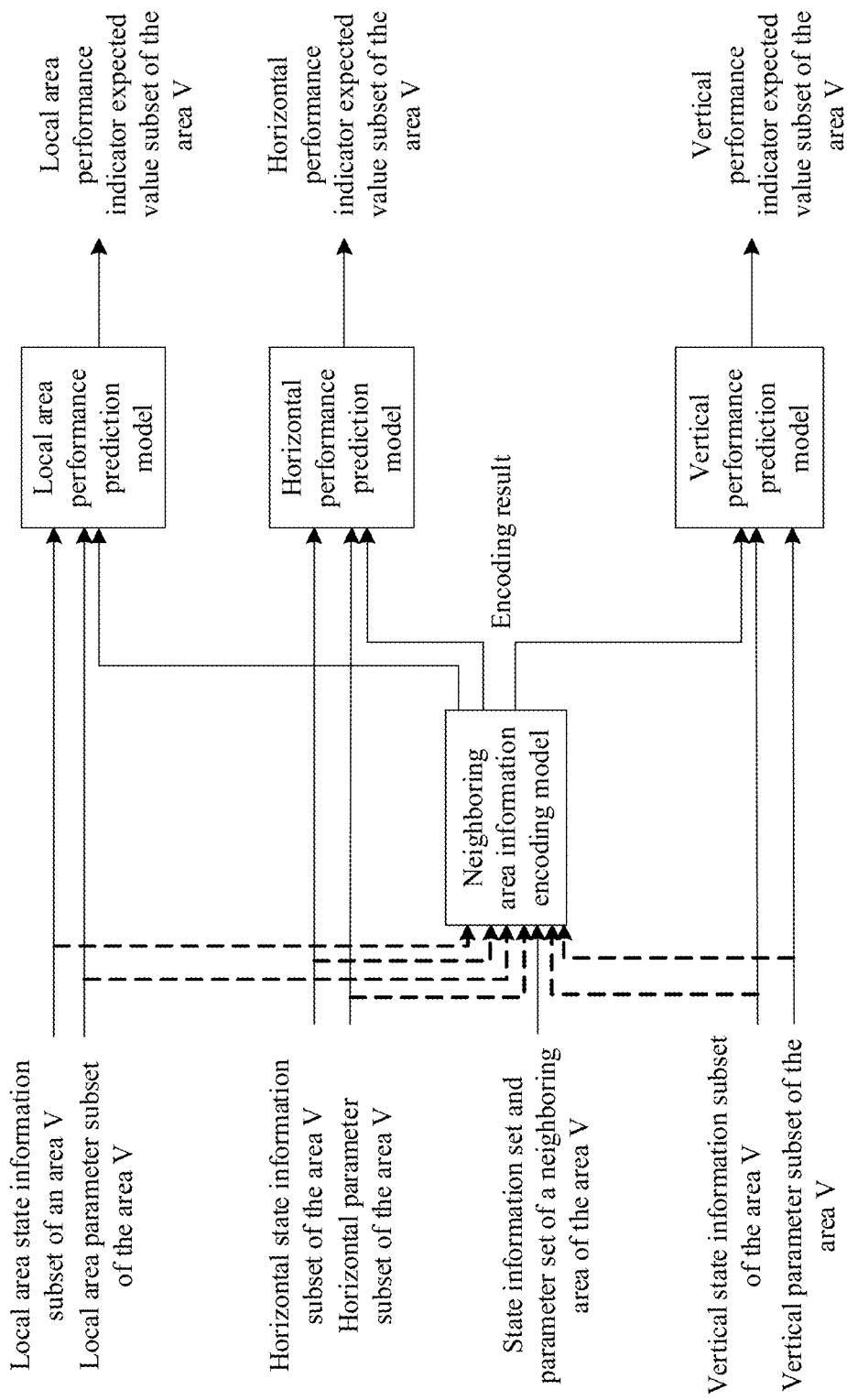
FIG. 14 is a schematic diagram of a structure of another parameter configuration model according to an embodiment.

Optionally, in another specific embodiment, as shown in FIG. 14, if the D dimensions include a local area dimension, a horizontal dimension, and a vertical dimension, a parameter configuration model of the area V includes a neighboring area information encoding model, a local area performance prediction model, a horizontal performance prediction model, and a vertical performance prediction model, parameter sets of the area V and a neighboring area thereof include local area parameter subsets, horizontal parameter subsets, and vertical parameter subsets, and state information sets of the area V and the neighboring area thereof include local area state information subsets, horizontal state information subsets, and vertical state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V;

input data of the horizontal performance prediction model of the area V includes the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V includes the encoding result, and the vertical state information subset and the vertical parameter subset of the area V, and output data of the vertical performance prediction model of the area V is a vertical performance indicator expected value subset of the area V.

Figure 15:
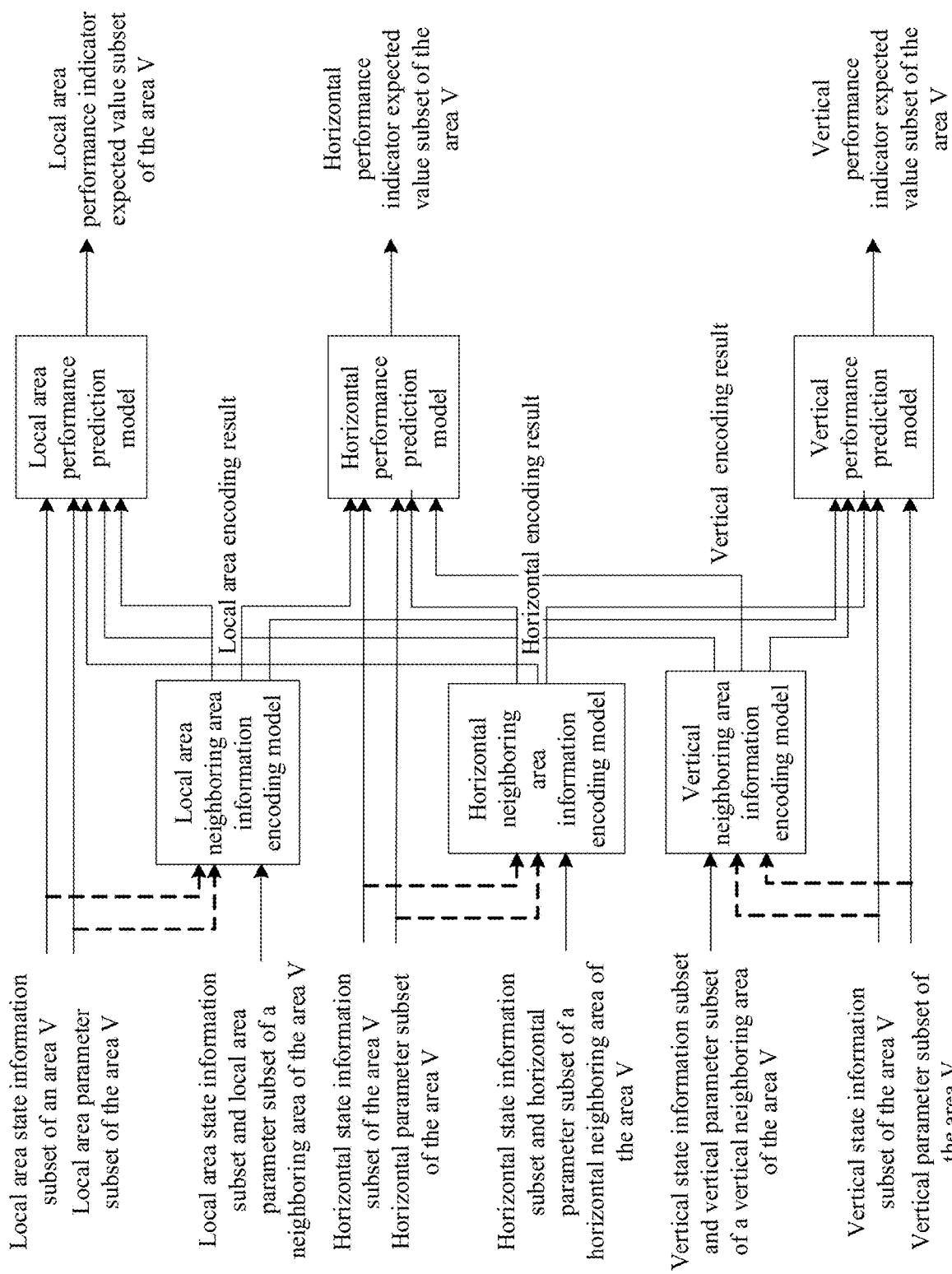
FIG. 15 is a schematic diagram of a structure of another parameter configuration model according to an embodiment.

Further, as shown in FIG. 15, the neighboring area information encoding model of the area V includes a local area neighboring area information encoding model, a horizontal neighboring area information encoding model, and a vertical neighboring area information encoding model, the state information set of the neighboring area of the area V includes a local area state information subset of the neighboring area of the area V, a vertical state information subset of a vertical neighboring area of the area V, and a horizontal state information subset of a horizontal neighboring area of the area V, the parameter set of the neighboring area of the area V includes a local area parameter subset of the neighboring area of the area V, a vertical parameter subset of the vertical neighboring area of the area V, and a horizontal parameter subset of the horizontal neighboring area of the area V, and the encoding result includes a local area encoding result, a horizontal encoding result, and a vertical encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V is the local area encoding result;

input data of the horizontal neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the horizontal neighboring area information encoding model of the area V is the horizontal encoding result;

input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result; and input data of the local area performance prediction model of the area V includes the local area encoding result, the horizontal encoding result, the vertical encoding result, and the local area state information subset and the local area parameter subset of the area V; input data of the horizontal performance prediction model of the area V includes the local area encoding result, the horizontal encoding result, the vertical encoding result, and the horizontal state information subset and the horizontal parameter subset of the area V; and input data of the vertical performance prediction model of the area V includes the local area encoding result, the horizontal encoding result, the vertical encoding result, and the vertical state information subset and the vertical parameter subset of the area V.

Optionally, in a feasible embodiment, the horizontal dimension includes an intra-frequency dimension and an inter-frequency dimension, the horizontal performance prediction model includes an intra-frequency performance prediction model and an inter-frequency performance prediction model, the horizontal performance indicator expected value subset includes an intra-frequency performance indicator expected value subset and an inter-frequency performance indicator expected value subset, the horizontal state information subsets of the area V and the horizontal neighboring area of the area V include intra-frequency state information subsets and inter-frequency state information subsets, and the horizontal parameter subsets of the area V and the horizontal neighboring area of the area V include intra-frequency parameter subsets and inter-frequency parameter subsets;

input data of the intra-frequency performance prediction model includes the encoding result, and the intra-frequency parameter subset in the horizontal parameter subset and the intra-frequency state information subset in the horizontal state information subset of the area V, and output data of the intra-frequency performance prediction model is the intra-frequency performance indicator expected value subset; and input data of the inter-frequency performance prediction model includes the encoding result, and the inter-frequency parameter subset in the horizontal parameter subset and the inter-frequency state information subset in the horizontal state information subset of the area V, and output data of the inter-frequency performance prediction model is the inter-frequency performance indicator expected value subset.

Further, the horizontal neighboring area information encoding model includes an intra-frequency neighboring area information encoding model and an inter-frequency neighboring area information encoding model, the horizontal state information subset of the horizontal neighboring area of the area V includes an intra-frequency state information subset of an intra-frequency neighboring area of the area V and an inter-frequency state information subset of an inter-frequency neighboring area of the area V among horizontal neighboring areas of the area V, the horizontal parameter subset of the horizontal neighboring area of the area V includes an intra-frequency parameter subset of the intra-frequency neighboring area of the area V and an inter-frequency parameter subset of the inter-frequency neighboring area of the area V among the horizontal neighboring areas of the area V, and the horizontal encoding result includes an intra-frequency encoding result and an inter-frequency encoding result;

input data of the intra-frequency neighboring area information encoding model includes the intra-frequency state information subset and the intra-frequency parameter subset of the intra-frequency neighboring area of the area V among the horizontal neighboring areas of the area V, or the intra-frequency state information subset in the horizontal state information subset of the area V and the intra-frequency parameter subset in the horizontal parameter subset of the area V and the intra-frequency state information subset and the intra-frequency parameter subset of the intra-frequency neighboring area of the area V among the horizontal neighboring areas of the area V, and output data of the intra-frequency neighboring area information encoding model is the intra-frequency encoding result; and input data of the inter-frequency neighboring area information encoding model includes the inter-frequency state information subset and the inter-frequency parameter subset of the inter-frequency neighboring area of the area V among the horizontal neighboring areas of the area V, or the inter-frequency state information subset in the horizontal state information subset of the area V and the inter-frequency parameter subset in the horizontal parameter subset of the area V and the inter-frequency state information subset and the inter-frequency parameter subset of the inter-frequency neighboring area of the area V among the horizontal neighboring areas of the area V, and output data of the inter-frequency neighboring area information encoding model is the inter-frequency encoding result.

Figure 16:
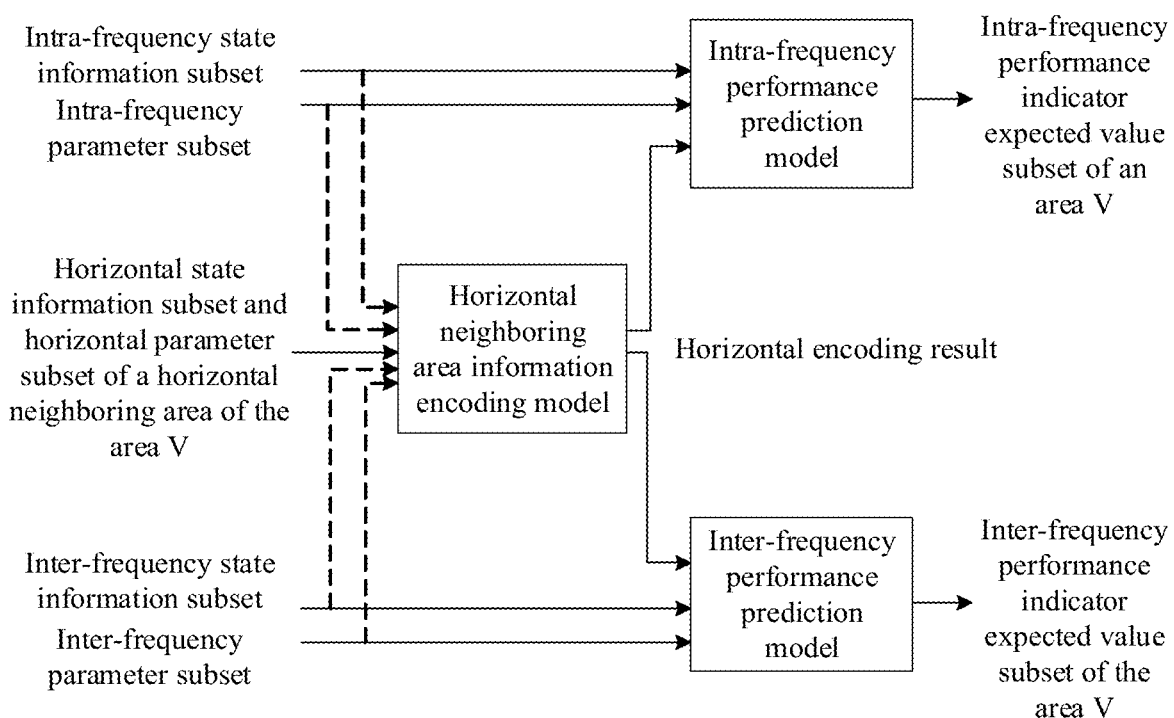
FIG. 16 is a schematic diagram of a structure of another parameter configuration model according to an embodiment.

In a specific example, as shown in FIG. 16, the parameter configuration model of the area V includes a neighboring area information encoding model, an intra-frequency performance prediction model, and an inter-frequency performance prediction model, the horizontal parameter subsets of the area V and the horizontal neighboring area thereof include intra-frequency parameter subsets and inter-frequency parameter subsets, the horizontal state information subsets of the area V and the horizontal neighboring area thereof include intra-frequency state information subsets and inter-frequency state information subsets, and the horizontal performance indicator expected value subset of the area V includes an intra-frequency performance indicator expected value subset and an inter-frequency performance indicator expected value subset;

input data of the neighboring area information encoding model of the area V includes the horizontal state information subset and the horizontal parameter subset of the horizontal neighboring area of the area V, or the horizontal state information subset and the horizontal parameter subset of the area V and the horizontal state information subset and the horizontal parameter subset of the horizontal neighboring area of the area V, and output data of the intra-frequency neighboring area information encoding model of the area V is the horizontal encoding result;

input data of the intra-frequency performance prediction model of the area V includes the horizontal encoding result, and the intra-frequency state information subset in the horizontal state information subset of the area V and the intra-frequency parameter subset in the horizontal parameter subset of the area V, and output data of the intra-frequency performance prediction model of the area V is the intra-frequency performance indicator expected value subset of the area V; and input data of the inter-frequency performance prediction model of the area V includes the horizontal encoding result, and the inter-frequency state information subset in the horizontal state information subset of the area V and the inter-frequency parameter subset in the horizontal parameter subset of the area V, and output data of the inter-frequency performance prediction model of the area V is the inter-frequency performance indicator expected value subset of the area V.

Figure 17:
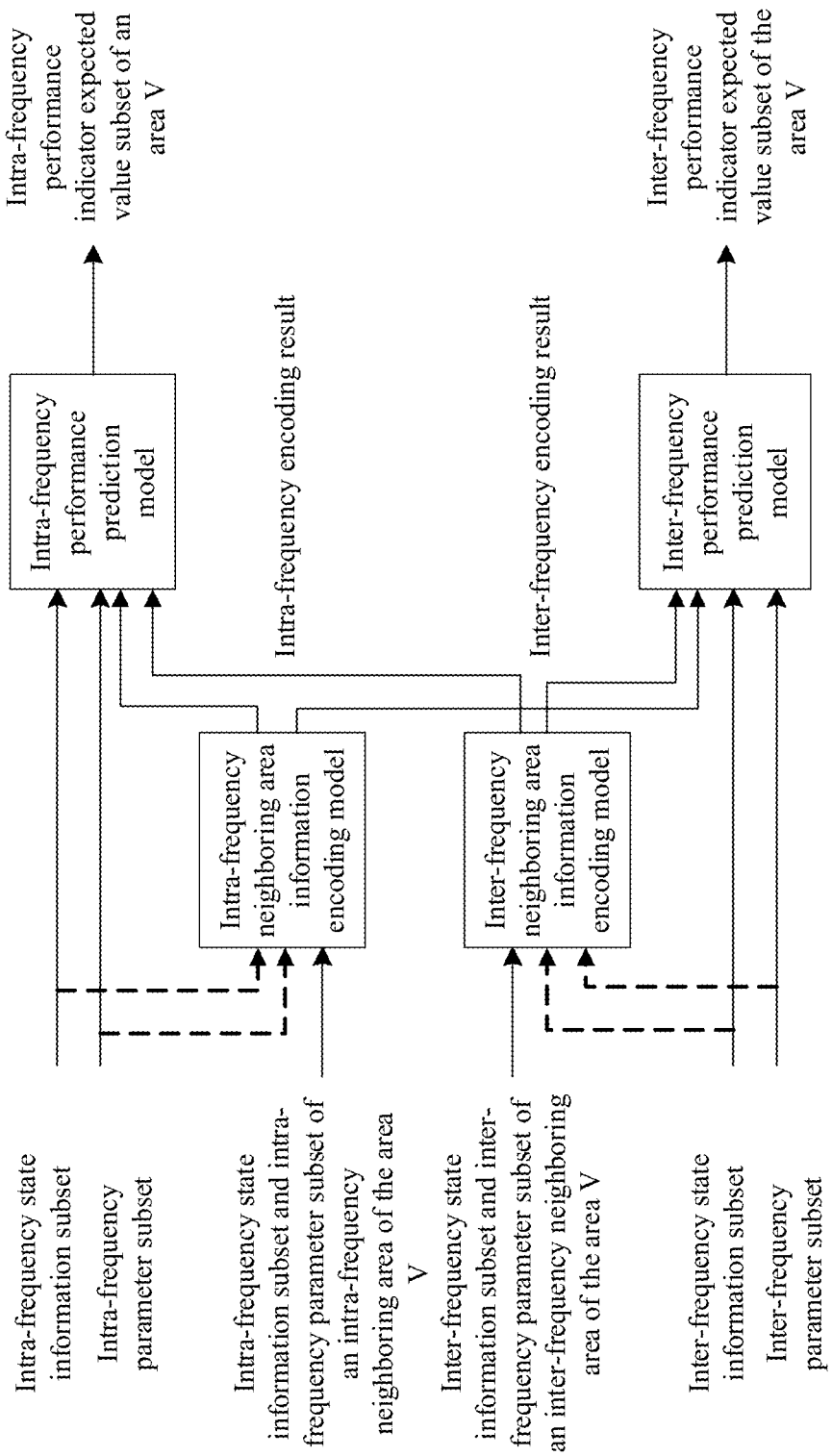
FIG. 17 is a schematic diagram of a structure of another parameter configuration model according to an embodiment.

Further, as shown in FIG. 17, the neighboring area information encoding model of the area V includes an intra-frequency neighboring area information encoding model and an inter-frequency neighboring area information encoding model, the state information set of the neighboring area of the area V includes an inter-frequency state information subset of an inter-frequency neighboring area of the area V and an intra-frequency state information subset of an intra-frequency neighboring area of the area V, the parameter set of the neighboring area of the area V includes an inter-frequency parameter subset of the inter-frequency neighboring area of the area V and an intra-frequency parameter subset of the intra-frequency neighboring area of the area V, and the horizontal encoding result includes an intra-frequency encoding result and an inter-frequency encoding result;
- input data of the intra-frequency neighboring area information encoding model of the area V includes the intra-frequency state information subset and the intra-frequency parameter subset of the intra-frequency neighboring area of the area V among horizontal neighboring areas of the area V, or the intra-frequency state information subset in the horizontal state information subset of the area V and the intra-frequency parameter subset in the horizontal parameter subset of the area V and the intra-frequency state information subset and the intra-frequency parameter subset of the intra-frequency neighboring area of the area V among the horizontal neighboring areas of the area V, and output data of the intra-frequency neighboring area information encoding model of the area V is the intra-frequency encoding result in the horizontal encoding result;
- input data of the inter-frequency neighboring area information encoding model of the area V includes the inter-frequency state information subset and the inter-frequency parameter subset of the inter-frequency neighboring area of the area V among the horizontal neighboring areas of the area V, or the inter-frequency state information subset in the horizontal state information subset of the area V and the inter-frequency parameter subset in the horizontal parameter subset of the area V and the inter-frequency state information subset and the inter-frequency parameter subset of the inter-frequency neighboring area of the area V among the horizontal neighboring areas of the area V, and output data of the inter-frequency neighboring area information encoding model of the area V is the inter-frequency encoding result in the horizontal encoding result; and
- input data of the intra-frequency performance prediction model of the area V includes the intra-frequency encoding result, the inter-frequency encoding result, and the intra-frequency state information subset in the horizontal state information and the intra-frequency parameter subset in the horizontal parameter subset of the area V, and input data of the inter-frequency performance prediction model of the area V includes the intra-frequency encoding result, the inter-frequency encoding result, and the inter-frequency state information subset in the horizontal state information and the inter-frequency parameter subset in the horizontal parameter subset of the area V.

Figure 18:
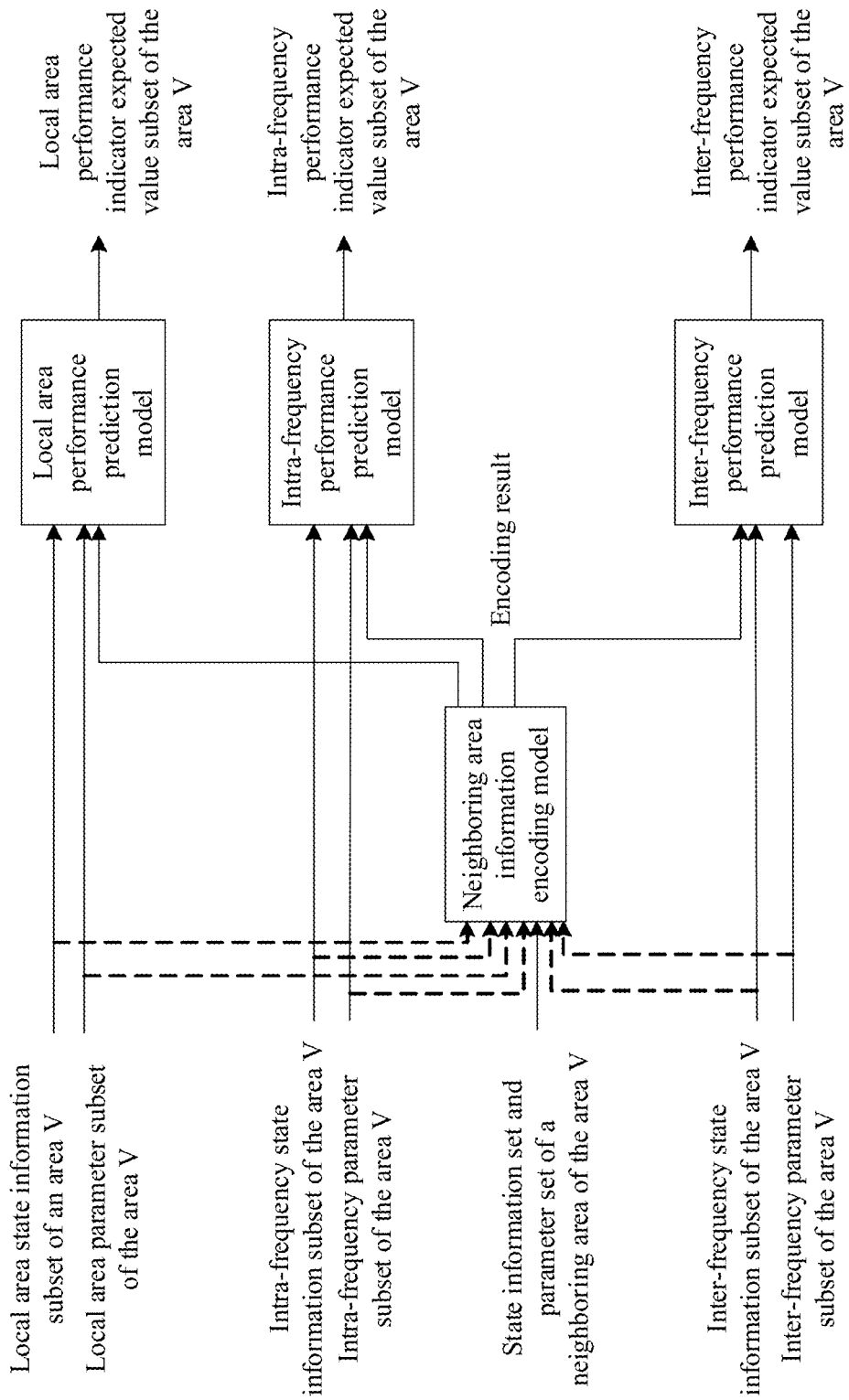
FIG. 18 is a schematic diagram of a structure of another parameter configuration model according to an embodiment.

In a specific example, as shown in FIG. 18, the parameter configuration model of the area V includes a neighboring area information encoding model, a local area performance prediction model, an intra-frequency performance prediction model, and an inter-frequency performance prediction model, the parameter sets of the area V and the neighboring area thereof include local area parameter subsets, intra-frequency parameter subsets, and inter-frequency parameter subsets, and the state information sets of the area V and the neighboring area thereof include local area state information subsets, intra-frequency state information subsets, and inter-frequency state information subsets;
- input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;
- input data of the local area performance prediction model of the area V includes the encoding result, and the local area state information subset and the local area parameter subset of the area V, and output data of the local area performance prediction model of the area V is a local area performance indicator expected value subset of the area V;
- input data of the intra-frequency performance prediction model of the area V includes the encoding result, and the intra-frequency state information subset and the intra-frequency parameter subset of the area V, and output data of the intra-frequency performance prediction model of the area V is an intra-frequency performance indicator expected value subset of the area V; and
- input data of the inter-frequency performance prediction model of the area V includes the encoding result, and the inter-frequency state information subset and the inter-frequency parameter subset of the area V, and output data of the inter-frequency performance prediction model of the area V is an inter-frequency performance indicator expected value subset of the area V.

Figure 19:
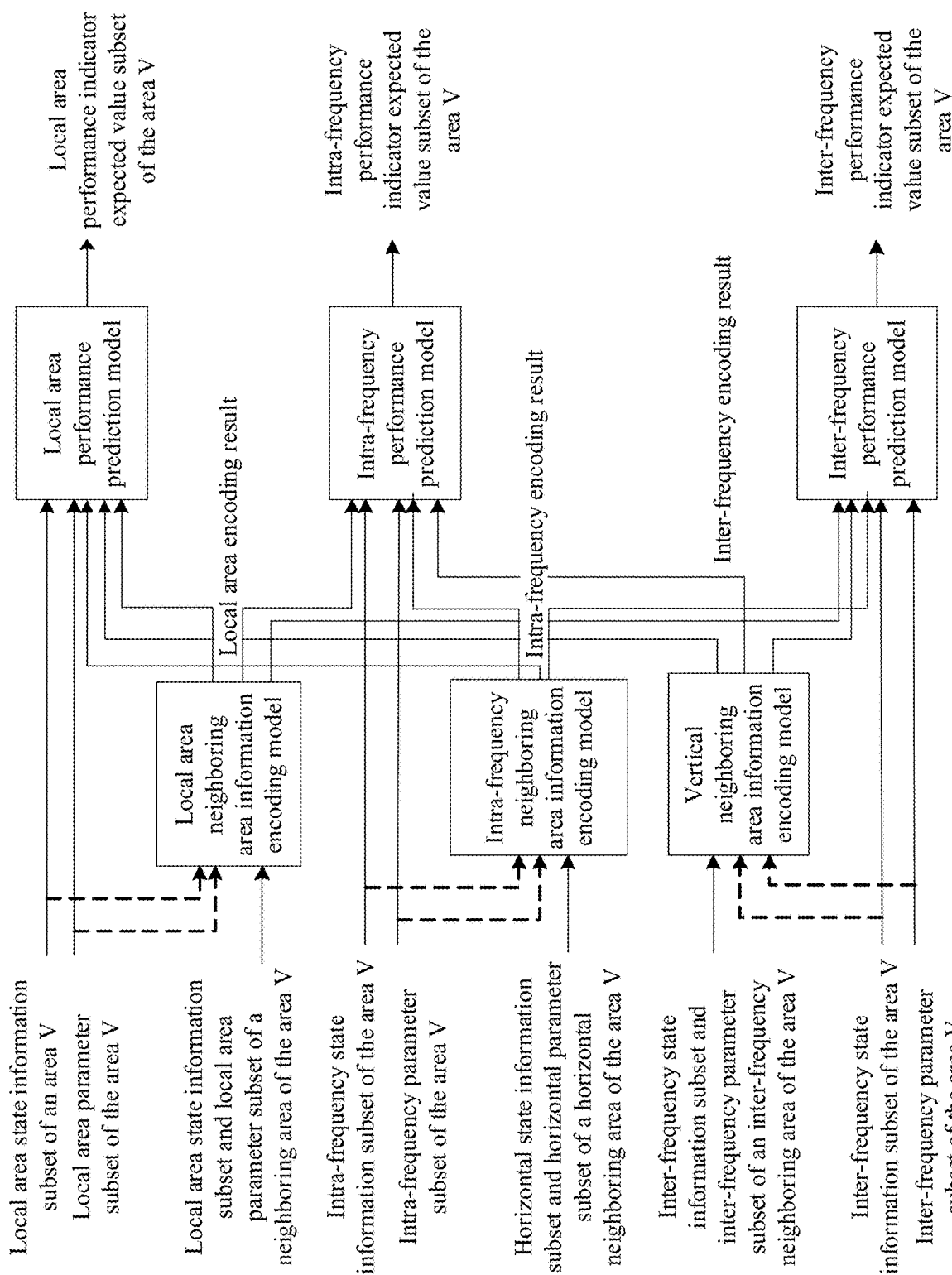
FIG. 19 is a schematic diagram of a structure of another parameter configuration model according to an embodiment.

Further, as shown in FIG. 19, the neighboring area information encoding model of the area V includes a local area neighboring area information encoding model, an intra-frequency neighboring area information encoding model, and an inter-frequency neighboring area information encoding model, the state information set of the neighboring area of the area V includes a local area state information subset of the neighboring area of the area V, an inter-frequency state information subset of an inter-frequency neighboring area of the area V, and an intra-frequency state information subset of an intra-frequency neighboring area of the area V, the parameter set of the neighboring area of the area V includes a local area parameter subset of the neighboring area of the area V, an inter-frequency parameter subset of the inter-frequency neighboring area of the area V, and an intra-frequency parameter subset of the intra-frequency neighboring area of the area V, and the encoding result includes a local area encoding result, an intra-frequency encoding result, and an inter-frequency encoding result;
- input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V is the local area encoding result;
- input data of the intra-frequency neighboring area information encoding model of the area V includes the intra-frequency state information subset and the intra-frequency parameter subset of the intra-frequency neighboring area of the area V, or the intra-frequency state information subset and the intra-frequency parameter subset of the area V and the intra-frequency state information subset and the intra-frequency parameter subset of the intra-frequency neighboring area of the area V, and output data of the intra-frequency neighboring area information encoding model of the area V is the intra-frequency encoding result;
- input data of the inter-frequency neighboring area information encoding model of the area V includes the inter-frequency state information subset and the inter-frequency parameter subset of the inter-frequency neighboring area of the area V, or the inter-frequency state information subset and the inter-frequency parameter subset of the area V and the inter-frequency state information subset and the inter-frequency parameter subset of the inter-frequency neighboring area of the area V, and output data of the inter-frequency neighboring area information encoding model of the area V is the inter-frequency encoding result; and input data of the local area performance prediction model of the area V includes the local area encoding result, the intra-frequency encoding result, the inter-frequency encoding result, and the local area state information subset and the local area parameter subset of the area V; input data of the intra-frequency performance prediction model of the area V includes the local area encoding result, the intra-frequency encoding result, the inter-frequency encoding result, and the intra-frequency state information subset and the intra-frequency parameter subset of the area V; and input data of the inter-frequency performance prediction model of the area V includes the local area encoding result, the intra-frequency encoding result, the inter-frequency encoding result, and the inter-frequency state information subset and the inter-frequency parameter subset of the area V.

Figure 20:
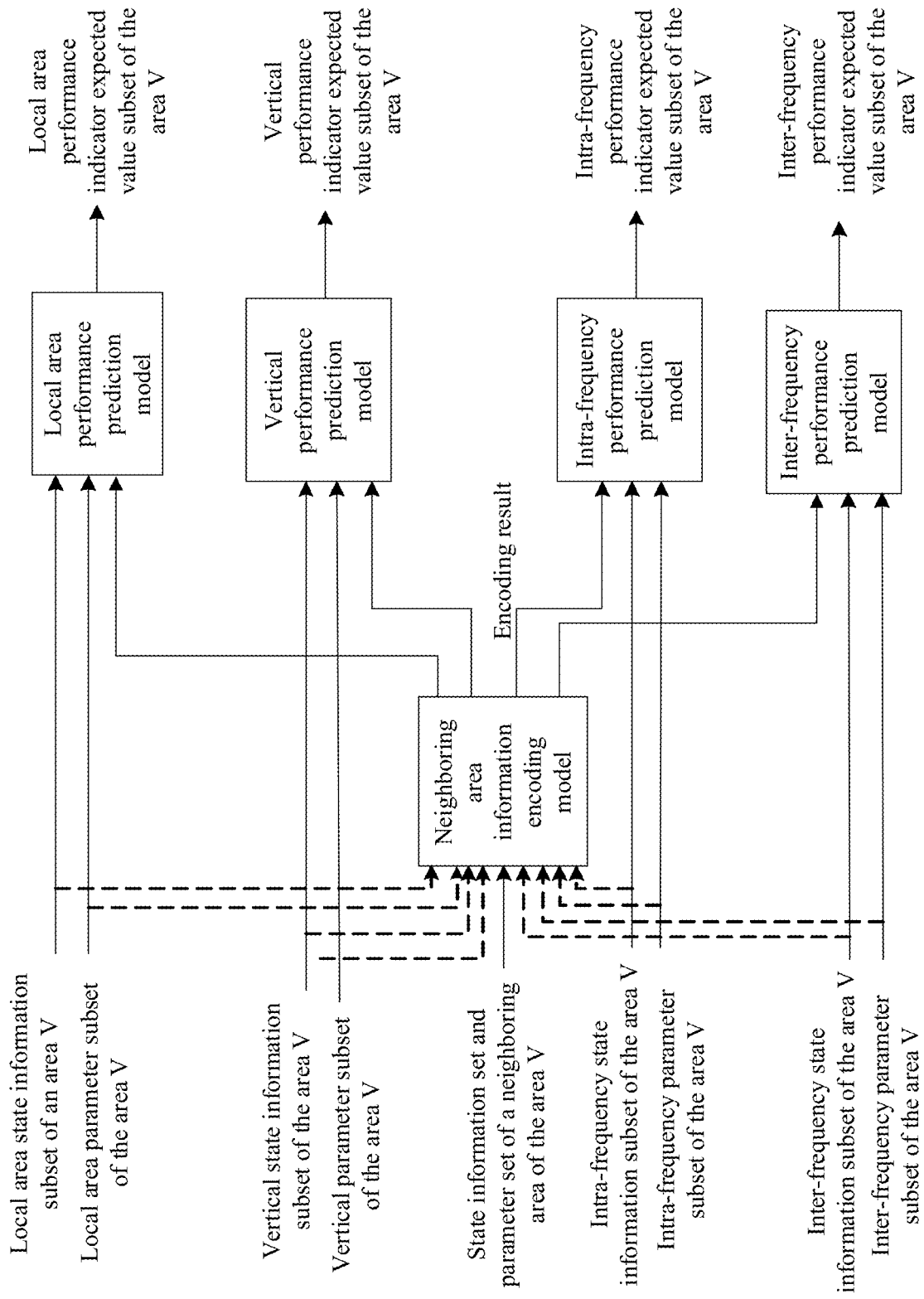
FIG. 20 is a schematic diagram of a structure of another parameter configuration model according to an embodiment.

In a specific example, as shown in FIG. 20, the parameter configuration model of the area V includes a neighboring area information encoding model, a local area performance prediction model, a vertical performance prediction model, an intra-frequency performance prediction model, and an inter-frequency performance prediction model, the parameter sets of the area V and the neighboring area thereof include local area parameter subsets, vertical parameter subsets, intra-frequency parameter subsets, and inter-frequency parameter subsets, and the state information sets of the area V and the neighboring area thereof include local area state information subsets, vertical state information subsets, intra-frequency state information subsets, and inter-frequency state information subsets;

input data of the neighboring area information encoding model of the area V includes the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V includes the encoding result, and the local area state information subset and the local area parameter subset of the area V, and output data of the local area performance prediction model of the area V is a local area performance indicator expected value subset of the area V;

input data of the vertical performance prediction model of the area V includes the encoding result, and the vertical state information subset and the vertical parameter subset of the area V, and output data of the vertical performance prediction model of the area V is a vertical performance indicator expected value subset of the area V;

input data of the intra-frequency performance prediction model of the area V includes the encoding result, and the intra-frequency state information subset and the intra-frequency parameter subset of the area V, and output data of the intra-frequency performance prediction model of the area V is an intra-frequency performance indicator expected value subset of the area V; and input data of the inter-frequency performance prediction model of the area V includes the encoding result, and the inter-frequency state information subset and the inter-frequency parameter subset of the area V, and output data of the inter-frequency performance prediction model of the area V is an inter-frequency performance indicator expected value subset of the area V.

Figure 21:
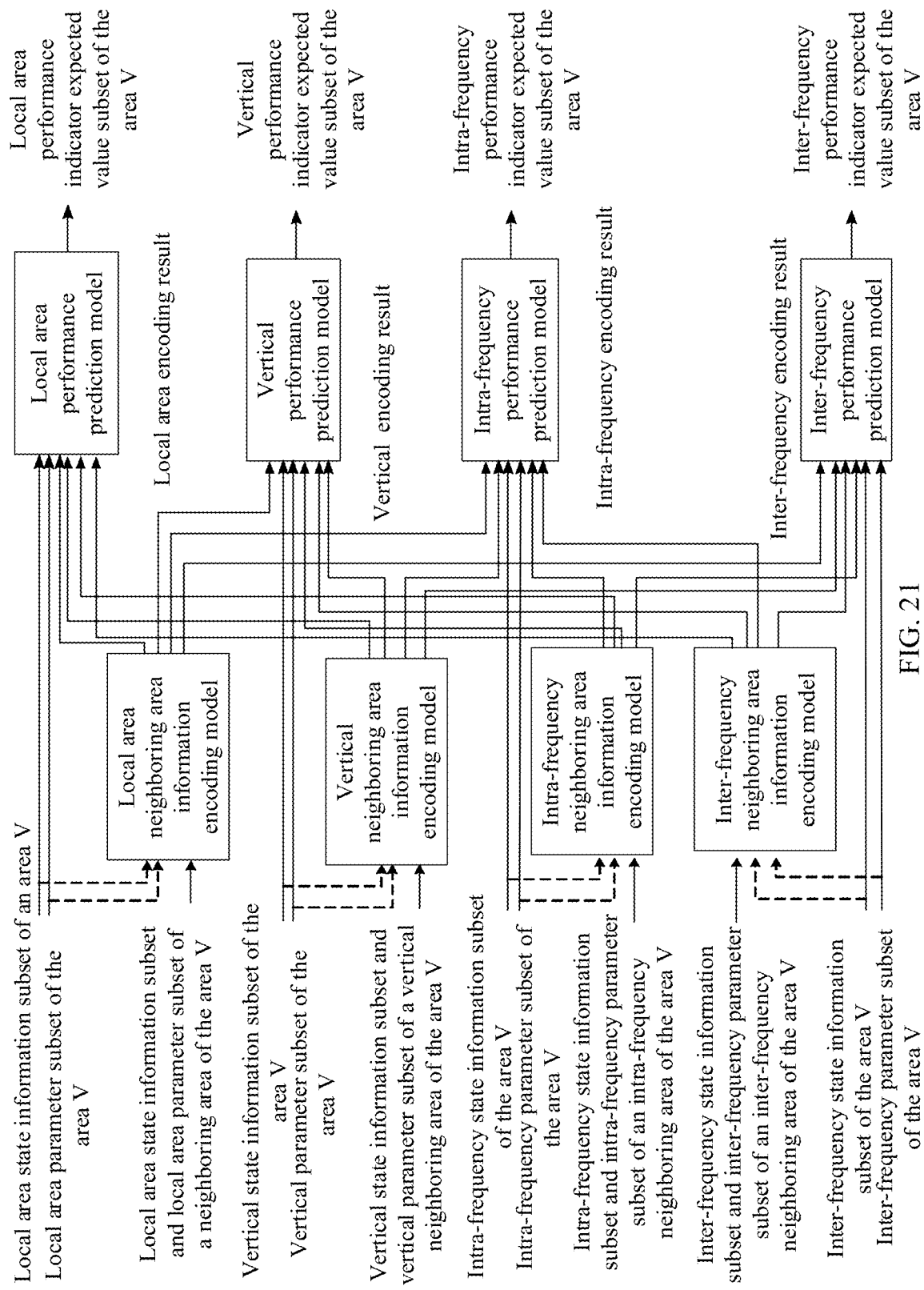
FIG. 21 is a schematic diagram of a structure of another parameter configuration model according to an embodiment.

Further, as shown in FIG. 21, the neighboring area information encoding model of the area V includes a local area neighboring area information encoding model, a vertical neighboring area information encoding model, an intra-frequency neighboring area information encoding model, and an inter-frequency neighboring area information encoding model, the state information set of the neighboring area of the area V includes a local area state information subset of the neighboring area of the area V, a vertical state information subset of the vertical neighboring area of the area V, an inter-frequency state information subset of an inter-frequency neighboring area of the area V, and an intra-frequency state information subset of an intra-frequency neighboring area of the area V, the parameter set of the neighboring area of the area V includes a local area parameter subset of the neighboring area of the area V, a vertical parameter subset of the vertical neighboring area of the area V, and an inter-frequency parameter subset of the inter-frequency neighboring area of the area V and an intra-frequency parameter subset of the intra-frequency neighboring area of the area V, and the encoding result includes a local area encoding result, a vertical encoding result, an intra-frequency encoding result, and an inter-frequency encoding result;

input data of the local neighboring area information encoding model of the area V includes the local area state information subset and the local area parameter subset of the neighboring area of the area V, or the local area state information subsets and the local area parameter subsets of the area V and the neighboring area thereof, and output data of the local area encoding model of the area V is the local area encoding result;

input data of the vertical neighboring area information encoding model of the area V includes the vertical state information subset and the vertical parameter subset of the vertical neighboring area of the area V, or the vertical state information subset and the vertical parameter subset of the area V and the vertical state information subset and the vertical parameter subset of the vertical neighboring area of the area V, and output data of the vertical neighboring area information encoding model of the area V is the vertical encoding result;

input data of the intra-frequency neighboring area information encoding model of the area V includes the intra-frequency state information subset and the intra-frequency parameter subset of the intra-frequency neighboring area of the area V, or the intra-frequency state information subset and the intra-frequency parameter subset of the area V and the intra-frequency state information subset and the intra-frequency parameter subset of the intra-frequency neighboring area of the area V, and output data of the intra-frequency neighboring area information encoding model of the area V is the intra-frequency encoding result;

input data of the inter-frequency neighboring area information encoding model of the area V includes the inter-frequency state information subset and the inter-frequency parameter subset of the inter-frequency neighboring area of the area V, or the inter-frequency state information subset and the inter-frequency parameter subset of the area V and the inter-frequency state information subset and the inter-frequency parameter subset of the inter-frequency neighboring area of the area V, and output data of the inter-frequency neighboring area information encoding model of the area V is the inter-frequency encoding result; and input data of the local area performance prediction model of the area V includes the local area encoding result, the vertical encoding result, the intra-frequency encoding result, the inter-frequency encoding result, and the local area state information subset and the local area parameter subset of the area V; input data of the vertical performance prediction model of the area V includes the local area encoding result, the vertical encoding result, the intra-frequency encoding result, the inter-frequency encoding result, and the vertical state information subset and the vertical parameter subset of the area V; input data of the intra-frequency performance prediction model of the area V includes the local area encoding result, the vertical encoding result, the intra-frequency encoding result, the inter-frequency encoding result, and the intra-frequency state information subset and the intra-frequency parameter subset of the area V; and input data of the inter-frequency performance prediction model of the area V includes the local area encoding result, the vertical encoding result, the intra-frequency encoding result, the inter-frequency encoding result, and the inter-frequency state information subset and the inter-frequency parameter subset of the area V.

It should be noted herein that when the method in this application is applied to a wireless cellular network, or the network is a wireless cellular network, the network device is a radio base station, and the area is a cell covered by the base station; or when the method in this application is applied to a Wi-Fi network, or the network is a Wi-Fi network, the network device is a Wi-Fi device, and the area is an area covered by the Wi-Fi device.

In a feasible embodiment, if the area is an area covered by the Wi-Fi device, and the area V is covered by signals of D frequency bands, the D dimensions are in a one-to-one correspondence with the D frequency bands.

Optionally, the neighboring area information encoding model may be obtained based on a long short term memory (long short term memory, LSTM) network, or may be obtained based on a transformer network, or may be obtained based on a deepset network.

When the neighboring area information encoding model is obtained based on the LSTM network, state information and parameter configuration information of a plurality of neighboring areas are used as an input sequence, where state information and parameter configuration information of each neighboring area are used as a time step of the input sequence; and after a plurality of time steps are input into the LSTM network, multi-step implicit state information is output, and the multi-step implicit state information is aggregated to obtain an aggregation result, where the aggregation result is an encoding result output by the neighboring area information encoding model; or when the neighboring area information encoding model is obtained based on the transformer network, state information and parameter configuration information of a plurality of neighboring areas are used as an input sequence of the transformer network, and are processed by single-layer or multi-layer multi-head self-attention (multi-head self-attention) and a fully connected network layer, where an obtained result is an encoding result output by the neighboring area information encoding model.

Optionally, the performance prediction model may be obtained based on a neural network, or may be obtained based on a kernel ridge regression (kernel ridge regression) method, or may be obtained based on a Gaussian process regression (gaussian process regression) method.

It should be noted herein that, for the foregoing neighboring area information encoding model, input state information sets or subsets or parameter sets or subsets of different quantities of areas are mainly processed to obtain a set or subset with a consistent state information length, or a set or subset with a consistent parameter length, so that the performance prediction model can subsequently use state information and parameters of different quantities of areas, thereby improving accuracy of obtained target parameters.

For example, for state information subsets of three areas that are input into the neighboring area information encoding model, each of the three areas includes values of two pieces of state information, and the values of the pieces of state information in the state information subsets of the three areas are added, and then an averaging operation is performed, or a weighted averaging operation or another operation is performed, to obtain a final value of the state information. In this way, for the state information subsets of the three areas, output data of the neighboring area information encoding model is a final area set including two pieces of state information.

For another example, for state information subsets of three areas that are input into the neighboring area information encoding model, each of the three areas includes values of two pieces of state information, and linear transformation is performed on values of two pieces of state information in any one of the three areas, to obtain a vector whose length is 2; and after linear transformation is performed on the two pieces of state information of each of the three areas, a 3*2 matrix may be obtained, and a maximum value of each column in the matrix is selected to form a vector with a length of 2, as output data of the neighboring area information encoding model for the state information subsets of the three areas.

Similarly, a parameter subset or set of an area may also be processed according to the foregoing method.

It should be noted that the foregoing two methods are merely intended to describe functions of the neighboring area information encoding model, but do not limit the functions of the neighboring area information encoding model.

S402. Perform negotiations based on the state information subsets in the D dimensions of each of the N areas to obtain target parameter subsets in the D dimensions of each of the N areas.

In a feasible embodiment, the performing negotiations based on the state information subsets in the D dimensions of each of the N areas to obtain target parameter subsets in the D dimensions of each of the N areas includes:

performing T rounds of negotiations based on the state information subsets in the D dimensions of each of the N areas to obtain T reference parameter sets and T performance indicator expected value sets, where the T reference parameter sets are in a one-to-one correspondence with the T performance indicator expected value sets, the T reference parameter sets include reference parameter subsets in the D dimensions of each of the N areas, the T performance indicator expected value sets include performance indicator expected value subsets in the D dimensions of each of the N areas, and T is an integer greater than 0; and determining a target parameter set from the T reference parameter sets based on the T performance indicator expected value sets, where the target parameter set includes the target parameter subsets in the D dimensions of each of the N areas.

Further, operational state information of the N areas includes neighboring area information in the D dimensions of the N areas, and the performing T rounds of negotiations based on the state information subsets in the D dimensions of each of the N areas to obtain T reference parameter sets and T performance indicator expected value sets includes:

when performing a $k^{th}$ round of negotiations, initializing a parameter set of each of the N areas to obtain an initial parameter set of each area, where the initial parameter set of each area includes parameter subsets in the D dimensions of the area;

obtaining a neighboring area in each of the D dimensions of each of the N areas based on the neighboring area information in the D dimensions of the N areas, where k=1, 2, . . . , T; and performing W inter-group negotiations based on the state information subsets in the D dimensions and initial parameter subsets in the D dimensions of each of the N areas and neighboring areas thereof in the D dimensions to obtain a $k^{th}$ one of the T reference parameter sets and a $k^{th}$ one of the T performance indicator expected value sets, where W is an integer greater than 0.

Further, the performing W inter-group negotiations based on the state information subsets in the D dimensions and initial parameter subsets in the D dimensions of each of the N areas and neighboring areas thereof in the D dimensions to obtain a $k^{th}$ one of the T reference parameter sets and a $k^{th}$ one of the T performance indicator expected value sets includes:

S1: when performing a $g^{th}$ inter-group negotiation, marking each of the N areas as a non-negotiated area in the D dimensions, where g=1, 2, . . . , W;

S2: selecting, from non-negotiated areas, an area j marked as a non-negotiated area in any dimension A, performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A, marking the area j as a negotiated area in the dimension A, and marking an area that is marked as a non-negotiated area in the dimension A among neighboring areas of the area j in the dimension A, as a negotiated area in the dimension A, where the dimension A is any one of the D dimensions, and when g is equal to 1, the first parameter subset in the dimension A of the area j is an initial parameter subset in the dimension A of the area j, and among the neighboring areas of the area j in the dimension A, a first parameter subset in the dimension A of a non-negotiated area is an initial parameter subset in the dimension A of the area, and a first parameter subset in the dimension A of a negotiated area is obtained based on an initial parameter subset in the dimension A of the negotiated area; or when g is greater than 1, the first parameter subset in the dimension A of the area j is a second parameter subset in the dimension A of the area j after a $(g-1)^{th}$ inter-group negotiation is performed, and among the neighboring areas of the area j in the dimension A, a first parameter subset in the dimension A of a non-negotiated area is a second parameter subset in the dimension A of the area, and a first parameter subset in the dimension A of a negotiated area is obtained based on a second parameter subset of the area that is obtained after the $(g-1)^{th}$ inter-group negotiation is performed; and S3: repeating step S2 until each of the N areas is marked as a negotiated area in the D dimensions, where the $k^{th}$ one of the T reference parameter sets includes a reference parameter subset in each of the D dimensions of the area j, and the $k^{th}$ one of the T performance indicator expected value sets includes performance indicator expected value subsets in the D dimensions, obtained based on reference parameter subsets in the D dimensions of the area j and neighboring areas thereof in the D dimensions and state information subsets in the D dimensions of the area j and the neighboring areas thereof in the D dimensions; and reference parameter subsets in the dimension A of the area j and the neighboring area thereof in the dimension A are respectively second parameter subsets in the dimension A of the area j and the neighboring area thereof in the dimension A after a $W^{th}$ inter-group negotiation is performed.

Optionally, if an intersection set exists between a parameter subset in the dimension A and a parameter subset in another one of the D dimensions, when g=1, a value of a parameter P in a first parameter subset in the dimension A of a non-negotiated area in the dimension A is a value of the parameter P in a second parameter subset in a dimension B, and a value of a parameter other than the parameter P in the first parameter subset in the dimension A is a value in an initial parameter subset in the dimension A, where the dimension B is a dimension negotiated before the dimension A, and the parameter P is any parameter in the intersection set between the parameter subset in the dimension A and the parameter subset in the dimension B.

Further, the performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A includes:

performing a $q^{th}$ intra-group negotiation, and obtaining a third parameter subset $a_{Aqj}$ in the dimension A from a preconfigured parameter set based on a search algorithm, so that a preset performance indicator expected value of the area j is maximized, where the preset performance indicator expected value of the area j is obtained based on a performance indicator expected value subset in the dimension A of the area j, and the performance indicator expected value subset in the dimension A of the area j is obtained based on the state information subset in the dimension A and the third parameter subset $a_{Aqj}$ in the dimension A of the area j, the state information subset in the dimension A and a third parameter subset in the dimension A of the neighboring area of the area j in the dimension A, and a parameter configuration model of the area j;

obtaining, based on the search algorithm, a third configuration parameter $a_{Aqn}$ in the dimension A from the preconfigured parameter set, so that a preset performance indicator expected value of an area n is maximized, where the preset performance indicator expected value of the area n is obtained based on a performance indicator expected value in the dimension A of the area n, and the performance indicator expected value in the dimension A of the area n is obtained based on a state information subset in the dimension A and a third parameter subset $a_{Aqn}$ in the dimension A of the area n, a state information subset in the dimension A and a third parameter subset in the dimension A of a neighboring area of the area n in the dimension A, and a parameter configuration model of the area n, where the area n is any one of the neighboring areas of the area j in the dimension A, and the third parameter subset in the dimension A of the neighboring area of the area n in the dimension A includes the third parameter subset $a_{Aqj}$ in the dimension A of the area j; and when q=1, a third parameter subset $a_{Aqj}$ in the dimension A of the area n is a first parameter subset in the dimension A of the area n; or when q=S, the second parameter subset in the dimension A of the area j is the third parameter subset $a_{Aqj}$ in the dimension A of the area j, and a second parameter subset in the dimension A of the area n is the third parameter subset $a_{Aqn}$ in the dimension A of the area n.

When the preconfigured parameter set includes a small quantity of parameter subsets in the dimension A, an enumeration method may be used, and a corresponding quantity of performance indicator expected value subsets in the dimension A of the area j may be obtained by inputting each parameter subset in the dimension A in the preconfigured parameter set, a state information subset in the dimension A of the area j, and a state information subset in the dimension A and a third parameter subset in the dimension A of the neighboring area of the area j in the dimension A into the parameter configuration model of the area j; and a parameter subset in the dimension A, corresponding to the performance indicator expected value subset in the dimension A of the area j in which the preset performance indicator expected value is maximized, is determined as the third parameter subset $a_{Aqj}$ in the dimension A of the area j.

When the preconfigured parameter set includes a large quantity of parameter subsets in the dimension A, a coordinate ascent search algorithm or a gradient ascent search algorithm may be used to obtain the third parameter subset $a_{Aqj}$ in the dimension A of the area j.

The coordinate ascent search algorithm is as follows: Assuming that the parameter subset in the dimension A of the area j includes F parameters, first, values of F−1 parameters except the parameter P1 among the F parameters are fixed, and all values of the parameter P1 are traversed to obtain a plurality of parameter subsets; the plurality of parameter subsets are separately input with the state information subset in the dimension A of the area j, the state information subset in the dimension A and the third parameter subset in the dimension A of the neighboring area of the area j in the dimension A into the parameter configuration model of the area j to obtain the corresponding quantity of performance indicator expected value subsets in the dimension A of the area j; and a value of the parameter P1, corresponding to the performance indicator expected value subset in the dimension A of the area j in which the preset performance indicator expected value is maximized, is determined as a value of the parameter P1 in the third parameter subset $a_{Aqj}$ in the dimension A of the area j. According to this method, all parameters in the parameter subset are traversed successively, one parameter is adjusted each time, and a plurality of iterations are performed to finally obtain values of all parameters in the third parameter subset $a_{Aqj}$ in the dimension A of the area j.

The gradient ascent search algorithm is: inputting an initial parameter subset a and a state information subset, and obtaining a corresponding preset performance indicator expected value O according to the method described above; and calculating a gradient ascent direction of the preset performance indicator expected value at the initial parameter subset a, where the gradient ascent direction may be obtained through automatic calculation based on a neural network by using software, or may be obtained by performing calculation based on a linear model or another model with a mathematical form by using a derivation formula, or may be obtained by using a gradient estimation method:

randomly selecting a plurality of parameter subsets close to the initial parameter subset a, calculating a plurality of corresponding preset performance indicator expected values, comparing the plurality of preset performance indicator expected values with the preset performance indicator expected value O, estimating an ascent direction of the preset performance indicator expected value at a point a, superimposing an adjustment amount in the gradient ascent direction at the point a, and using a superimposed parameter subset a' as a new parameter subset; and repeating the foregoing steps until preset performance indicator expected values corresponding to a plurality of parameter subsets close to the newly obtained parameter subset are all less than a preset performance indicator expected value corresponding to the newly obtained parameter subset, and then determining the newly obtained parameter subset as the third parameter subset $a_{Aqj}$ in the dimension A of the area j.

Optionally, a preset performance indicator expected value of the area V is:

obtained based on a performance indicator expected value subset in the dimension A of the area V; or obtained based on a performance indicator expected value subset in the dimension A of the area V and a performance indicator expected value subset in the dimension A of a neighboring area of the area V in the dimension A; or obtained based on performance indicator expected value subsets in the D dimensions of the area V; or obtained based on performance indicator expected value subsets in the D dimensions of the area V and performance indicator expected value subsets in the D dimensions of neighboring areas of the area V.

The preset performance indicator expected value of the area V is obtained based on a performance indicator expected value subset in the dimension A of the area V and a performance indicator expected value subset in the dimension A of a neighboring area of the area V in the dimension A is that the preset performance indicator expected value of the area V is a sum or a weighted sum of the performance indicator expected value subset in the dimension A of the area V and the performance indicator expected value subset in the dimension A of the neighboring area of the area V in the dimension A;

that the preset performance indicator expected value of the area V is obtained based on performance indicator expected value subsets in the D dimensions of the area V is that the preset performance indicator expected value of the area V is a sum or a weighted sum of the performance indicator expected value subsets in the D dimensions of the area V; and that the preset performance indicator expected value of the area V is obtained based on performance indicator expected value subsets in the D dimensions of the area V and performance indicator expected value subsets in the D dimensions of neighboring areas of the area V is that the preset performance indicator expected value of the area V is a sum or a weighted sum of the performance indicator expected value subsets in the D dimensions of the area V and the performance indicator expected value subsets in the D dimensions of neighboring areas of the area V.

In a feasible embodiment, the determining the target parameter set from the T reference parameter sets based on the T performance indicator expected value sets includes:

separately calculating a performance value of each of the T reference parameter sets based on the T performance indicator expected value sets, where the performance value of each reference parameter set is a sum or a weighted sum of performance indicator expected value subsets in the D dimensions in a performance indicator expected value set corresponding to the reference parameter set; and determining, from the T reference parameter sets, a reference parameter set with a largest performance value as the target parameter set.

Optionally, in a feasible embodiment, in the dimension A, for a plurality of groups that do not include a common area, when intra-group negotiations are performed for areas in the plurality of groups, intra-group negotiations may be performed in parallel by using a group as a unit, thereby improving efficiency of inter-group negotiations.

Figure 22:
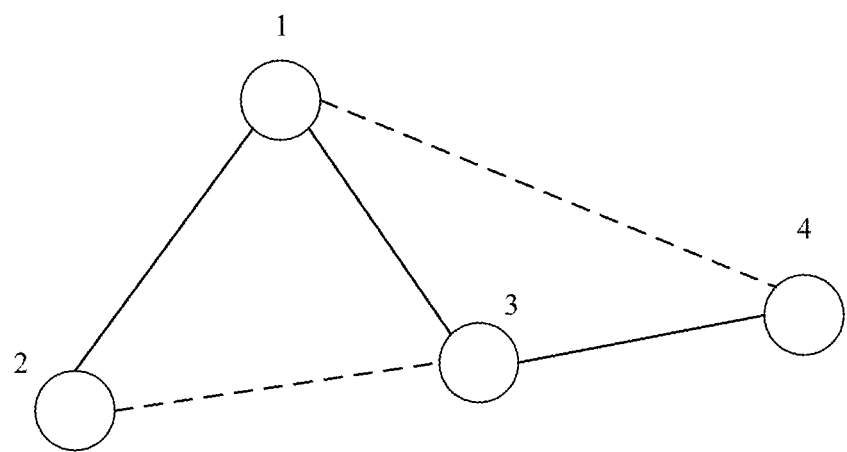
FIG. 22 is a schematic diagram of a negotiation process according to an embodiment.

For example, a wireless cellular network is used as an example. It is assumed that four cells on which performance optimization needs to be performed are cells 1, 2, 3, and 4 respectively. A topology structure of the four cells is shown in FIG. 22. A solid line between two cells indicates that the two cells are neighboring in a horizontal dimension, and a dashed line indicates that the two cells are neighboring in a vertical dimension. A horizontal state information subset and a vertical state information subset of each of the four cells are obtained, and the four cells are marked as non-negotiated cells in both the horizontal dimension and the vertical dimension; and parameter subsets of the four cells are initialized, to obtain initial parameter subsets of the four cells, where the parameter subset includes a vertical parameter subset and a horizontal parameter subset, the initial parameter subset includes a horizontal initial parameter subset and a vertical initial parameter subset, and the state information subset includes a vertical state information subset and a horizontal state information subset.

In the vertical dimension, the cell 1 and the cell 4 are grouped into one group, and the cell 2 and the cell 3 are grouped into one group.

Performing a first intra-group negotiation for the cell 1 and the cell 4 in the vertical dimension includes: obtaining a vertical parameter subset for the cell 1 from a preconfigured parameter set, and inputting the vertical parameter subset, the horizontal initial parameter subset of the cell 1, the vertical initial parameter subset of the cell 4, the horizontal initial parameter subsets, the horizontal state information subsets of the cell 2 and the cell 3, the state information subset of the cell 1, and the vertical state information subset of the cell 4 into a parameter configuration model of the cell 1 for calculation, to obtain a vertical expected indicator expected value subset $a_{111v}$ of the cell 1; then obtaining another vertical parameter subset for the cell 1 from the preconfigured parameter set based on a search algorithm, and inputting the vertical parameter subset, the horizontal initial parameter subset of the cell 1, the vertical initial parameter subset of the cell 4, the horizontal initial parameter subsets, the horizontal state information subsets of the cell 2 and the cell 3, the state information subset of the cell 1, and the vertical state information subset of the cell 4 into the parameter configuration model of the cell 1 for calculation, to obtain a vertical expected indicator expected value subset $a_{112v}$ of the cell 1, where the vertical expected indicator expected value subset $a_{112v}$ is greater than the vertical expected indicator expected value subset arm; and repeating the foregoing steps until a maximum vertical expected indicator expected value subset of the cell 1 is obtained, where a vertical parameter subset corresponding to the maximum vertical expected indicator expected value subset is a third parameter subset $a_{11v}$ in the vertical dimension of the cell 1; and obtaining a vertical parameter subset for the cell 4 from the preconfigured parameter set, and inputting the vertical parameter subset, the horizontal initial parameter subset of the cell 4, the third parameter subset au in the vertical dimension of the cell 1, the horizontal initial parameter subset and the horizontal state information subset of the cell 3, the vertical state information subset of the cell 1, and the state information subset of the cell 4 into a parameter configuration model of the cell 4 for calculation, to obtain a vertical expected indicator expected value $a_{141v}$ of the cell 4; then obtaining another vertical parameter subset for the cell 4 from the preconfigured parameter set based on the search algorithm, and inputting the vertical parameter subset, the horizontal initial parameter subset of the cell 4, the third parameter subset au in the vertical dimension of the cell 1, the horizontal initial parameter subset and the horizontal state information subset of the cell 3, the vertical state information subset of the cell 1, and the state information subset of the cell 4 into the parameter configuration model of the cell 4 for calculation, to obtain a vertical expected indicator expected value $a_{142v}$ of the cell 4, where the vertical expected indicator expected value $a_{142v}$ is greater than the vertical expected indicator expected value $a_{141v}$; and repeating the foregoing steps until a maximum vertical expected indicator expected value of the cell 4 is obtained, where a vertical parameter subset corresponding to the maximum vertical expected indicator expected value is a third parameter subset $a_{14v}$ in the vertical dimension of the cell 4. Up to now, the first intra-group negotiation in the vertical dimension for the cell 1 and the cell 4 is completed.

Performing a second intra-group negotiation for the cell 1 and the cell 4 in the vertical dimension includes: obtaining a vertical parameter subset for the cell 1 from the preconfigured parameter set, and inputting the vertical parameter subset, the horizontal initial parameter subset of the cell 1, the third parameter subset $a_{14v}$ in the vertical dimension of the cell 4, the horizontal initial parameter subsets, the horizontal state information subsets of the cell 2 and the cell 3, the state information subset of the cell 1, and the vertical state information subset of the cell 4 into the parameter configuration model of the cell 1 for calculation, to obtain a vertical expected indicator expected value subset $a_{211v}$ of the cell 1; then obtaining another vertical parameter subset for the cell 1 from the preconfigured parameter set based on the search algorithm, and inputting the vertical parameter subset, the horizontal initial parameter subset of the cell 1, the third parameter subset $a_{14_v}$ in the vertical dimension of the cell 4, the horizontal initial parameter subsets and the horizontal state information subsets of the cell 2 and the cell 3, the state information subset of the cell 1, and the vertical state information subset of the cell 4 into the parameter configuration model of the cell 1 for calculation, to obtain a vertical expected indicator expected value subset $a_{212_v}$ of the cell 1, where the vertical expected indicator expected value subset $a_{212}$ is greater than the vertical expected indicator expected value subset $a_{211_v}$; and repeating the foregoing steps until a maximum vertical expected indicator expected value subset of the cell 1 is obtained, where a vertical parameter subset corresponding to the maximum vertical expected indicator expected value subset is a third parameter subset $a_{21_v}$ in the vertical dimension of the cell 1; and obtaining a vertical parameter subset for the cell 4 from the preconfigured parameter set, and inputting the vertical parameter subset, the horizontal parameter subset of the cell 4, the third parameter subset $a_{21_v}$ in the vertical dimension of the cell 1, the horizontal initial parameter subset and the horizontal state information subset of the cell 3, the vertical state information subset of the cell 1, and the state information subset of the cell 4 into the parameter configuration model of the cell 4 for calculation, to obtain a vertical expected indicator expected value $a_{241_v}$ of the cell 4; then obtaining another vertical parameter subset for the cell 4 from the preconfigured parameter set based on the search algorithm, and inputting the vertical parameter subset, the horizontal parameter subset of the cell 4, the third parameter subset $a_{21_v}$ in the vertical dimension of the cell 1, the horizontal initial parameter subset and the horizontal state information subset of the cell 3, the vertical state information subset of the cell 1, and the state information subset of the cell 4 into the parameter configuration model of the cell 4 for calculation, to obtain a vertical expected indicator expected value $a_{242_v}$ of the cell 4, where the vertical expected indicator expected value $a_{242_v}$ is greater than the vertical expected indicator expected value $a_{241_v}$; and repeating the foregoing steps until a maximum vertical expected indicator expected value of the cell 4 is obtained, where a vertical parameter subset corresponding to the maximum vertical expected indicator expected value is a third parameter subset $a_{24_v}$ in the vertical dimension of the cell 4. Up to now, the second intra-group negotiation in the vertical dimension for the cell 1 and the cell 4 is completed.

According to the foregoing process, a plurality of intra-group negotiations in the vertical dimension for the cell 1 and the cell 4 may be completed. After the plurality of intra-group negotiations in the vertical dimension for the cell 1 and the cell 4 are completed, both the cell 1 and the cell 4 are marked as negotiated cells in the vertical dimension.

Performing a first intra-group negotiation for the cell 2 and the cell 3 in the vertical dimension includes: obtaining a vertical parameter subset for the cell 2 from the preconfigured parameter set, and inputting the vertical parameter subset, the horizontal initial parameter subset of the cell 2, the vertical initial parameter subset of the cell 3, the horizontal initial parameter subset and the horizontal state information subset of the cell 1, the state information subset of the cell 2, and the vertical state information subset of the cell 3 into a parameter configuration model of the cell 2 for calculation, to obtain a vertical expected indicator expected value subset $a_{121_v}$ of the cell 2; then obtaining another vertical parameter subset for the cell 2 from the preconfigured parameter set based on the search algorithm, and inputting the vertical parameter subset, the horizontal initial parameter subset of the cell 2, the vertical initial parameter subset of the cell 3, the horizontal initial parameter subset and the horizontal state information subset of the cell 1, the state information subset of the cell 2, and the vertical state information subset of the cell 3 into the parameter configuration model of the cell 2 for calculation, to obtain a vertical expected indicator expected value subset $a_{122_v}$ of the cell 2, where the vertical expected indicator expected value subset $a_{122_v}$ is greater than the vertical expected indicator expected value subset $a_{121_v}$; and repeating the foregoing steps until a maximum vertical expected indicator expected value subset of the cell 2 is obtained, where a vertical parameter subset corresponding to the maximum vertical expected indicator expected value subset is a third parameter subset $a_{12_v}$ in the vertical dimension of the cell 2; and obtaining a vertical parameter subset for the cell 3 from the preconfigured parameter set, and inputting the vertical parameter subset, the horizontal initial parameter subset of the cell 3, the third parameter subset $a_{12_v}$ in the vertical dimension of the cell 2, the horizontal initial parameter subsets and the horizontal state information subsets of the cell 1 and the cell 4, the vertical state information subset of the cell 2, and the state information subset of the cell 3 into a parameter configuration model of the cell 3 for calculation, to obtain a vertical expected indicator expected value $a_{13_v}$ of the cell 3; then obtaining another vertical parameter subset for the cell 3 from the preconfigured parameter set based on the search algorithm, and inputting the vertical parameter subset, the horizontal initial parameter subset of the cell 3, the third parameter subset $a_{12_v}$ in the vertical dimension of the cell 2, the horizontal initial parameter subsets and the horizontal state information subsets of the cell 1 and the cell 4, the vertical state information subset of the cell 2, and the state information subset of the cell 3 into the parameter configuration model of the cell 3 for calculation, to obtain a vertical expected indicator expected value $a_{132_v}$ of the cell 3, where the vertical expected indicator expected value $a_{132_v}$ is greater than the vertical expected indicator expected value $a_{131_v}$; and repeating the foregoing steps until a maximum vertical expected indicator expected value of the cell 3 is obtained, where a vertical parameter subset corresponding to the maximum vertical expected indicator expected value is a third parameter subset $a_{13_v}$ in the vertical dimension of the cell 3. Up to now, the first intra-group negotiation in the vertical dimension for the cell 2 and the cell 3 is completed.

Performing a second intra-group negotiation for the cell 2 and the cell 3 in the vertical dimension includes: obtaining a vertical parameter subset for the cell 2 from the preconfigured parameter set, and inputting the vertical parameter subset, the horizontal initial parameter subset of the cell 2, the third parameter subset $a_{13_v}$ in the vertical dimension of the cell 3, the horizontal initial parameter subset and the horizontal state information subset of the cell 1, the state information subset of the cell 2, and the vertical state information subset of the cell 3 into the parameter configuration model of the cell 2 for calculation, to obtain a vertical expected indicator expected value subset $a_{221_v}$ of the cell 2; then obtaining another vertical parameter subset for the cell 2 from the preconfigured parameter set based on the search algorithm, and inputting the vertical parameter subset, the horizontal initial parameter subset of the cell 2, the third parameter subset $a_{13v}$ in the vertical dimension of the cell 3, the horizontal initial parameter subset and the horizontal state information subset of the cell 1, the state information subset of the cell 2, and the vertical state information subset of the cell 3 into the parameter configuration model of the cell 2 for calculation, to obtain a vertical expected indicator expected value subset $a_{222v}$ of the cell 2, where the vertical expected indicator expected value subset $a_{222v}$ is greater than the vertical expected indicator expected value subset $a_{221v}$; and repeating the foregoing steps until a maximum vertical expected indicator expected value subset of the cell 2 is obtained, where a vertical parameter subset corresponding to the maximum vertical expected indicator expected value subset is a third parameter subset $a_{22v}$ in the vertical dimension of the cell 2; and obtaining a vertical parameter subset for the cell 3 from the preconfigured parameter set, and inputting the vertical parameter subset, the horizontal parameter subset of the cell 3, the third parameter subset $a_{21v}$ in the vertical dimension of the cell 2, the horizontal initial parameter subsets and the horizontal state information subsets of the cell 1 and the cell 4, the vertical state information subset of the cell 2, and the state information subset of the cell 3 into the parameter configuration model of the cell 3 for calculation, to obtain a vertical expected indicator expected value subset $a_{231v}$ of the cell 3; then obtaining another vertical parameter subset for the cell 3 from the preconfigured parameter set based on the search algorithm, and inputting the vertical parameter subset, the horizontal parameter subset of the cell 3, the third parameter subset $a_{22v}$ in the vertical dimension of the cell 2, the horizontal initial parameter subsets and the horizontal state information subsets of the cell 1 and the cell 4, the vertical state information subset of the cell 2, and the state information subset of the cell 3 into the parameter configuration model of the cell 3 for calculation, to obtain a vertical expected indicator expected value $a_{232v}$ of the cell 3, where the vertical expected indicator expected value $a_{232v}$ is greater than the vertical expected indicator expected value subset $a_{231v}$; and repeating the foregoing steps until a maximum vertical expected indicator expected value of the cell 3 is obtained, where a vertical parameter subset corresponding to the maximum vertical expected indicator expected value subset is a third parameter subset $a_{23v}$ in the vertical dimension of the cell 3. Up to now, the second intra-group negotiation in the vertical dimension for the cell 2 and the cell 3 is completed.

According to the foregoing process, a plurality of intra-group negotiations in the vertical dimension for the cell 2 and the cell 3 may be completed. After the plurality of intra-group negotiations in the vertical dimension for the cell 2 and the cell 3 are completed, both the cell 2 and the cell 3 are marked as negotiated cells in the vertical dimension.

In the horizontal dimension, the cell 1 and horizontal neighboring cells (cell 2 and cell 3) thereof are grouped into a group, and performing a first intra-group negotiation for the cell 1 and the horizontal neighboring cells thereof includes: obtaining a horizontal parameter subset for the cell 1 from the preconfigured parameter set, and inputting the horizontal parameter subset, the third parameter subset $a_{21v}$ in the vertical dimension of the cell 1, the horizontal initial parameter subsets of the cell 2 and the cell 3, the third parameter subset $a_{24v}$ in the vertical dimension of the cell 4, the vertical state information subset of the cell 4, the state information subset of the cell 1, and the horizontal state information subsets of the cell 2 and the cell 3 into the parameter configuration model of the cell 1 for calculation, to obtain a horizontal expected indicator expected value subset $a_{111h}$ of the cell 1; then obtaining another horizontal parameter subset for the cell 1 from the preconfigured parameters set based on the search algorithm, and inputting the horizontal parameter subset, the third parameter subset $a_{21v}$ in the vertical dimension of the cell 1, the horizontal initial parameter subsets of the cell 2 and the cell 3, the third parameter subset $a_{24v}$ in the vertical dimension of the cell 4, the vertical state information subset of the cell 4, the state information subset of the cell 1, and the horizontal state information subsets of the cell 2 and the cell 3 into the parameter configuration model of the cell 1 for calculation, to obtain a horizontal expected indicator expected value subset $a_{112h}$ of the cell 1, where the horizontal expected indicator expected value subset $a_{112h}$ is greater than the horizontal expected indicator expected value subset arm; and repeating the foregoing steps until a maximum horizontal expected indicator expected value of the cell 1 is obtained, where a horizontal parameter subset corresponding to the maximum horizontal expected indicator expected value subset is a third configuration parameter $a_{11h}$ in the horizontal dimension of the cell 1;

obtaining a horizontal parameter subset for the cell 2 from the preconfigured parameters, and inputting the horizontal parameter subset, the third parameter subset $a_{22v}$ in the vertical dimension of the cell 2, the third configuration parameter $a_{11h}$ in the horizontal dimension of the cell 1, the third parameter subset $a_{23v}$ in the vertical dimension of the cell 3, the vertical state information subset of the cell 3, the horizontal state information subset of the cell 1, and the state information subset of the cell 2 into the parameter configuration model of the cell 2 for calculation, to obtain a horizontal expected indicator expected value subset $a_{121h}$ of the cell 2; then obtaining another horizontal parameter subset for the cell 2 from the preconfigured parameters set based on the search algorithm, and inputting the horizontal parameter subset, the third parameter subset $a_{22v}$ in the vertical dimension of the cell 2, the third configuration parameter $a_{11h}$ in the horizontal dimension of the cell 1, the third parameter subset $a_{23v}$ in the vertical dimension of the cell 3, the vertical state information subset of the cell 3, the horizontal state information subset of the cell 1, and the state information subset of the cell 2 into the parameter configuration model of the cell 2 for calculation, to obtain a horizontal expected indicator expected value subset $a_{122h}$ of the cell 2, where the horizontal expected indicator expected value subset $a_{122h}$ is greater than the horizontal expected indicator expected value subset $a_{121h}$; and repeating the foregoing steps until a maximum horizontal expected indicator expected value subset of the cell 2 is obtained, where a horizontal parameter subset corresponding to the maximum horizontal expected indicator expected value subset is a third parameter subset $a_{121h}$ in the horizontal dimension of the cell 2; and obtaining a horizontal parameter subset for the cell 3 from the preconfigured parameters, and inputting the horizontal parameter subset, the third parameter subset $a_{23v}$ in the vertical dimension of the cell 3, the third parameter subset $a_{11h}$ in the horizontal dimension of the cell 1, the horizontal initial parameter subset of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a_{131h}$ of the cell 3; then obtaining another horizontal parameter subset for the cell 3 from the preconfigured parameters set based on the search algorithm, and inputting the horizontal parameter subset, the third parameter subset $a_{23v}$ in the vertical dimension of the cell 3, the third configuration parameter am in the horizontal dimension of the cell 1, the horizontal initial parameter subset of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a_{132h}$ of the cell 3, where the horizontal expected indicator expected value subset $a_{132h}$ is greater than the horizontal expected indicator expected value subset $a_{131h}$; and repeating the foregoing steps until a maximum horizontal expected indicator expected value subset of the cell 3 is obtained, where a horizontal parameter subset corresponding to the maximum horizontal expected indicator expected value subset is a third parameter subset $a_{13h}$ in the horizontal dimension of the cell 3. Up to now, the first intra-group negotiation in the horizontal dimension for the cell 1, the cell 2, and the cell 3 is completed.

Performing a second intra-group negotiation for the cell 1, the cell 2, and the cell 3 in the horizontal dimension includes:

obtaining a horizontal parameter subset for the cell 1 from the preconfigured parameter set, and inputting the horizontal parameter subset, the third parameter subset $a_{21v}$ in the vertical dimension of the cell 1, the third parameter subset $a_{12h}$ in the horizontal dimension of the cell 2, the third parameter subset $a_{13h}$ in the horizontal dimension of the cell 3, the third parameter subset $a_{24v}$ in the vertical dimension of the cell 4, the vertical state information subset of the cell 4, the state information subset of the cell 1, and the horizontal state information subsets of the cell 2 and the cell 3 into the parameter configuration model of the cell 1 for calculation, to obtain a horizontal expected indicator expected value subset $a_{211h}$ of the cell 1; then obtaining another horizontal parameter subset for the cell 1 from the preconfigured parameters set based on the search algorithm, and inputting the horizontal parameter subset, the third parameter subset $a_{21v}$ in the vertical dimension of the cell 1, the third parameter subset $a_{12h}$ in the horizontal dimension of the cell 2, the third parameter subset $a_{13h}$ in the horizontal dimension of the cell 3, the third parameter subset $a_{24v}$ in the vertical dimension of the cell 4, the vertical state information subset of the cell 4, the state information subset of the cell 1, and the horizontal state information subsets of the cell 2 and the cell 3 into the parameter configuration model of the cell 1 for calculation, to obtain a horizontal expected indicator expected value subset $a_{212h}$ of the cell 1, where the horizontal expected indicator expected value subset $a_{212h}$ is greater than the horizontal expected indicator expected value subset $a_{211h}$; and repeating the foregoing steps until a maximum horizontal expected indicator expected value of the cell 1 is obtained, where a horizontal parameter subset corresponding to the maximum horizontal expected indicator expected value subset is a third parameter subset $a_{21h}$ in the horizontal dimension of the cell 1;

obtaining a horizontal parameter subset for the cell 2 from the preconfigured parameter set, and inputting the horizontal parameter subset, the third parameter subset $a_{22v}$ in the vertical dimension of the cell 2, the third parameter subset $a_{21h}$ in the horizontal dimension of the cell 1, the third parameter subset $a_{23v}$ in the vertical dimension of the cell 3, the vertical state information subset of the cell 3, the horizontal state information subset of the cell 1, and the state information subset of the cell 2 into the parameter configuration model of the cell 2 for calculation, to obtain a horizontal expected indicator expected value subset $a_{221h}$ of the cell 2; then obtaining another horizontal parameter subset for the cell 2 from the preconfigured parameter set based on the search algorithm, and inputting the horizontal parameter subset, the third parameter subset $a_{22v}$ in the vertical dimension of the cell 2, the third configuration parameter $a_{21h}$ in the horizontal dimension of the cell 1, the third parameter subset $a_{23v}$ in the vertical dimension of the cell 3, the vertical state information subset of the cell 3, the horizontal state information subset of the cell 1, and the state information subset of the cell 2 into the parameter configuration model of the cell 2 for calculation, to obtain a horizontal expected indicator expected value subset $a_{222h}$ of the cell 2, where the horizontal expected indicator expected value subset $a_{222h}$ is greater than the horizontal expected indicator expected value subset $a_{221h}$; and repeating the foregoing steps until a maximum horizontal expected indicator expected value subset of the cell 2 is obtained, where a horizontal parameter subset corresponding to the maximum horizontal expected indicator expected value subset is a third parameter subset $a_{22h}$ in the horizontal dimension of the cell 2; and obtaining a horizontal parameter subset for the cell 3 from the preconfigured parameter set, and inputting the horizontal parameter subset, the third parameter subset $a_{23v}$ in the vertical dimension of the cell 3, the third parameter subset $a_{21h}$ in the horizontal dimension of the cell 1, the horizontal initial parameter subset of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a_{231h}$ of the cell 3; then obtaining another horizontal parameter subset for the cell 3 from the preconfigured parameters set based on the search algorithm, and inputting the horizontal parameter subset, the third parameter subset $a_{23v}$ in the vertical dimension of the cell 3, the third configuration parameter $a_{21h}$ in the horizontal dimension of the cell 1, the horizontal initial parameter subset of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a_{232h}$ of the cell 3, where the horizontal expected indicator expected value subset $a_{232h}$ is greater than the horizontal expected indicator expected value subset $a_{231h}$; and repeating the foregoing steps until a maximum horizontal expected indicator expected value subset of the cell 3 is obtained, where a horizontal parameter subset corresponding to the maximum horizontal expected indicator expected value subset is a third parameter subset $a_{231h}$ in the horizontal dimension of the cell 3. Up to now, the second intra-group negotiation in the horizontal dimension for the cell 1, the cell 2, and the cell 3 is completed.

According to the foregoing process, a plurality of intra-group negotiations in the horizontal dimension for the cell 1, the cell 2, and the cell 3 may be completed. After the intra-group negotiations in the horizontal dimension for the cell 1, the cell 2, and the cell 3 are completed, all the cell 1, the cell 2, and the cell 3 are marked as negotiated cells in the horizontal dimension.

In the horizontal dimension, the cell 3 and the cell 4 are grouped into a group. Performing a first intra-group negotiation for the cell 4 and the cell 3 in the horizontal dimension includes:

obtaining a horizontal parameter subset for the cell 4 from the preconfigured parameter set, and inputting the horizontal parameter subset, the third parameter subset $a_{24v}$ in the vertical dimension of the cell 4, the third parameter subset $a_{231h}$ in the horizontal dimension of the cell 3, the third parameter subset $a_{21v}$ in the vertical dimension of the cell 1, the vertical state information subset of the cell 1, the horizontal state information subset of the cell 3, and the state information subset of the cell 4 into the parameter configuration model of the cell 4 for calculation, to obtain a horizontal expected indicator expected value subset $a_{141h}$, of the cell 4; then obtaining another horizontal parameter subset for the cell 4 from the preconfigured parameter set based on the search algorithm, and inputting the horizontal parameter subset, the third parameter subset $a_{24v}$ in the vertical dimension of the cell 4, the third parameter subset $a_{231h}$ in the horizontal dimension of the cell 3, the third parameter subset $a_{21v}$ in the vertical dimension of the cell 1, the vertical state information subset of the cell 1, the horizontal state information subset of the cell 3, and the state information subset of the cell 4 into the parameter configuration model of the cell 4 for calculation, to obtain a horizontal expected indicator expected value subset $a_{142h}$ of the cell 4, where the horizontal expected indicator expected value subset $a_{142h}$ is greater than the horizontal expected indicator expected value subset $a_{141h}$; and repeating the foregoing steps until a maximum horizontal expected indicator expected value subset of the cell 4 is obtained, where a horizontal parameter subset corresponding to the maximum horizontal expected indicator expected value subset is a third parameter subset $a_{14h}$ in the horizontal dimension of the cell 4; and obtaining a horizontal parameter subset for the cell 3 from the preconfigured parameter set, and inputting the horizontal parameter subset, the third parameter subset $a_{23v}$ in the vertical dimension of the cell 3, the third parameter subset $a_{21h}$ in the horizontal dimension of the cell 1, the third parameter subset $a_{14h}$ in the horizontal dimension of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a'_{131h}$ of the cell 3; then obtaining another horizontal parameter subset for the cell 3 from the preconfigured parameter set based on the search algorithm, and inputting the horizontal parameter subset, the third parameter subset $a_{23v}$ in the vertical dimension of the cell 3, the third configuration parameter $a_{21h}$ in the horizontal dimension of the cell 1, the third parameter subset $a_{14h}$ in the horizontal dimension of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a'^{132h}$ of the cell 3, where the horizontal expected indicator expected value subset $a'^{132h}$ is greater than the horizontal expected indicator expected value subset $a'^{131h}$; and repeating the foregoing steps until a maximum horizontal expected indicator expected value subset of the cell 3 is obtained, where a horizontal parameter subset corresponding to the maximum horizontal expected indicator expected value subset is a third parameter subset $a'_{13h}$ in the horizontal dimension of the cell 3. Up to now, the first intra-group negotiation in the horizontal dimension for the cell 1 and the cell 4 is completed.

Performing a second intra-group negotiation for the cell 4 and the cell 3 in the horizontal dimension includes:

obtaining a horizontal parameter subset for the cell 4 from the preconfigured parameter set, and inputting the horizontal parameter subset, the third parameter subset $a_{24v}$ in the vertical dimension of the cell 4, the third parameter subset $a'_{13h}$ in the horizontal dimension of the cell 3, the third parameter subset $a_{21v}$ in the vertical dimension of the cell 1, the vertical state information subset of the cell 1, the horizontal state information subset of the cell 3, and the state information subset of the cell 4 into the parameter configuration model of the cell 4 for calculation, to obtain a horizontal expected indicator expected value subset $a_{241h}$ of the cell 4; then obtaining another horizontal parameter subset for the cell 4 from the preconfigured parameter set based on the search algorithm, and inputting the horizontal parameter subset, the third parameter subset $a_{24v}$ in the vertical dimension of the cell 4, the third parameter subset $a'^{13h}$ in the horizontal dimension of the cell 3, the third parameter subset $a_{21v}$ in the vertical dimension of the cell 1, the vertical state information subset of the cell 1, the horizontal state information subset of the cell 3, and the state information subset of the cell 4 into the parameter configuration model of the cell 4 for calculation, to obtain a horizontal expected indicator expected value subset $a_{242h}$ of the cell 4, where the horizontal expected indicator expected value subset $a_{242h}$ is greater than the horizontal expected indicator expected value subset $a_{241h}$; and repeating the foregoing steps until a maximum horizontal expected indicator expected value subset of the cell 4 is obtained, where a horizontal parameter subset corresponding to the maximum horizontal expected indicator expected value subset is a third parameter subset $a_{241h}$ in the horizontal dimension of the cell 4; and obtaining a horizontal parameter subset for the cell 3 from the preconfigured parameter set, and inputting the horizontal parameter subset, the third parameter subset $a_{23v}$ in the vertical dimension of the cell 3, the third parameter subset $a_{21h}$ in the horizontal dimension of the cell 1, the third parameter subset $a_{241h}$ in the horizontal dimension of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a'_{231h}$ of the cell 3; then obtaining another horizontal parameter subset for the cell 3 from the preconfigured parameter set based on the search algorithm, and inputting the horizontal parameter subset, the third parameter subset $a_{23v}$ in the vertical dimension of the cell 3, the third configuration parameter an, in the horizontal dimension of the cell 1, the third parameter subset $a_{241h}$ in the horizontal dimension of the cell 4, the third parameter subset $a_{22v}$ in the vertical dimension of the cell 2, the vertical state information subset of the cell 2, the horizontal state information subsets of the cell 1 and the cell 4, and the state information subset of the cell 3 into the parameter configuration model of the cell 3 for calculation, to obtain a horizontal expected indicator expected value subset $a'_{232h}$ of the cell 3, where the horizontal expected indicator expected value subset $a'_{232h}$ is greater than the horizontal expected indicator expected value subset $a'_{231h}$; and repeating the foregoing steps until a maximum horizontal expected indicator expected value subset of the cell 3 is obtained, where a horizontal parameter subset corresponding to the maximum horizontal expected indicator expected value subset is a third parameter subset $a'_{231h}$ in the horizontal dimension of the cell 3. Up to now, the second intra-group negotiation in the horizontal dimension for the cell 3 and the cell 4 is completed.

According to the foregoing process, a plurality of intra-group negotiations in the horizontal dimension for the cell 3 and the cell 4 may be completed. After the intra-group negotiations in the horizontal dimension for the cell 3 and the cell 4 are completed, the cell 4 is marked as a negotiated cell in the horizontal dimension.

In this case, all the cells 1 To 4 are marked as negotiated cells in the horizontal dimension and the vertical dimension. Up to now, an inter-group negotiation for the cells 1 to 4 is completed. W inter-group negotiations for the cells 1 to 4 may be completed according to the foregoing method, but the initial parameter subset needs to be replaced with the third parameter subset of each cell after the previous inter-group negotiation. After the W inter-group negotiations are performed, obtained parameter subsets of the cells 1 to 4 in the horizontal dimension form a reference parameter set in the horizontal dimension, and obtained parameter subsets of the cells 1 to 4 in the vertical dimension form a reference parameter set in the vertical dimension. A performance indicator expected value set in the horizontal dimension is formed by horizontal performance indicator expected value subsets obtained through calculation after the horizontal parameter subset and the horizontal state information subset of each cell among the cells 1 to 4, the horizontal parameter subset and the horizontal state information subset of the horizontal neighboring area of the cell, and the vertical parameter subset and the vertical state information subset of the vertical neighboring area of the cell are input into the parameter configuration model of the cell. A performance indicator expected value set in the vertical dimension is formed by vertical performance indicator expected value subsets obtained through calculation after the vertical parameter subset and the vertical state information subset of each cell among the cells 1 to 4, the horizontal parameter subset and the horizontal state information subset of the horizontal neighboring area of the cell, and the vertical parameter subset and the vertical state information subset of the vertical neighboring area of the cell are input into the parameter configuration model of the cell.

According to the foregoing process, after T rounds of negotiations are performed, T reference parameter sets and corresponding T performance indicator expected value sets may be obtained.

In a feasible embodiment, for a parameter configuration model of an area, input data of the parameter configuration model includes not only state information subsets and parameter subsets of the area and neighboring areas thereof, but also area identifiers of the area and the neighboring areas thereof, so that an output performance indicator expected value subset is more accurate, and that a finally obtained target parameter set of the area is more accurate.

Figure 23D:
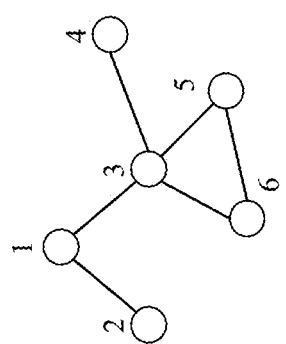
FIG. 23a, FIG. 23b, FIG. 23c, and FIG. 23d are a schematic diagram of another negotiation process according to an embodiment.
Figure 23C:
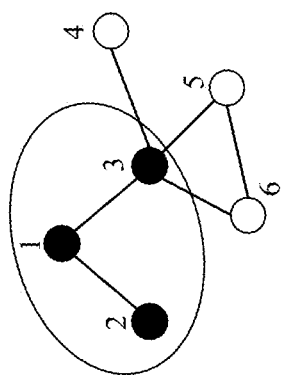
Figure 23B:
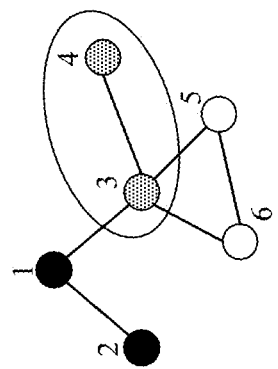
Figure 23A:
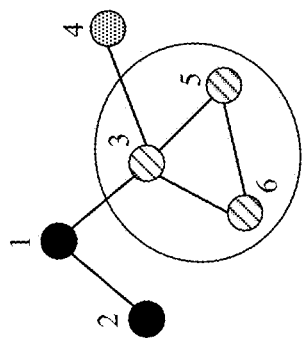

For a case in which dimensions of neighboring areas are not differentiated, an example is used for description. As shown in FIG. 23a, FIG. 23b, FIG. 23c, and FIG. 23d, a wireless cellular network is used as an example. It is assumed that six cells on which performance optimization needs to be performed are cells 1, 2, 3, 4, 5, and 6 respectively. A topology structure of the six cells is shown in FIG. 23a, where a straight line between two cells indicates that the two cells are neighboring cells of each other. State information of the six cells is obtained, and the six cells are marked as non-negotiated cells; and configuration parameters of the six cells are initialized to obtain initial configuration parameters of the six cells.

The cell 1 and neighboring cells thereof (including the cell 2 and the cell 3) are grouped into a group. Performing a first intra-group negotiation for the cell 1 and the neighboring cells thereof includes: obtaining a group of configuration parameters for the cell 1 from the preconfigured parameters, and inputting the group of configuration parameters, the initial configuration parameters of the cell 2 and the cell 3, and the state information of the cell 1, the cell 2, and the cell 3 into a parameter configuration model of the cell 1 for calculation, to obtain an expected indicator expected value am of the cell 1; then obtaining another group of configuration parameters for the cell 1 from the preconfigured parameters set based on a search algorithm, and inputting the group of configuration parameters, the initial configuration parameters of the cell 2 and the cell 3, and the state information of the cell 1, the cell 2, and the cell 3 into the parameter configuration model of the cell 1 for calculation, to obtain an expected indicator expected value $a_{112}$ of the cell 1, where the expected indicator expected value $a_{112}$ is greater than the expected indicator expected value $a_{111}$; and repeating the foregoing steps until a maximum expected indicator expected value of the cell 1 is obtained, where a configuration parameter corresponding to the maximum expected indicator expected value is a third configuration parameter $a_{11}$ of the cell 1;

obtaining a group of configuration parameters for the cell 2 from the preconfigured parameters, and inputting the group of configuration parameters, the third configuration parameter an of the cell 1, and the state information of the cell 1 and the cell 2 into a parameter configuration model of the cell 2 for calculation, to obtain an expected indicator expected value $a_{121}$ of the cell 2; then obtaining another group of configuration parameters for the cell 2 from the preconfigured parameters set based on the search algorithm, and inputting the group of configuration parameters, the third configuration parameter an of the cell 1, and the state information of the cell 1 and the cell 2 into the parameter configuration model of the cell 2 for calculation, to obtain an expected indicator expected value $a_{122}$ of the cell 2, where the expected indicator expected value $a_{122}$ is greater than the expected indicator expected value $a_{121}$; and repeating the foregoing steps until a maximum expected indicator expected value of the cell 2 is obtained, where a configuration parameter corresponding to the maximum expected indicator expected value is a third configuration parameter $a_{12}$ of the cell 2; and obtaining a group of configuration parameters for the cell 3 from the preconfigured parameters, and inputting the group of configuration parameters, the third configuration parameter an of the cell 1, the initial configuration parameters of the cell 4, the cell 5, and the cell 6, and the state information of the cell 1, the cell 3, the cell 4, the cell 5, and the cell 6 into a parameter configuration model of the cell 3 for calculation, to obtain an expected indicator expected value $a_{131}$ of the cell 3; then obtaining another group of configuration parameters for the cell 3 from the preconfigured parameters set based on the search algorithm, and inputting the group of configuration parameters, the third configuration parameter an of the cell 1, the initial configuration parameters of the cell 4, the cell 5, and the cell 6, and the state information of the cell 1, the cell 3, the cell 4, the cell 5, and the cell 6 into the parameter configuration model of the cell 3 for calculation, to obtain an expected indicator expected value $a_{132}$ of the cell 3, where the expected indicator expected value $a_{132}$ is greater than the expected indicator expected value $a_{131}$; and repeating the foregoing steps until a maximum expected indicator expected value of the cell 3 is obtained, where a configuration parameter corresponding to the maximum expected indicator expected value is a third configuration parameter $a_{13}$ of the cell 3. Up to now, the first intra-group negotiation for the cell 1, the cell 2, and the cell 3 is completed.

Performing a second intra-group negotiation for the cell 1, the cell 2, and the cell 3 includes:

obtaining a group of configuration parameters for the cell 1 from the preconfigured parameters, and inputting the group of configuration parameters, the third configuration parameter $a_{12}$ of the cell 2, the third configuration parameter $a_{13}$ of the cell 3, and the state information of the cell 1, the cell 2, and the cell 3 into the parameter configuration model of the cell 1 for calculation, to obtain an expected indicator expected value $a_{211}$ of the cell 1; then obtaining another group of configuration parameters for the cell 1 from the preconfigured parameters set based on the search algorithm, and inputting the group of configuration parameters, the third configuration parameter $a_{12}$ of the cell 2, the third configuration parameter $a_{13}$ of the cell 3, and the state information of the cell 1, the cell 2, and the cell 3 into the parameter configuration model of the cell 1 for calculation, to obtain an expected indicator expected value $a_{212}$ of the cell 1, where the expected indicator expected value $a_{212}$ is greater than the expected indicator expected value $a_{211}$; and repeating the foregoing steps until a maximum expected indicator expected value of the cell 1 is obtained, where a configuration parameter corresponding to the maximum expected indicator expected value is a third configuration parameter $a_{21}$ of the cell 1;

obtaining a group of configuration parameters for the cell 2 from the preconfigured parameters, and inputting the group of configuration parameters, the third configuration parameter $a_{21}$ of the cell 1, and the state information of the cell 1 and the cell 2 into the parameter configuration model of the cell 2 for calculation, to obtain an expected indicator expected value $a_{221}$ of the cell 2; then obtaining another group of configuration parameters for the cell 2 from the preconfigured parameters set based on the search algorithm, and inputting the group of configuration parameters, the third configuration parameter $a_{21}$ of the cell 1, and the state information of the cell 1 and the cell 2 into the parameter configuration model of the cell 2 for calculation, to obtain an expected indicator expected value $a_{222}$ of the cell 2, where the expected indicator expected value $a_{222}$ is greater than the expected indicator expected value $a_{221}$; and repeating the foregoing steps until a maximum expected indicator expected value of the cell 2 is obtained, where a configuration parameter corresponding to the maximum expected indicator expected value is a third configuration parameter $a_{22}$ of the cell 2; and obtaining a group of configuration parameters for the cell 3 from the preconfigured parameters, and inputting the group of configuration parameters, the third configuration parameter $a_{21}$ of the cell 1, the initial configuration parameters of the cell 4, the cell 5, and the cell 6, and the state information of the cell 1, the cell 3, the cell 4, the cell 5, and the cell 6 into the parameter configuration model of the cell 3 for calculation, to obtain an expected indicator expected value $a_{231}$ of the cell 3; then obtaining another group of configuration parameters for the cell 3 from the preconfigured parameters set based on the search algorithm, and inputting the group of configuration parameters, the third configuration parameter $a_{21}$ of the cell 1, the initial configuration parameters of the cell 4, the cell 5, and the cell 6, and the state information of the cell 1, the cell 3, the cell 4, the cell 5, and the cell 6 into the parameter configuration model of the cell 3 for calculation, to obtain an expected indicator expected value $a_{232}$ of the cell 3, where the expected indicator expected value $a_{232}$ is greater than the expected indicator expected value $a_{231}$; and repeating the foregoing steps until a maximum expected indicator expected value of the cell 3 is obtained, where a configuration parameter corresponding to the maximum expected indicator expected value is a third configuration parameter $a_{23}$ of the cell 3. Up to now, the second intra-group negotiation for the cell 1, the cell 2, and the cell 3 is completed.

According to the foregoing process, a plurality of intra-group negotiations for the cell 1, the cell 2, and the cell 3 may be completed. After the intra-group negotiations for the cell 1, the cell 2, and the cell 3 are completed, all the cell 1, the cell 2, and the cell 3 are marked as negotiated cells.

For example, if one intra-group negotiation needs to be performed for the cell 1, the cell 2, and the cell 3, after the intra-group negotiation is completed, all the cell 1, the cell 2, and the cell 3 are marked as negotiated cells; if two intra-group negotiations need to be performed for the cell 1, the cell 2, and the cell 3, after the two intra-group negotiations are completed, all the cell 1, the cell 2, and the cell 3 are marked as negotiated cells; or if S intra-group negotiations need to be performed for the cell 1, the cell 2, and the cell 3, after the S intra-group negotiations are completed, all the cell 1, the cell 2, and the cell 3 are marked as negotiated cells.

Optionally, a quantity of intra-group negotiations performed for the cell 1, the cell 2, and the cell 3 may be preset, or may be manually set.

The non-negotiated cell 4 and a neighboring cell thereof (that is, the cell 3) are grouped into a group. Performing a first intra-group negotiation for the cell 4 and the neighboring cell thereof includes: obtaining a group of configuration parameters for the cell 4 from the preconfigured parameters, and inputting the group of configuration parameters, the third configuration parameter of the cell 3, and the state information of the cell 4 and the cell 3 into a parameter configuration model of the cell 4 for calculation, to obtain a performance indicator expected value $a_{141}$; then obtaining another group of configuration parameters for the cell 4 from the preconfigured parameters set based on the search algorithm, and inputting the group of configuration parameters, the third configuration parameter of the cell 3, and the state information of the cell 3 and the cell 4 into the parameter configuration model of the cell 4 for calculation, to obtain a performance indicator expected value $a_{142}$, where the expected indicator expected value $a_{142}$ is greater than the expected indicator expected value $a_{141}$; and repeating the foregoing steps until a maximum expected indicator expected value of the cell 4 is obtained, where a configuration parameter corresponding to the maximum expected indicator expected value is a third configuration parameter $a_{14}$ of the cell 4, where when the first intra-group negotiation is performed for the cell 3 and the cell 4, the third configuration parameter of the cell 3 may be a third configuration parameter obtained by performing one or more intra-group negotiations in another group to which the cell 3 belongs; for example, before the intra-group negotiation is performed for the cell 3 and the cell 4, one intra-group negotiation is completed for the cell 1, the cell 2, and the cell 3, and the third configuration parameter of the cell 3 is the third configuration parameter $a_{13}$; for example, before the intra-group negotiation is performed for the cell 3 and the cell 4, two intra-group negotiations are completed for the cell 1, the cell 2, and the cell 3, and the third configuration parameter of the cell 3 is the third configuration parameter $a_{23}$; for example, before the intra-group negotiation is performed for the cell 3 and the cell 4, S intra-group negotiations are completed for the cell 1, the cell 2, and the cell 3, and the third configuration parameter of the cell 3 is a third configuration parameter $a_{S3}$; and obtaining a group of configuration parameters for the cell 3 from the preconfigured parameters, and inputting the group of configuration parameters, the third configuration parameter $a_{21v}$ of the cell 1, the third configuration parameter $a_{14}$ of the cell 4, the initial configuration parameters of the cell 5 and the cell 6, and the state information of the cell 1, the cell 4, the cell 3, the cell 5, and the cell 6 into the parameter configuration model of the cell 3 for calculation, to obtain a performance indicator expected value $a_{131}'$; then obtaining another group of configuration parameters for the cell 3 from the preconfigured parameters set based on the search algorithm, and inputting the group of configuration parameters, the third configuration parameter $a_{21}$ of the cell 1, the third configuration parameter $a_{14}$ of the cell 4, the initial configuration parameters of the cell 5 and the cell 6, and the state information of the cell 1, the cell 4, the cell 3, the cell 5, and the cell 6 into the parameter configuration model of the cell 3 for calculation, to obtain a performance indicator expected value $a_{132}'$, where the expected indicator expected value $a_{132}'$ is greater than the expected indicator expected value $a_{131}'$; and repeating the foregoing steps until a maximum expected indicator expected value of the cell 3 is obtained, where a configuration parameter corresponding to the maximum expected indicator expected value is a third configuration parameter $a_{13}'$ of the cell 3. Up to now, the first intra-group negotiation for the cell 3 and the cell 4 is completed.

Performing a second intra-group negotiation for the cell 3 and the cell 4 includes:

obtaining a group of configuration parameters for the cell 4 from the preconfigured parameters, and inputting the group of configuration parameters, the third configuration parameter $a_{13}'$ of the cell 3, and the state information of the cell 4 and the cell 3 into the parameter configuration model of the cell 4 for calculation, to obtain a performance indicator expected value $a_{241}$; then obtaining another group of configuration parameters for the cell 4 from the preconfigured parameters set based on the search algorithm, and inputting the group of configuration parameters, the third configuration parameter $a_{13}'$ of the cell 3, and the state information of the cell 3 and the cell 4 into the parameter configuration model of the cell 4 for calculation, to obtain a performance indicator expected value $a_{242}$, where the expected indicator expected value $a_{242}$ is greater than the expected indicator expected value $a_{241}$; and repeating the foregoing steps until a maximum expected indicator expected value of the cell 4 is obtained, where a configuration parameter corresponding to the maximum expected indicator expected value is a third configuration parameter $a_{24}$ of the cell 4; and obtaining a group of configuration parameters for the cell 3 from the preconfigured parameters, and inputting the group of configuration parameters, the third configuration parameter $a_{21}$ of the cell 1, the third configuration parameter $a_{24}$ of the cell 4, the initial configuration parameters of the cell 5 and the cell 6, and the state information of the cell 1, the cell 4, the cell 3, the cell 5, and the cell 6 into the parameter configuration model of the cell 3 for calculation, to obtain a performance indicator expected value $a_{231}'$; then obtaining another group of configuration parameters for the cell 3 from the preconfigured parameters set based on the search algorithm, and inputting the group of configuration parameters, the third configuration parameter $a_{21}$ of the cell 1, the third configuration parameter $a_{24}$ of the cell 4, the initial configuration parameters of the cell 5 and the cell 6, and the state information of the cell 1, the cell 4, the cell 3, the cell 5, and the cell 6 into the parameter configuration model of the cell 3 for calculation, to obtain a performance indicator expected value $a_{232}'$, where the expected indicator expected value $a_{232}'$ is greater than the expected indicator expected value $a_{231}'$; and repeating the foregoing steps until a maximum expected indicator expected value of the cell 3 is obtained, where a configuration parameter corresponding to the maximum expected indicator expected value is a third configuration parameter $a_{23}'$ of the cell 3. Up to now, the second intra-group negotiation for the cell 3 and the cell 4 is completed.

According to the foregoing steps, a plurality of intra-group negotiations for the cell 3 and the cell 4 may be completed. After the intra-group negotiations for the cell 3 and the cell 4 are completed, the cell 4 is marked as a negotiated cell.

For example, if one intra-group negotiation needs to be performed for the cell 3 and the cell 4, after the intra-group negotiation is completed, the cell 4 is marked as a negotiated cell; if two intra-group negotiations need to be performed for the cell 3 and the cell 4, after the two intra-group negotiations are completed, the cell 4 is marked as a negotiated cell; or if S intra-group negotiations need to be performed for the cell 3 and the cell 4, after the S intra-group negotiations are completed, the cell 4 is marked as a negotiated cell.

Optionally, a quantity of intra-group negotiations performed for the cell 3 and the cell 4 may be preset, or may be manually set.

The cell 5 and neighboring cells thereof (including the cell 6 and the cell 3) are grouped into a group. Performing a first intra-group negotiation for the cell 5 and the neighboring cells thereof includes: obtaining a group of configuration parameters for the cell 5 from the preconfigured parameters, and inputting the group of configuration parameters, the initial configuration parameters of the cell 6, the third configuration parameter of the cell 3, and the state information of the cell 3, the cell 5, and the cell 6 into a parameter configuration model of the cell 5 for calculation, to obtain an expected indicator expected value $a_{151}$ of the cell 5; then obtaining another group of configuration parameters for the cell 5 from the preconfigured parameters set based on the search algorithm, and inputting the group of configuration parameters, the initial configuration parameters of the cell 6 and the cell 3, and the state information of the cell 3, the cell 5, and the cell 6 into the parameter configuration model of the cell 5 for calculation, to obtain an expected indicator expected value $a_{152}$ of the cell 5, where the expected indicator expected value $a_{152}$ is greater than the expected indicator expected value $a_{151}$; and repeating the foregoing steps until a maximum expected indicator expected value of the cell 5 is obtained, where a configuration parameter corresponding to the maximum expected indicator expected value is a third configuration parameter ads of the cell 5;

obtaining a group of configuration parameters for the cell 6 from the preconfigured parameters, and inputting the group of configuration parameters, the third configuration parameter $a_{15}$ of the cell 5, the third configuration parameter of the cell 3, and the state information of the cell 3, the cell 5, and the cell 6 into a parameter configuration model of the cell 6 for calculation, to obtain an expected indicator expected value $a_{161}$ of the cell 6; then obtaining another group of configuration parameters for the cell 6 from the preconfigured parameters set based on the search algorithm, and inputting the group of configuration parameters, the third configuration parameter $a_{15}$ of the cell 5, the third configuration parameter of the cell 3, and the state information of the cell 3, the cell 5, and the cell 6 into the parameter configuration model of the cell 6 for calculation, to obtain an expected indicator expected value $a_{162}$ of the cell 6, where the expected indicator expected value $a_{162}$ is greater than the expected indicator expected value $a_{161}$; and repeating the foregoing steps until a maximum expected indicator expected value of the cell 6 is obtained, where a configuration parameter corresponding to the maximum expected indicator expected value is a third configuration parameter $a_{16}$ of the cell 6, where it should be noted that, when the first intra-group negotiation is performed for the cell 3, the cell 5, and the cell 6, the third configuration parameter of the cell 3 may be a third configuration parameter obtained by performing one or more intra-group negotiations in another group to which the cell 3 belongs; for example, before the intra-group negotiation is performed for the cell 3, the cell 5, and the cell 6, one intra-group negotiation is completed for the cell 3 and the cell 4, and the third configuration parameter of the cell 3 is the third configuration parameter $a_{13}'$; for example, before the intra-group negotiation is performed for the cell 3, the cell 5, and the cell 6, two intra-group negotiations are completed for the cell 3 and the cell 4, and the third configuration parameter of the cell 3 is the third configuration parameter $a_{23}'$; for example, before the intra-group negotiation is performed for the cell 3, the cell 5, and the cell 6, S intra-group negotiations are completed for the cell 3 and the cell 4, and the third configuration parameter of the cell 3 is a third configuration parameter $a_{S3}'$; and obtaining a group of configuration parameters for the cell 3 from the preconfigured parameters, and inputting the group of configuration parameters, the third configuration parameter $a_{21}$ of the cell 1, the third configuration parameter $a_{24}$ of the cell 4, the third configuration parameter $a_{15}$ of the cell 5, the third configuration parameter $a_{16}$ of the cell 6, and the state information of the cell 1, the cell 3, the cell 4, the cell 5, and the cell 6 into the parameter configuration model of the cell 3 for calculation, to obtain an expected indicator expected value $a_{131}''$ of the cell 3; then obtaining another group of configuration parameters for the cell 3 from the preconfigured parameters set based on the search algorithm, and inputting the group of configuration parameters, the third configuration parameter $a_{21}$ of the cell 1, the third configuration parameter $a_{24}$ of the cell 4, the third configuration parameter $a^{15}$ of the cell 5, the third configuration parameter $a_{16}$ of the cell 6, and the state information of the cell 1, the cell 3, the cell 4, the cell 5, and the cell 6 into the parameter configuration model of the cell 3 for calculation, to obtain an expected indicator expected value $a_{132}''$ of the cell 3, where the expected indicator expected value $a_{132}''$ is greater than the expected indicator expected value $a_{131}''$; and repeating the foregoing steps until a maximum expected indicator expected value of the cell 3 is obtained, where a configuration parameter corresponding to the maximum expected indicator expected value is a third configuration parameter $a_{13}''$ of the cell 3. Up to now, the first intra-group negotiation for the cell 3, the cell 5, and the cell 6 is completed.

Performing a second intra-group negotiation for the cell 3, the cell 5, and the cell 6 includes:

obtaining a group of configuration parameters for the cell 5 from the preconfigured parameters, and inputting the group of configuration parameters, the third configuration parameter $a_{16}$ of the cell 6, the third configuration parameter $a_{13}''$ of the cell 3, and the state information of the cell 3, the cell 5, and the cell 6 into the parameter configuration model of the cell 5 for calculation, to obtain an expected indicator expected value $a_{251}$ of the cell 5; then obtaining another group of configuration parameters for the cell 5 from the preconfigured parameters set based on the search algorithm, and inputting the group of configuration parameters, the third configuration parameter $a_{16}$ of the cell 6, the third configuration parameter $a_{13}''$ of the cell 3, and the state information of the cell 5 and the cell 6 into the parameter configuration model of the cell 5 for calculation, to obtain an expected indicator expected value $a_{252}$ of the cell 5, where the expected indicator expected value $a_{252}$ is greater than the expected indicator expected value $a_{251}$; and repeating the foregoing steps until a maximum expected indicator expected value of the cell 5 is obtained, where a configuration parameter corresponding to the maximum expected indicator expected value is a third configuration parameter $a_{25}$ of the cell 5;

obtaining a group of configuration parameters for the cell 6 from the preconfigured parameters, and inputting the group of configuration parameters, the third configuration parameter $a_{31}''$ of the cell 3, the third configuration parameter $a_{25}$ of the cell 5, and the state information of the cell 3, the cell 5, and the cell 6 into the parameter configuration model of the cell 6 for calculation, to obtain an expected indicator expected value $a_{261}$ of the cell 6; then obtaining another group of configuration parameters for the cell 6 from the preconfigured parameters set based on the search algorithm, and inputting the group of configuration parameters, the third configuration parameter $a_{31}''$ of the cell 3, the third configuration parameter $a_{25}$ of the cell 5, and the state information of the cell 3, the cell 5, and the cell 6 into the parameter configuration model of the cell 6 for calculation, to obtain an expected indicator expected value $a_{262}$ of the cell 6, where the expected indicator expected value $a_{262}$ is greater than the expected indicator expected value $a_{261}$; and repeating the foregoing steps until a maximum expected indicator expected value of the cell 6 is obtained, where a configuration parameter corresponding to the maximum expected indicator expected value is a third configuration parameter $a_{26}$ of the cell 6; and obtaining a group of configuration parameters for the cell 3 from the preconfigured parameters, and inputting the group of configuration parameters, the third configuration parameter $a_{21v}$ of the cell 1, the third configuration parameter $a_{24}$ of the cell 4, the third configuration parameter $a_{25}$ of the cell 5, the third configuration parameter $a_{26}$ of the cell 6, and the state information of the cell 1, the cell 3, the cell 4, the cell 5, and the cell 6 into the parameter configuration model of the cell 3 for calculation, to obtain an expected indicator expected value $a_{231}''$ of the cell 3; then obtaining another group of configuration parameters for the cell 3 from the preconfigured parameters set based on the search algorithm, and inputting the group of configuration parameters, the third configuration parameter $a_{21}$ of the cell 1, the third configuration parameter $a_{24}$ of the cell 4, the third configuration parameter $a_{25}$ of the cell 5, the third configuration parameter $a_{26}$ of the cell 6, and the state information of the cell 1, the cell 3, the cell 4, the cell 5, and the cell 6 into the parameter configuration model of the cell 3 for calculation, to obtain an expected indicator expected value $a_{232}''$ of the cell 3, where the expected indicator expected value $a_{232}''$ is greater than the expected indicator expected value $a_{231}''$; and repeating the foregoing steps until a maximum expected indicator expected value of the cell 3 is obtained, where a configuration parameter corresponding to the maximum expected indicator expected value is a third configuration parameter $a_{23}''$ of the cell 3. Up to now, the second intra-group negotiation for the cell 3, the cell 5, and the cell 6 is completed. After the intra-group negotiations for the cell 3, the cell 5, and the cell 6 are completed, both the cell 5 and the cell 6 are marked as negotiated cells.

According to the foregoing process, a plurality of intra-group negotiations for the cell 3, the cell 5, and the cell 6 may be completed. After the intra-group negotiations for the cell 3, the cell 5, and the cell 6 are completed, both the cell 5 and the cell 6 are marked as negotiated cells.

For example, if one intra-group negotiation needs to be performed for the cell 3, the cell 5, and the cell 6, after the intra-group negotiation is completed, both the cell 5 and the cell 6 are marked as negotiated cells; if two intra-group negotiations need to be performed for the cell 3, the cell 5, and the cell 6, after the two intra-group negotiations are completed, both the cell 5 and the cell 6 are marked as negotiated cells; or if S intra-group negotiations need to be performed for the cell 3, the cell 5, and the cell 6, after the S intra-group negotiations are completed, both the cell 5 and the cell 6 are marked as negotiated cells.

Optionally, a quantity of intra-group negotiations performed for the cell 3, the cell 5, and the cell 6 may be preset, or may be manually set.

It should be noted herein that, when a plurality of intra-group negotiations are performed for a group of cells, sequences of determining the third configuration parameters of the cells during each intra-group negotiation may be different or may be the same. For example, a group includes the cell 1, the cell 2, and the cell 3. During the first intra-group negotiation, the third configuration parameter of the cell 1 is first determined, then the third configuration parameter of the cell 2 is determined, and finally the third configuration parameter of the cell 3 is determined. During the second intra-group negotiation, the third configuration parameter of the cell 2 may be first determined, then the third configuration parameter of the cell 1, and finally the third configuration parameter of the cell 3 is determined.

Up to now, the cells 1 to 6 are all negotiated cells, and a first inter-group negotiation is completed for the cells 1 to 6. Second configuration parameters of the cell 1 and the cell 2 are respectively third configuration parameters of the cell 1 and the cell 2 after the intra-group negotiation for the cell 1, the cell 2, and the cell 3 is completed. Second configuration parameters of the cell 3, the cell 5, and the cell 6 are respectively third configuration parameters of the cell 3, the cell 5, and the cell 6 after the intra-group negotiation for the cell 3, the cell 5, and the cell 6 is completed. A second configuration parameter of the cell 4 is a third configuration parameter of the cell 4 after the intra-group negotiation for the cell 3 and the cell 4 is completed.

If a second inter-group negotiation needs to be performed, the initial configuration parameter in the foregoing method is replaced with the second configuration parameter of each cell after the first inter-group negotiation, and the second inter-group negotiation for the cell 1 to the cell 6 may be completed according to the foregoing method to obtain second configuration parameters of the cell 1 to the cell 6 after the second inter-group negotiation.

The foregoing steps may be repeated according to the foregoing method to complete W inter-group negotiations for the cell 1 to cell 6, to obtain second configuration parameters of the cell 1 to the cell 6 after the W inter-group negotiations.

If only one inter-group negotiation is performed in each round of negotiations, reference configuration parameters of the cell 1 to the cell 6 are second configuration parameters of the cell 1 to the cell 6 after the first inter-group negotiation. If only two inter-group negotiations are performed in each round of negotiations, reference configuration parameters of the cell 1 to the cell 6 are second configuration parameters of the cell 1 to the cell 6 after the second inter-group negotiation. If only W inter-group negotiations are performed in each round of negotiations, reference configuration parameters of the cell 1 to the cell 6 are second configuration parameters of the cell 1 to the cell 6 after the W inter-group negotiations.

In this case, elements in a reference configuration parameter set after one round of negotiations include reference configuration parameters of the cell 1 to the cell 6 after the round of negotiations, and elements in a performance indicator expected value set include performance indicator expected values obtained through calculation by inputting reference configuration parameters and state information of each cell among the cell 1 to the cell 6 and neighboring cells thereof into the parameter configuration model of the cell.

According to the foregoing method, T rounds of negotiations are performed, and T reference configuration parameter sets and T performance indicator expected value sets are obtained.

Optionally, a third configuration parameter $a_{qj}$ is obtained from the preconfigured parameters set based on the search algorithm, so that a weighted sum of the performance indicator expected value of the area j and the performance indicator expected value of the neighboring area thereof is maximized. Similarly, a third configuration parameter $a_{qn}$ is obtained from the preconfigured parameters set based on the search algorithm, so that a weighted sum of the performance indicator expected value of the area n and the performance indicator expected value of the neighboring area thereof is maximized. For a specific process, refer to the foregoing related descriptions. Details are not described herein again.

Optionally, the search algorithm may be an exhaustive search algorithm, a coordinate ascent search algorithm, a gradient ascent algorithm, or another search algorithm.

In a feasible embodiment, for a parameter configuration model of an area, input data of the parameter configuration model includes not only state information and parameter configuration information of the area and neighboring cells thereof, but also area identifiers of the area and the neighboring areas thereof, so that an output performance indicator expected value is more accurate, and that a finally obtained reference configuration parameter of the area is more accurate.

S403. Send a configuration instruction to the network device covering the N areas, to instruct the network device to perform parameter configuration based on a target parameter set of each of the N areas that is carried in the configuration instruction, where the target parameter set of each area is obtained based on the target parameter subsets in the D dimensions of each area.

When parameters are divided based on dimensions, a same parameter may exist in parameter sets in the D dimensions that are obtained through division. Therefore, in the target parameter subsets in the D dimensions, a same parameter has a plurality of values, and a newly obtained value is determined as a final value of the parameter, that is, all values of parameters in the target parameter set are latest values.

After target configuration parameters of the N areas are obtained, a configuration instruction carrying the target configuration parameters is sent to the network device covering the N areas, and the network device configures the parameters of the N areas based on the target configuration parameters carried in the configuration instruction.

It should be noted that the parameters of the N areas may be periodically configured based on a preset time period, where the preset time period may be 3 hours, 4 hours, 6 hours, 8 hours, 12 hours, 24 hours, one month, 3 months, or another periodic time period. For areas with great service fluctuation, a relatively short preset time period may be set.

Figure 24:
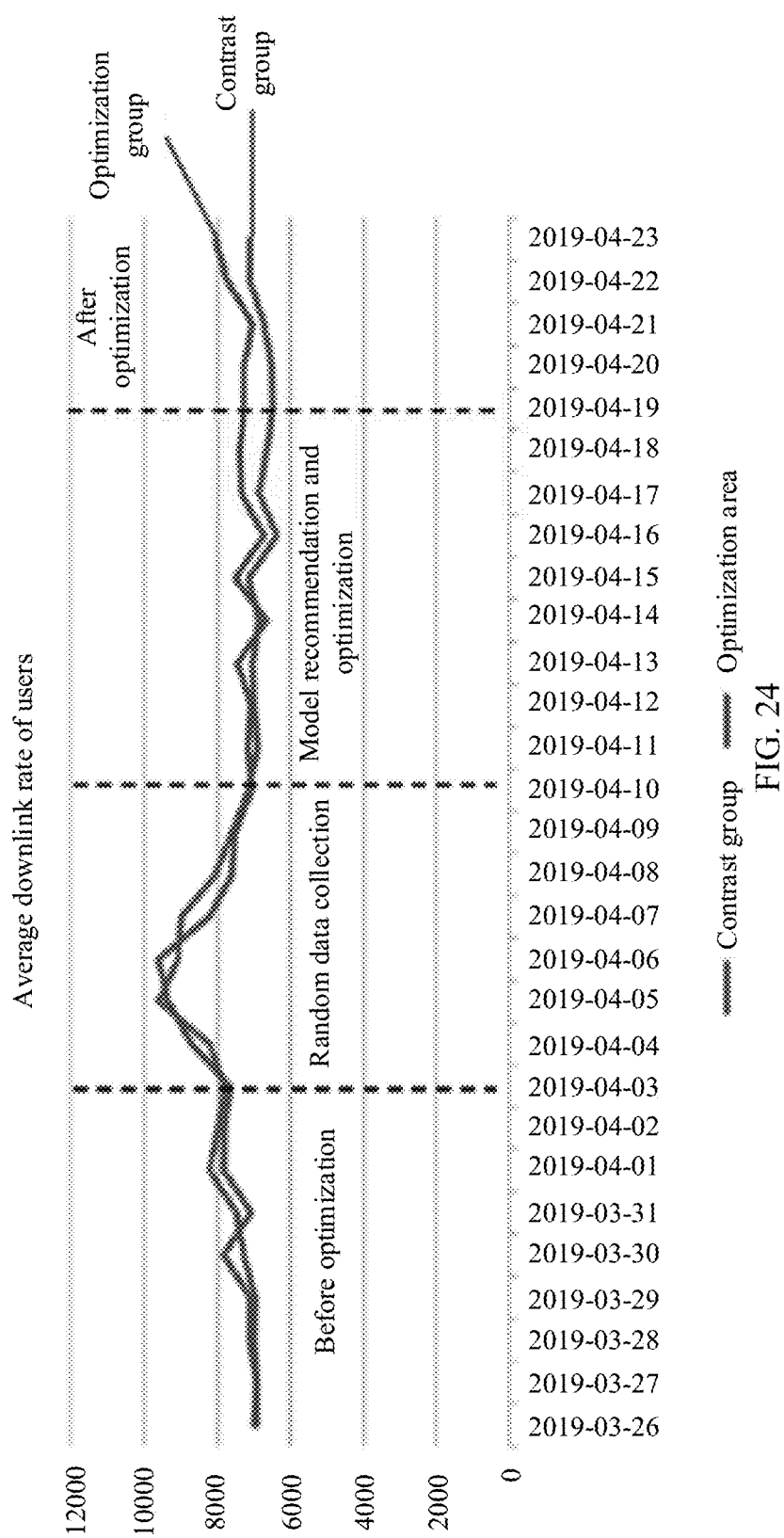
FIG. 24 is a schematic diagram of an effect comparison.

FIG. 24 shows a verification effect of the solution in a live network test. An optimization target is an average downlink rate of users. Optimized configuration parameters include two parameters that affect load balancing in the vertical dimension and two parameters that affect inter-cell handover in the horizontal dimension. A test area is divided into two groups. One group is a contrast group, and the other group is an optimization group. It can be learned that, before the optimization starts, an average downlink rate of users in the optimization area is almost the same as that in the contrast group. After model recommendation and optimization, the downlink rate of users in the optimization area is significantly higher than that in the contrast group, indicating that an optimization algorithm significantly improves performance of a air interface.

The following Table 2 shows a data change in performance of the contrast group and the optimization group.

TABLE 2

| Data | Contrast group | Optimization team |
|---|---|---|
| Average downlink rate of users from March 27 to April 2 | 7403.5081 | 7375.2831 |
| Average downlink rate of users on dates 0417-0423 | 6770.7141 | 7436.39053 |
| Change rate (%) | −8.5472 | 0.828543 |

It can be learned that after and before the optimization, the performance of the contrast group deteriorates by about 8.55% but the performance of the optimization team is improved by 0.83% when the live network configuration is maintained. This indicates that the technical solution has obvious effects on performance optimization of the wireless network.

It can be learned that, in the solution of this embodiment of this application, for a problem that parameter configurations of neighboring areas have complex impact on performance of each other in the wireless network, a method for modeling complex impact between cells based on a multi-agent communications mechanism is proposed. A neighboring area encoding model is used to effectively abstract and aggregate neighboring area state information and parameter configuration information, so that an output result of a performance prediction model can accurately represent impact of the neighboring area state information and configuration parameters on area performance.

In a process of building a parameter configuration model, the impact between areas is divided into D dimensions, for example, vertical impact and horizontal impact, or impact between intra-frequency and inter-frequency neighboring areas, and different models are built for different dimensions, so that modeling of impact in different dimensions is more accurate; and neighboring area information in different dimensions is used as a shared input of a plurality of models, so that mutual impact between different dimensions is considered during parameter configuration. In a process of recommending an area parameter configuration, a hierarchical negotiation mechanism is used to enable all areas to negotiate effectively and coordinate their parameter configurations, to achieve an objective of optimizing an overall performance indicator.

Figure 25:
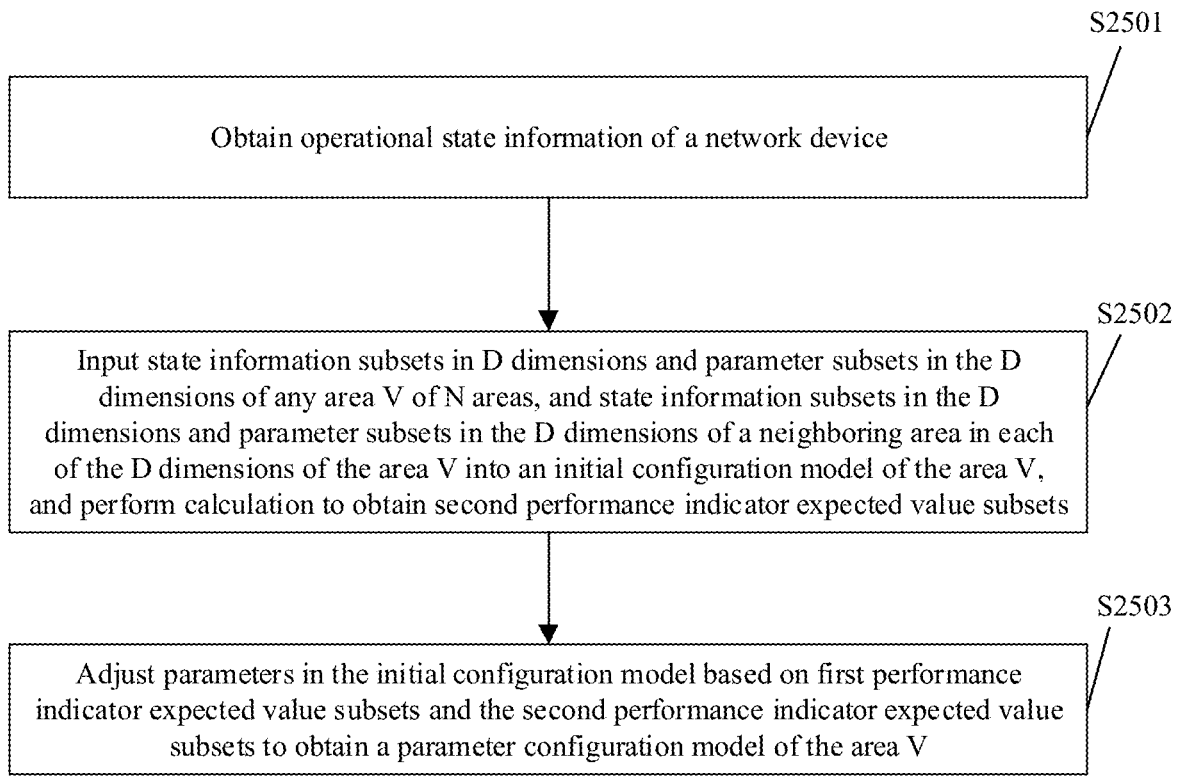
FIG. 25 is a schematic flowchart of a method for training a parameter configuration model according to an embodiment.

FIG. 25 is a schematic flowchart of a method for training a parameter configuration model according to an embodiment. As shown in FIG. 25, the method includes the following steps.

S2501. Obtain operational state information of a network device.

The operational state information includes state information sets, parameter sets, and first performance indicator expected value sets of N areas covered by the network device, the state information sets include state information subsets in D dimensions of each of the N areas, the parameter sets include parameter subsets in the D dimensions of each of the N areas, and the first performance indicator expected value sets include first performance indicator expected value subsets in the D dimensions of each of the N areas.

S2502. Input state information subsets in the D dimensions and parameter subsets in the D dimensions of any area V of the N areas, and state information subsets in the D dimensions and parameter subsets in the D dimensions of a neighboring area in each of the D dimensions of the area V into an initial configuration model of the area V, and perform calculation to obtain second performance indicator expected value subsets.

S2503. Adjust parameters in the initial configuration model based on the first performance indicator expected value subsets and the second performance indicator expected value subsets to obtain a parameter configuration model of the area V.

In a feasible embodiment, because a large amount of redundant information irrelevant to an optimization indicator exists in the state information set of the area, before the state information set of the area is used, state information in the state information set of each area is filtered, to obtain a filtered state information set of the area.

A correlation value between each type of state information in the state information set of the area and an optimization performance indicator is calculated, where the correlation value is used to represent a correlation degree between the state information and the optimization performance indicator; and state information of a type corresponding to a correlation value less than a first threshold is deleted from the state information set of the area, to obtain a filtered state information set of the area; or a divergence value of each type of state information in the state information set of the area is calculated, where the divergence value is used to represent divergence of each type of state information in the state information set of the area; and state information of a type corresponding to a divergence value less than a second threshold is deleted from the state information set of the area, to obtain a filtered state information set of the area; or a divergence value of each type of state information in the state information set of the area and a correlation between the type of state information and an optimization performance indicator are calculated; then a score of the type of state information is calculated based on the correlation and divergence value of each type; and based on a magnitude relationship between the score and a score threshold, whether to delete the type of state information corresponding to the score from the state information set of the area is determined, to obtain a filtered state information set of the area, where the divergence value of each type of state information refers to a variance of normalized state information of the type.

It should be noted herein that the foregoing three manners of filtering the state information of the area are merely examples, and are not intended to limit this application. Certainly, another manner may be used to filter the state information of the area.

Optionally, in another feasible embodiment, after the state information sets, the parameter sets, and the optimization performance indicator sets of the N areas are obtained, an initial shared model is trained based on the state information sets, the parameter sets, and the optimization performance indicator sets of the N areas, to obtain a shared parameter configuration model, where a parameter configuration model of each of the N areas is the shared parameter configuration model, that is, parameter configuration models of the N areas are the same.

Optionally, in another feasible embodiment, after the state information sets, the parameter sets, and the optimization performance indicator sets of the N areas are obtained, an initial shared model is trained based on the state information sets, the parameter sets, and the optimization performance indicator sets of the N areas, to obtain a shared parameter configuration model; and then parameters in the shared parameter configuration model are adjusted based on state information sets, parameter sets, and optimization performance indicator sets of any area V of the N areas and a neighboring area thereof, to obtain a parameter configuration model of the area V.

The parameter configuration model of the area V includes a performance prediction model and a neighboring area information encoding model;

input data of the neighboring area information encoding model of the area V includes a horizontal state information set and a parameter set of the neighboring area of the area V, or state information sets and parameter sets of the area V and the neighboring area thereof, and output data of the neighboring area information encoding model of the area V is an encoding result; and input data of the performance prediction model of the area V includes the encoding result output by the neighboring area information encoding model of the area V and the state information set and the parameter set of the area V, and output data of the performance prediction model of the area V is a performance indicator expected value set of the area V, as shown in FIG. 5.

It should be noted herein that, for detailed descriptions of the parameter configuration model of the area V, refer to related descriptions of the embodiments shown in FIG. 6 to FIG. 21. Details are not described herein again.

It should be noted herein that when the method in this application is applied to a wireless cellular network, or the network is a wireless cellular network, the network device is a radio base station, and the area is a cell covered by the base station; or when the method in this application is applied to a Wi-Fi network, or the network is a Wi-Fi network, the network device is a Wi-Fi device, and the area is an area covered by the Wi-Fi device.

In a feasible embodiment, if the area is an area covered by the Wi-Fi device, and the area V is covered by signals of D frequency bands, the D dimensions are in a one-to-one correspondence with the D frequency bands.

Optionally, the neighboring area information encoding model may be obtained based on a long short term memory (long short term memory, LSTM) network, or may be obtained based on a transformer network, or may be obtained based on a deepset network.

When the neighboring area information encoding model is obtained based on the LSTM network, state information and parameter configuration information of a plurality of neighboring areas are used as an input sequence, where state information and parameter configuration information of each neighboring area are used as a time step of the input sequence; and after a plurality of time steps are input into the LSTM network, multi-step implicit state information is output, and the multi-step implicit state information is aggregated to obtain an aggregation result, where the aggregation result is an encoding result output by the neighboring area information encoding model; or when the neighboring area information encoding model is obtained based on the transformer network, state information and parameter configuration information of a plurality of neighboring areas are used as an input sequence of the transformer network, and are processed by single-layer or multi-layer multi-head self-attention (multi-head self-attention) and a fully connected network layer, where an obtained result is an encoding result output by the neighboring area information encoding model.

Optionally, the performance prediction model may be obtained based on a neural network, or may be obtained based on a kernel ridge regression (kernel ridge regression) method, or may be obtained based on a Gaussian process regression (gaussian process regression) method.

It should be noted herein that, for the foregoing neighboring area information encoding model, input state information sets or subsets or parameter sets or subsets of different quantities of areas are mainly processed to obtain a set or subset with a consistent state information length, or a set or subset with a consistent parameter length, so that the performance prediction model can subsequently use state information and parameters of different quantities of areas, thereby improving accuracy of obtained target parameters.

For example, for state information subsets of three areas that are input into the neighboring area information encoding model, each of the three areas includes values of two pieces of state information, and the values of the pieces of state information in the state information subsets of the three areas are added, and then an averaging operation is performed, or a weighted averaging operation or another operation is performed, to obtain a final value of the state information. In this way, for the state information subsets of the three areas, output data of the neighboring area information encoding model is a final area set including two pieces of state information.

For another example, for state information subsets of three areas that are input into the neighboring area information encoding model, each of the three areas includes values of two pieces of state information, and linear transformation is performed on values of two pieces of state information in any one of the three areas, to obtain a vector whose length is 2; and after linear transformation is performed on the two pieces of state information of each of the three areas, a 3*2 matrix may be obtained, and a maximum value of each column in the matrix is selected to form a vector with a length of 2, as output data of the neighboring area information encoding model for the state information subsets of the three areas.

Similarly, a parameter subset or set of an area may also be processed according to the foregoing method.

It should be noted that the foregoing two methods are merely intended to describe functions of the neighboring area information encoding model, but do not limit the functions of the neighboring area information encoding model.

It should be noted herein that for detailed descriptions of the performance prediction model and the neighboring area information encoding model in this embodiment, refer to related descriptions of the embodiments shown in FIG. 5 to FIG. 21. Details are not described herein again.

Figure 26:
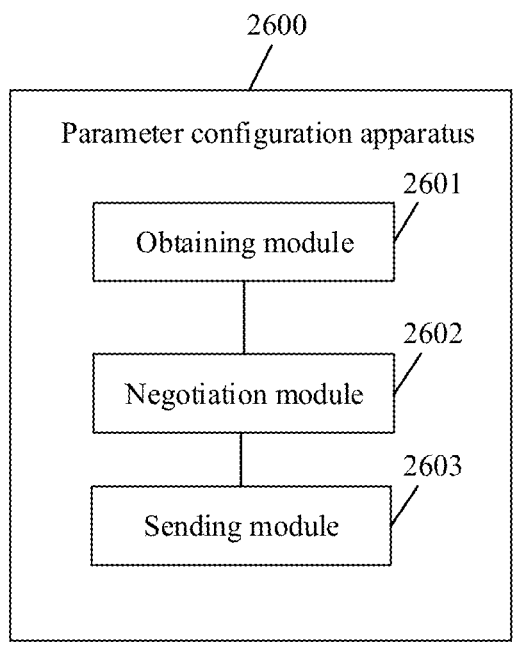
FIG. 26 is a schematic diagram of a structure of a parameter configuration apparatus according to an embodiment.

FIG. 26 is a schematic diagram of a structure of a parameter configuration apparatus according to an embodiment. As shown in FIG. 26, the parameter configuration apparatus 2600 includes:

an obtaining module 2601, configured to obtain operational state information of a network device, where the operational state information includes a state information set of each of N areas covered by the network device, the state information set includes state information subsets in D dimensions, and both N and D are integers greater than 0;

a negotiation module 2602, configured to perform negotiations based on the state information subsets in the D dimensions of each of the N areas to obtain target parameter subsets in the D dimensions of each of the N areas; and a sending module 2603, configured to send a configuration instruction to the network device covering the N areas, to instruct the network device to perform parameter configuration based on a target parameter set of each of the N areas that is carried in the configuration instruction, where the target parameter set of each area is obtained based on the target parameter subsets in the D dimensions of each area.

It should be noted herein that the D dimensions may be at least one of a local area dimension, a horizontal dimension, and a vertical dimension.

In a feasible embodiment, the negotiation module 2602 is configured to:

perform T rounds of negotiations based on the state information subsets in the D dimensions of each of the N areas to obtain T reference parameter sets and T performance indicator expected value sets, where the T reference parameter sets are in a one-to-one correspondence with the T performance indicator expected value sets, the T reference parameter sets include reference parameter subsets in the D dimensions of each of the N areas, the T performance indicator expected value sets include performance indicator expected value subsets in the D dimensions of each of the N areas, and T is an integer greater than 0; and determine the target parameter set from the T reference parameter sets based on the T performance indicator expected value sets, where the target parameter set includes the target parameter subsets in the D dimensions of each of the N areas.

In a feasible embodiment, operational state information of the N areas includes neighboring area information in the D dimensions of the N areas, and in the aspect of performing the T rounds of negotiations based on the state information subsets in the D dimensions of each of the N areas to obtain the T reference parameter sets and the T performance indicator expected value sets, the negotiation module 2602 is configured to:

when performing a $k^{th}$ round of negotiations, initialize a parameter set of each of the N areas to obtain an initial parameter set of each area, where the initial parameter set of each area includes parameter subsets in the D dimensions of the area;

obtain a neighboring area in each of the D dimensions of each of the N areas based on the neighboring area information in the D dimensions of the N areas, where k=1, 2, . . . , T; and perform W inter-group negotiations based on the state information subsets in the D dimensions and initial parameter subsets in the D dimensions of each of the N areas and neighboring areas thereof in the D dimensions to obtain a $k^{th}$ one of the T reference parameter sets and a $k^{th}$ one of the T performance indicator expected value sets, where W is an integer greater than 0.

In a feasible embodiment, in the aspect of performing the W inter-group negotiations based on the state information subsets in the D dimensions and the initial parameter subsets in the D dimensions of each of the N areas and the neighboring areas thereof in the D dimensions to obtain the $k^{th}$ one of the T reference parameter sets and the $k^{th}$ one of the T performance indicator expected value sets, the negotiation module 2602 is configured to:

S1: when performing a $g^{th}$ inter-group negotiation, mark each of the N areas as a non-negotiated area in the D dimensions, where g=1, 2, . . . , W;

S2: select, from non-negotiated areas, an area j marked as a non-negotiated area in any dimension A, perform S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A, mark the area j as a negotiated area in the dimension A, and mark an area that is marked as a non-negotiated area in the dimension A among neighboring areas of the area j in the dimension A, as a negotiated area in the dimension A, where the dimension A is any one of the D dimensions, and when g is equal to 1, the first parameter subset in the dimension A of the area j is an initial parameter subset in the dimension A of the area j, and among the neighboring areas of the area j in the dimension A, a first parameter subset in the dimension A of a non-negotiated area is an initial parameter subset in the dimension A of the area, and a first parameter subset in the dimension A of a negotiated area is obtained based on an initial parameter subset in the dimension A of the negotiated area; or when g is greater than 1, the first parameter subset in the dimension A of the area j is a second parameter subset in the dimension A of the area j after a $(g-1)^{th}$ inter-group negotiation is performed, and among the neighboring areas of the area j in the dimension A, a first parameter subset in the dimension A of a non-negotiated area is a second parameter subset in the dimension A of the area, and a first parameter subset in the dimension A of a negotiated area is obtained based on a second parameter subset of the area that is obtained after the $(g-1)^{th}$ inter-group negotiation is performed; and S3: repeat step S2 until each of the N areas is marked as a negotiated area in the D dimensions, where the $k^{th}$ one of the T reference parameter sets includes a reference parameter subset in each of the D dimensions of the area j, and the $k^{th}$ one of the T performance indicator expected value sets includes performance indicator expected value subsets in the D dimensions, obtained based on reference parameter subsets in the D dimensions of the area j and neighboring areas thereof in the D dimensions and state information subsets in the D dimensions of the area j and the neighboring areas thereof in the D dimensions; and reference parameter subsets in the dimension A of the area j and the neighboring area thereof in the dimension A are respectively second parameter subsets in the dimension A of the area j and the neighboring area thereof in the dimension A after a $W^{th}$ inter-group negotiation is performed.

Optionally, if an intersection set exists between a parameter subset in the dimension A and a parameter subset in another one of the D dimensions, when g=1, a value of a parameter P in a first parameter subset in the dimension A of a non-negotiated area in the dimension A is a value of the parameter P in a second parameter subset in a dimension B, and a value of a parameter other than the parameter P in the first parameter subset in the dimension A is a value in an initial parameter subset in the dimension A, where the dimension B is a dimension negotiated before the dimension A, and the parameter P is any parameter in the intersection set between the parameter subset in the dimension A and the parameter subset in the dimension B.

In a feasible embodiment, in the aspect of performing the S intra-group negotiations based on the state information subset in the dimension A and the first parameter subset in the dimension A of the area j, and the state information subset in the dimension A and the first parameter subset in the dimension A of the neighboring area of the area j in the dimension A to obtain the second parameter subsets in the dimension A of the area j and the neighboring area thereof in the dimension A, the negotiation module 2602 is configured to:

perform a $q^{th}$ intra-group negotiation, and obtain a third parameter subset $a_{Aqj}$ in the dimension A from a pre-configured parameter set based on a search algorithm, so that a preset performance indicator expected value of the area j is maximized, where the preset performance indicator expected value of the area j is obtained based on a performance indicator expected value subset in the dimension A of the area j, and the performance indicator expected value subset in the dimension A of the area j is obtained based on the state information subset in the dimension A and the third parameter subset $a_{Aqj}$ in the dimension A of the area j, the state information subset in the dimension A and a third parameter subset in the dimension A of the neighboring area of the area j in the dimension A, and a parameter configuration model of the area j;

obtain, based on the search algorithm, a third configuration parameter $a_{Aqn}$ in the dimension A from the pre-configured parameter set, so that a preset performance indicator expected value of an area n is maximized, where the preset performance indicator expected value of the area n is obtained based on a performance indicator expected value in the dimension A of the area n, and the performance indicator expected value in the dimension A of the area n is obtained based on a state information subset in the dimension A and a third parameter subset $a_{Aqn}$ in the dimension A of the area n, a state information subset in the dimension A and a third parameter subset in the dimension A of a neighboring area of the area n in the dimension A, and a parameter configuration model of the area n, where the area n is any one of the neighboring areas of the area j in the dimension A, and the third parameter subset in the dimension A of the neighboring area of the area n in the dimension A includes the third parameter subset $a_{Aqj}$ in the dimension A of the area j; and when q=1, a third parameter subset $a_{A(q-1)n}$ on in the dimension A of the area n is a first parameter subset in the dimension A of the area n; or when q=S, the second parameter subset in the dimension A of the area j is the third parameter subset $a_{Aqj}$ in the dimension A of the area j, and a second parameter subset in the dimension A of the area n is the third parameter subset $a_{Aqn}$ in the dimension A of the area n.

Optionally, a preset performance indicator expected value of an area V is:

obtained based on a performance indicator expected value subset in the dimension A of the area V; or obtained based on a performance indicator expected value subset in the dimension A of the area V and a performance indicator expected value subset in the dimension A of a neighboring area of the area V in the dimension A; or obtained based on performance indicator expected value subsets in the D dimensions of the area V; or obtained based on performance indicator expected value subsets in the D dimensions of the area V and performance indicator expected value subsets in the D dimensions of neighboring areas of the area V.

In a feasible embodiment, in the aspect of determining the target parameter set from the T reference parameter sets based on the T performance indicator expected value sets, the negotiation module 2602 is configured to:

separately calculate a performance value of each of the T reference parameter sets based on the T performance indicator expected value sets, where the performance value of each reference parameter set is a sum or a weighted sum of performance indicator expected value subsets in the D dimensions in a performance indicator expected value set corresponding to the reference parameter set; and determine, from the T reference parameter sets, a reference parameter set with a largest performance value as the target parameter set.

It should be noted herein that for detailed descriptions of the performance prediction model and the neighboring area information encoding model in this embodiment, refer to related descriptions of the embodiments shown in FIG. 5 to FIG. 21. Details are not described herein again.

In a feasible embodiment, the obtaining module 2601 is further configured to:

before the negotiations are performed based on the state information subsets in the D dimensions of each of the N areas to obtain the target parameter subsets in the D dimensions of each of the N areas, obtain a parameter configuration model of each of the N areas from a training device.

In a feasible embodiment, when the network is a wireless cellular network, the network device is a base station, and the area is a cell covered by the base station.

In a feasible embodiment, when the network is a Wi-Fi network, the network device is a Wi-Fi device, and the area is an area covered by the Wi-Fi device.

In a feasible embodiment, the area V is covered by signals of D frequency bands, and the D dimensions are in a one-to-one correspondence with the D frequency bands.

It should be noted that the foregoing modules (the obtaining module 2601, the negotiation module 2602, and the sending module 2603) are configured to perform related steps in the foregoing method. For example, the obtaining module 2601 is configured to perform related content in step S401, the negotiation module 2602 is configured to perform related content in step S402, and the sending module 2603 is configured to perform related content in step S403.

In this embodiment, the parameter configuration apparatus 2600 is presented in a form of a module. The "module" herein may be an application-specific integrated circuit (application-specific integrated circuit, ASIC), a processor for executing one or more software or firmware programs, a memory, an integrated logic circuit, and/or another component that can provide the foregoing functions. In addition, the obtaining module 2601 and the negotiation module 2602 may be implemented by using a processor 2801 of a parameter configuration apparatus shown in FIG. 28.

Figure 27:
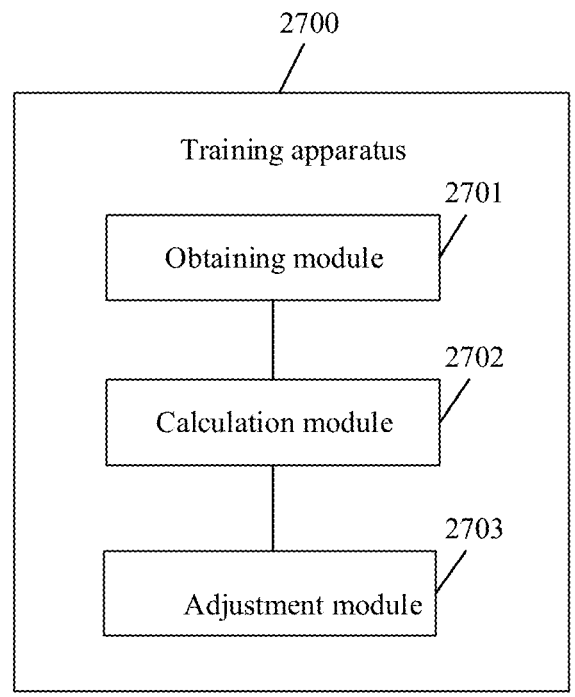
FIG. 27 is a schematic diagram of a structure of a training apparatus according to an embodiment.

FIG. 27 is a schematic diagram of a structure of a training apparatus according to an embodiment. As shown in FIG. 27, the training apparatus 2700 includes:

an obtaining module 2701, configured to obtain operational state information of a network device, where the operational state information includes state information sets, parameter sets, and first performance indicator expected value sets of N areas covered by the network device, the state information sets include state information subsets in D dimensions of each of the N areas, the parameter sets include parameter subsets in the D dimensions of each of the N areas, and the first performance indicator expected value sets include first performance indicator expected value subsets in the D dimensions of each of the N areas;

a calculation module 2702, configured to input state information subsets in the D dimensions and parameter subsets in the D dimensions of any area V of the N areas, and state information subsets in the D dimensions and parameter subsets in the D dimensions of a neighboring area in each of the D dimensions of the area V into an initial configuration model of the area V, and perform calculation to obtain second performance indicator expected value subsets; and an adjustment module 2703, configured to adjust parameters in the initial configuration model based on the first performance indicator expected value subsets and the second performance indicator expected value subsets to obtain a parameter configuration model of the area V, where the parameter configuration model of the area V includes a neighboring area information encoding model and performance prediction models in the D dimensions.

It should be noted herein that for detailed descriptions of the performance prediction model and the neighboring area information encoding model in this embodiment, refer to related descriptions of the embodiments shown in FIG. 5 to FIG. 21. Details are not described herein again.

In a feasible embodiment, when the network is a wireless cellular network, the network device is a base station, and the area is a cell covered by the base station.

In a feasible embodiment, when the network is a Wi-Fi network, the network device is a Wi-Fi device, and the area is an area covered by the Wi-Fi device.

In a feasible embodiment, the area V is covered by signals of D frequency bands, and the D dimensions are in a one-to-one correspondence with the D frequency bands.

It should be noted that the foregoing modules (the obtaining module 2701, the calculation module 2702, and the adjustment module 2703) are configured to perform related steps of the foregoing method. For example, the obtaining module 2701 is configured to perform related content in step S2501, the calculation module 2702 is configured to perform related content in step S2502, and the adjustment module 2703 is configured to perform related content in step S2503.

In this embodiment, the training apparatus 2700 is presented in a form of a module. The "module" herein may be an application-specific integrated circuit (application-specific integrated circuit, ASIC), a processor for executing one or more software or firmware programs, a memory, an integrated logic circuit, and/or another component that can provide the foregoing functions. In addition, the obtaining module 2701, the calculation module 2702, and the adjustment module 2703 may be implemented by a processor 2901 of a training apparatus shown in FIG. 29.

Figure 28:
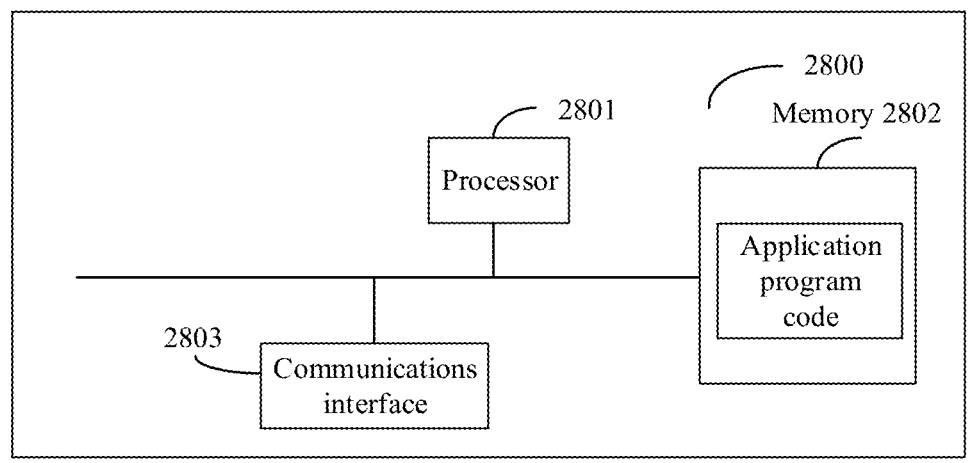
FIG. 28 is a schematic diagram of a structure of another parameter configuration apparatus according to an embodiment.

The parameter configuration apparatus 2800 shown in FIG. 28 may be implemented by using a structure in FIG. 28. The parameter configuration apparatus 2800 includes at least one processor 2801, at least one memory 2802, and at least one communications interface 2803. The processor 2801, the memory 2802, and the communications interface 2803 are connected to and communicate with each other through a communications bus.

The processor 2801 may be a general-purpose central processing unit (CPU), a microprocessor, an application-specific integrated circuit (application-specific integrated circuit, ASIC), or one or more integrated circuits for controlling program execution for the foregoing solutions.

The communications interface 2803 is configured to communicate with another device or a communications network, such as the Ethernet, a radio access network (RAN), or a wireless local area network (Wireless Local Area Network, WLAN).

The memory 2802 may be but is not limited to a read-only memory (read-only memory, ROM) or another type of static storage device capable of storing static information and instructions, a random access memory (random access memory, RAM) or another type of dynamic storage device capable of storing information and instructions, an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and can be accessed by a computer. The memory may exist independently, and is connected to the processor through the bus. The memory may alternatively be integrated with the processor.

The memory 2802 is configured to store application code for executing the foregoing solutions, and the processor 2801 controls the execution. The processor 2801 is configured to execute the application code stored in the memory 2802.

The code stored in the memory 2802 may perform the foregoing provided network parameter configuration method, for example, obtaining operational state information of a network device, where the operational state information includes a state information set of each of N areas covered by the network device, the state information set includes state information subsets in D dimensions, and both N and D are integers greater than 0; performing negotiations based on the state information subsets in the D dimensions of each of the N areas to obtain target parameter subsets in the D dimensions of each of the N areas; and sending a configuration instruction to the network device covering the N areas, to instruct the network device to perform parameter configuration based on a target parameter set of each of the N areas that is carried in the configuration instruction, where the target parameter set of each area is obtained based on the target parameter subsets in the D dimensions of each area.

Figure 29:
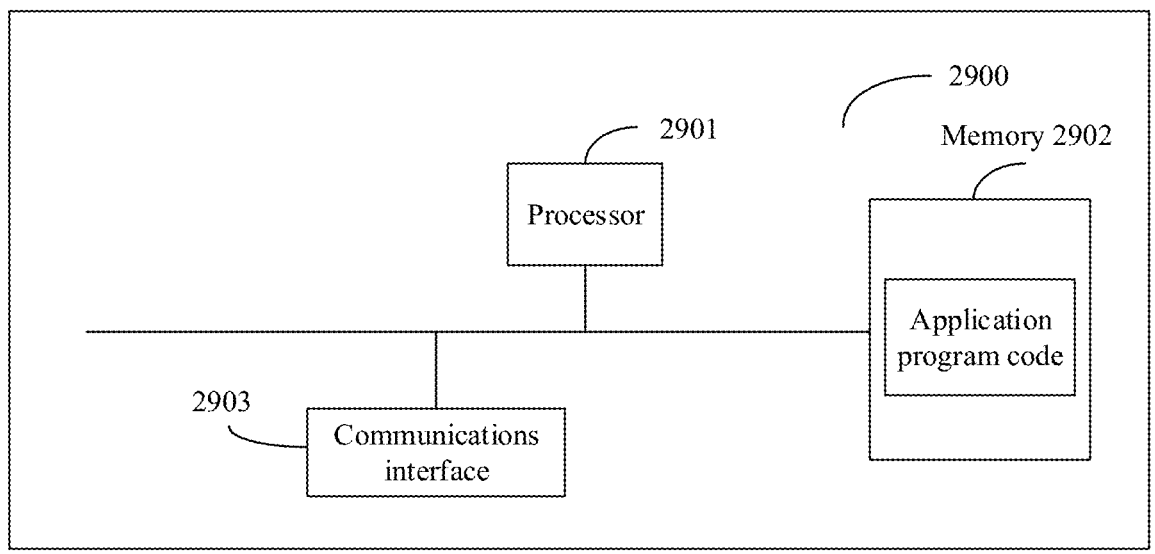
FIG. 29 is a schematic diagram of a structure of another training apparatus according to an embodiment.

The training apparatus 2900 shown in FIG. 29 may be implemented by using a structure in FIG. 29. The training apparatus 2900 includes at least one processor 2901, at least one memory 2902, and at least one communications interface 2903. The processor 2901, the memory 2902, and the communications interface 2903 are connected to and communicate with each other through a communications bus.

The processor 2901 may be a general-purpose central processing unit (CPU), a microprocessor, an application-specific integrated circuit (application-specific integrated circuit, ASIC), or one or more integrated circuits for controlling program execution for the foregoing solutions.

The communications interface 2903 is configured to communicate with another device or a communications network, such as the Ethernet, a radio access network (RAN), or a wireless local area network (Wireless Local Area Network, WLAN).

The memory 2902 may be but is not limited to a read-only memory (read-only memory, ROM) or another type of static storage device capable of storing static information and instructions, a random access memory (random access memory, RAM) or another type of dynamic storage device capable of storing information and instructions, an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and can be accessed by a computer. The memory may exist independently, and is connected to the processor through the bus. The memory may alternatively be integrated with the processor.

The memory 2902 is configured to store application code for executing the foregoing solutions, and the processor 2901 controls the execution. The processor 2901 is configured to execute the application code stored in the memory 2902.

The code stored in the memory 2902 may perform the foregoing provided method for training a parameter configuration model, for example:

obtaining operational state information of a network device, where the operational state information includes state information sets, parameter sets, and first performance indicator expected value sets of N areas covered by the network device, the state information sets include state information subsets in D dimensions of each of the N areas, the parameter sets include parameter subsets in the D dimensions of each of the N areas, and the first performance indicator expected value sets include first performance indicator expected value subsets in the D dimensions of each of the N areas; inputting state information subsets in the D dimensions and parameter subsets in the D dimensions of any area V of the N areas, and state information subsets in the D dimensions and parameter subsets in the D dimensions of a neighboring area in each of the D dimensions of the area V into an initial configuration model of the area V, and performing calculation to obtain second performance indicator expected value subsets; and adjusting parameters in the initial configuration model based on the first performance indicator expected value subsets and the second performance indicator expected value subsets to obtain a parameter configuration model of the area V, where the parameter configuration model of the area V includes a neighboring area information encoding model and performance prediction models in the D dimensions.

In a feasible embodiment, the parameter configuration apparatus shown in FIG. 26 and FIG. 28 may be considered as the network control center in FIG. 1a and FIG. 1b, or the network control center in FIG. 1a and FIG. 1b includes the parameter configuration apparatus shown in FIG. 26 or FIG. 28. Optionally, the parameter configuration apparatus shown in FIG. 26 and FIG. 28 may include the training apparatus shown in FIG. 27 or FIG. 29.

An embodiment further provides a computer storage medium, the computer storage medium may store a program, and when being executed, the program includes some or all steps of any network parameter configuration method or method for training a parameter configuration model in the foregoing method embodiments.

It should be noted that, for ease of description, the foregoing method embodiments are expressed as combinations of a series of actions. However, a person skilled in the art should know that the present invention is not limited to the described action sequence, because according to the present invention, some steps may be performed in other sequences or performed simultaneously. In addition, a person skilled in the art should also know that all embodiments described in the specification are example embodiments, and the related actions and modules are not necessarily mandatory to the present invention.

In the foregoing embodiments, descriptions of embodiments have respective focuses. For a part that is not described in detail in an embodiment, refer to related descriptions in other embodiments.

In several embodiments provided in this application, it should be understood that the disclosed apparatuses may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical form or other forms.

The units described as separate parts may or may not be physically separate, and parts displayed as units may or may not be physical units, and may be located in one position, or may be distributed on multiple network units. Some or all of the units may be selected depending on actual requirements to achieve the objectives of the solutions in the embodiments.

In addition, functional units in embodiments may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable memory. Based on such an understanding, the technical solutions, or the part contributing to the conventional technology, or all or some of the technical solutions may be implemented in a form of a software product. The computer software product is stored in a memory and includes several instructions for instructing a computer device (which may be a personal computer, a server, a network device, or the like) to perform all or some of the steps of the methods described in embodiments. The foregoing memory includes any medium that can store program code, for example, a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

The description of the embodiments is merely provided to facilitate understanding of the present disclosure. Variations and modifications to the disclosed embodiments that are apparent to persons of ordinary skill in the art are encompassed by the claims accompanying this disclosure. Therefore, the content of this specification shall not be construed as limiting the scope of the accompanying claims.

What is claimed is:

1. A method performed by a network parameter configuration apparatus with a processor, the method comprising:
obtaining operational state information of a network device, wherein the operational state information comprises a state information set of each of N areas covered by the network device and neighboring area information in D dimensions of the N areas, the state information set comprising state information subsets in the D dimensions, wherein N is an integer greater than 1, and D is an integer greater than 0;
performing negotiations to obtain target parameter subsets in the D dimensions of each of the N areas, wherein the negotiations are performed based on the state information subsets in the D dimensions of the N areas, the neighboring area information in the D dimensions of the N areas and a parameter configuration model, wherein the parameter configuration model comprises a performance prediction model and a neighboring area information encoding model; and
sending a configuration instruction to the network device to perform parameter configuration based on a target parameter set of each of the N areas that is carried in the configuration instruction, wherein the target parameter set of each area is obtained based on the target parameter subsets in the D dimensions of each area;
wherein the performing the negotiations comprises:
when performing a $k^{th}$ round of T negotiations, initializing a parameter set of each of the N areas to obtain an initial parameter set of each area, wherein the initial parameter set of each area comprises parameter subsets in the D dimensions of the area;
obtaining a neighboring area in each of the D dimensions of each of the N areas based on the neighboring area information in the D dimensions of the N areas, wherein k=1, 2, ..., T and T is an integer greater than 1; and performing W inter-group negotiations based on the state information subsets in the D dimensions and initial parameter subsets in the D dimensions of each of the N areas and neighboring areas thereof in the D dimensions to obtain a $k^{th}$ one of T reference parameter sets and a $k^{th}$ one of T performance indicator expected value sets, wherein W is an integer greater than 0; and determining the target parameter set from the T reference parameter sets based on the T performance indicator expected value sets, wherein the target parameter set comprises the target parameter subsets in the D dimensions of each of the N areas.

2. The method according to claim 1, wherein the performing negotiations based on the state information subsets in the D dimensions of each of the N areas comprises:

performing T rounds of negotiations based on the state information subsets in the D dimensions of each of the N areas to obtain T reference parameter sets and T performance indicator expected value sets, wherein the T reference parameter sets are in a one-to-one correspondence with the T performance indicator expected value sets, the T reference parameter sets comprise reference parameter subsets in the D dimensions of each of the N areas, the T performance indicator expected value sets comprise performance indicator expected value subsets in the D dimensions of each of the N areas, and T is an integer greater than 0; and determining the target parameter set from the T reference parameter sets based on the T performance indicator expected value sets, wherein the target parameter set comprises the target parameter subsets in the D dimensions of each of the N areas.

3. The method according to claim 2, wherein the determining the target parameter set from the T reference parameter sets based on the T performance indicator expected value sets comprises:

calculating a performance value of each of the T reference parameter sets based on the T performance indicator expected value sets, the performance value of each reference parameter set being a sum or a weighted sum of performance indicator expected value subsets in the D dimensions in a performance indicator expected value set corresponding to the reference parameter set; and determining, from the T reference parameter sets, a reference parameter set with a largest performance value as the target parameter set.

4. The method according to claim 1, wherein the performing W inter-group negotiations comprises the following steps:

S1: when performing a $g^{th}$ inter-group negotiation, marking each of the N areas as a non-negotiated area in the D dimensions, wherein g=1, 2, ..., W;

S2: selecting, from non-negotiated areas, an area j marked as a non-negotiated area in any dimension A, performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A, marking the area j as a negotiated area in the dimension A, and marking an area that is marked as a non-negotiated area in the dimension A among neighboring areas of the area j in the dimension A, as a negotiated area in the dimension A, wherein the dimension A is any one of the D dimensions, and when g is equal to 1, the first parameter subset in the dimension A of the area j is an initial parameter subset in the dimension A of the area j, and among the neighboring areas of the area j in the dimension A, a first parameter subset in the dimension A of a non-negotiated area is an initial parameter subset in the dimension A of the area, and a first parameter subset in the dimension A of a negotiated area is obtained based on an initial parameter subset in the dimension A of the negotiated area; or when g is greater than 1, the first parameter subset in the dimension A of the area j is a second parameter subset in the dimension A of the area j after a $(g-1)^{th}$ inter-group negotiation is performed, and among the neighboring areas of the area j in the dimension A, a first parameter subset in the dimension A of a non-negotiated area is a second parameter subset in the dimension A of the area, and a first parameter subset in the dimension A of a negotiated area is obtained based on a second parameter subset of the area that is obtained after the $(g-1)^{th}$ inter-group negotiation is performed; and S3: repeating step S2 until each of the N areas is marked as a negotiated area in the D dimensions, wherein the $k^{th}$ one of the T reference parameter sets comprises a reference parameter subset in each of the D dimensions of the area j, and the $k^{th}$ one of the T performance indicator expected value sets comprises performance indicator expected value subsets in the D dimensions, obtained based on reference parameter subsets in the D dimensions of the area j and neighboring areas thereof in the D dimensions and state information subsets in the D dimensions of the area j and the neighboring areas thereof in the D dimensions; and reference parameter subsets in the dimension A of the area j and the neighboring area thereof in the dimension A are respectively second parameter subsets in the dimension A of the area j and the neighboring area thereof in the dimension A after a $W^{th}$ inter-group negotiation is performed.

5. The method according to claim 4, wherein when an intersection set exists between a parameter subset in the dimension A and a parameter subset in another one of the D dimensions, when g=1, a value of a parameter P in a first parameter subset in the dimension A of a non-negotiated area in the dimension A is a value of the parameter P in a second parameter subset in a dimension B, and a value of a parameter other than the parameter P in the first parameter subset in the dimension A is a value in an initial parameter subset in the dimension A, wherein the dimension B is a dimension negotiated before the dimension A, and the parameter P is any parameter in the intersection set between the parameter subset in the dimension A and the parameter subset in the dimension B.

6. The method according to claim 4, wherein performing step S2 intra-group negotiations comprises:

performing a $q^{th}$ intra-group negotiation and obtaining a third parameter subset $a_{Aqj}$ in the dimension A from a preconfigured parameter set based on a search algorithm to maximize a preset performance indicator expected value of the area j, wherein the preset performance indicator expected value of the area j is obtained based on a performance indicator expected value subset in the dimension A of the area j, and the performance indicator expected value subset in the dimension A of the area j is obtained based on the state information subset in the dimension A and the third parameter subset $a_{Aqj}$ in the dimension A of the area j, the state information subset in the dimension A and a third parameter subset in the dimension A of the neighboring area of the area j in the dimension A, and a parameter configuration model of the area j;

obtaining, based on the search algorithm, a third configuration parameter $a_{Aqn}$ in the dimension A from the preconfigured parameter set, so that a preset performance indicator expected value of an area n is maximized, wherein the preset performance indicator expected value of the area n is obtained based on a performance indicator expected value in the dimension A of the area n, and the performance indicator expected value in the dimension A of the area n is obtained based on a state information subset in the dimension A and a third parameter subset $a_{Agn}$ in the dimension A of the area n, a state information subset in the dimension A and a third parameter subset in the dimension A of a neighboring area of the area n in the dimension A, and a parameter configuration model of the area n, wherein the area n is any one of the neighboring areas of the area j in the dimension A, and the third parameter subset in the dimension A of the neighboring area of the area n in the dimension A comprises the third parameter subset $a_{Aqj}$ in the dimension A of the area j; and when q=1, a third parameter subset $a_{A(q-1)n}$ in the dimension A of the area n is a first parameter subset in the dimension A of the area n; or when q=S, the second parameter subset in the dimension A of the area j is the third parameter subset $a_{Aqj}$ in the dimension A of the area j, and a second parameter subset in the dimension A of the area n is the third parameter subset $a_{Aqn}$ in the dimension A of the area n.

7. The method according to claim 6, wherein a preset performance indicator expected value of an area V is:
  obtained based on a performance indicator expected value subset in the dimension A of the area V; or
  obtained based on a performance indicator expected value subset in the dimension A of the area V and a performance indicator expected value subset in the dimension A of a neighboring area of the area V in the dimension A; or
  obtained based on performance indicator expected value subsets in the D dimensions of the area V; or
  obtained based on performance indicator expected value subsets in the D dimensions of the area V and performance indicator expected value subsets in the D dimensions of neighboring areas of the area V.

8. The method according to claim 6, wherein when D=1, the D dimensions comprise only a dimension C, dimension C being a horizontal dimension or a vertical dimension; and a parameter configuration model of any area V of the N areas comprises a neighboring area information encoding model in the dimension C and a performance prediction model in the dimension C, parameter sets of the area V and a neighboring area thereof comprise parameter subsets in the dimension C, and state information sets of the area V and the neighboring area thereof comprise state information subsets in the dimension C;
  input data of the neighboring area information encoding model of the area V comprises the state information subset in the dimension C and the parameter subset in the dimension C of the neighboring area of the area V in the dimension C, or the state information subsets in the dimension C and the parameter subsets in the dimension C of the area V and the neighboring area thereof in the dimension C, and output data of the neighboring area information encoding model of the area V is an encoding result in the dimension C; and
  input data of the performance prediction model in the dimension C of the area V comprises the encoding result in the dimension C, and the state information subset in the dimension C and the parameter subset in the dimension C of the area V, and output data of the performance prediction model in the dimension C of the area V is a performance indicator expected value subset in the dimension C of the area V.

9. The method according to claim 6, wherein when the D dimensions comprise a local area dimension and a horizontal dimension, a parameter configuration model of any area V of the N areas comprises a neighboring area information encoding model, a local area performance prediction model and a horizontal performance prediction model, parameter sets of the area V and a neighboring area thereof comprise local area parameter subsets and horizontal parameter subsets, and state information sets of the area V and the neighboring area thereof comprise local area state information subsets and horizontal state information subsets;
  input data of the neighboring area information encoding model of the area V comprises the state information set and the parameter set of the neighboring area of the area V, or the state information sets and the parameter sets of the area V and the neighboring area thereof, and output data of the neighboring area information encoding model of the area V is an encoding result;
  input data of the local area performance prediction model of the area V comprises the encoding result, and the local area state information subset and the local area parameter subset of the area V, and output data of the local area performance prediction model of the area V is a local area performance indicator expected value subset of the area V; and
  input data of the horizontal performance prediction model of the area V comprises the encoding result, and the horizontal state information subset and the horizontal parameter subset of the area V, and output data of the horizontal performance prediction model of the area V is a horizontal performance indicator expected value subset of the area V.

10. The method according to claim 6, wherein when the D dimensions comprise a local area dimension and a vertical dimension, a parameter configuration model of any area V of the N areas comprises a neighboring area information encoding model, a local area performance prediction model and a vertical performance prediction model, parameter sets of the area V and a neighboring area thereof comprise local area parameter subsets and vertical parameter subsets, and state information sets of the area V and the neighboring area thereof comprise local area state information subsets and vertical state information subsets;
  input data of the neighboring area information encoding model of the area V comprises the state information set and the parameter set of the neighboring area of the area V, or the state information sets and the parameter sets of the area V and the neighboring area thereof, and output data of the neighboring area information encoding model of the area V is an encoding result;
  input data of the local area performance prediction model of the area V comprises the encoding result, and the local area state information subset and the local area parameter subset of the area V, and output data of the local area performance prediction model of the area V is a local area performance indicator expected value subset of the area V; and input data of the vertical performance prediction model of the area V comprises the encoding result, and the vertical state information subset and the vertical parameter subset of the area V, and output data of the vertical performance prediction model of the area V is a vertical performance indicator expected value subset of the area V.

11. The method according to claim 6, wherein if when D dimensions comprise a horizontal dimension and a vertical dimension, a parameter configuration model of any area V of the N areas comprises a neighboring area information encoding model, a horizontal performance prediction model and a vertical performance prediction model, parameter sets of the area V and a neighboring area thereof comprise horizontal parameter subsets and vertical parameter subsets, and state information sets of the area V and the neighboring area thereof comprise horizontal state information subsets and vertical state information subsets;

input data of the neighboring area information encoding model of the area V comprises the state information set and the parameter set of the neighboring area of the area V, or the state information sets and the parameter sets of the area V and the neighboring area thereof, and output data of the neighboring area information encoding model of the area V is an encoding result;

input data of the horizontal performance prediction model of the area V comprises the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V comprises the encoding result, and the vertical state information subset and the vertical parameter subset of the area V, and output data of the vertical performance prediction model of the area V is a vertical performance indicator expected value subset of the area V.

12. The method according to claim 6, wherein when the D dimensions comprise a local area dimension, a horizontal dimension and a vertical dimension, a parameter configuration model of any area V of the N areas comprises a neighboring area information encoding model, a local area performance prediction model, a horizontal performance prediction model and a vertical performance prediction model, parameter sets of the area V and a neighboring area thereof comprise local area parameter subsets, horizontal parameter subsets, and vertical parameter subsets, and state information sets of the area V and the neighboring area thereof comprise local area state information subsets, horizontal state information subsets, and vertical state information subsets;

input data of the neighboring area information encoding model of the area V comprises the state information set and the parameter set of the neighboring area of the area V, or the state information sets and the parameter sets of the area V and the neighboring area thereof, and output data of the neighboring area information encoding model of the area V is an encoding result;

input data of the local area performance prediction model of the area V comprises the encoding result, and the local area state information subset and the local area parameter subset of the area V, and output data of the local area performance prediction model of the area V is a local area performance indicator expected value subset of the area V;

input data of the horizontal performance prediction model of the area V comprises the encoding result, and the horizontal state information subset and the horizontal parameter subset of the area V, and output data of the horizontal performance prediction model of the area V is a horizontal performance indicator expected value subset of the area V; and input data of the vertical performance prediction model of the area V comprises the encoding result, and the vertical state information subset and the vertical parameter subset of the area V, and output data of the vertical performance prediction model of the area V is a vertical performance indicator expected value subset of the area V.

13. The method according to claim 1, wherein before the performing negotiations, the method further comprises:
obtaining the parameter configuration model of each of the N areas from a training device.

14. The method according to claim 1, wherein the network device is a base station of a wireless cellular network, and the area is a cell covered by the base station.

15. The method according to claim 1, wherein the network device is a Wi-Fi device of a Wi-Fi network, and the area is an area covered by the Wi-Fi device.

16. The method according to claim 15, wherein an area V of the N areas is covered by signals of D frequency bands, the D dimensions being in a one-to-one correspondence with the D frequency bands, wherein D is a positive integer.

17. A parameter configuration apparatus, comprising one or more processors and a memory, the memory being configured to store program instructions that, when executed by the one or more processors, cause the parameter configuration apparatus to:

obtain operational state information of a network device, the operational state information comprising a state information set of each of N areas covered by the network device and neighboring area information in D dimensions of the N areas, the state information set comprising state information subsets in the D dimensions, N being an integer greater than 1, and D being an integer greater than 0;

perform negotiations to obtain target parameter subsets in the D dimensions of each of the N areas, wherein the negotiations are performed based on the state information subsets in the D dimensions of the N areas, the neighboring area information in D dimensions of the N areas and a parameter configuration model, wherein the parameter configuration model comprises a performance prediction model and a neighboring area information encoding model; and send a configuration instruction to the network device, to instruct the network device to perform parameter configuration based on a target parameter set of each of the N areas that is carried in the configuration instruction, the target parameter set of each area being obtained based on the target parameter subsets in the D dimensions of each area;

wherein the performing the negotiations comprises:
when performing a $k^{th}$ round of T negotiations, initializing a parameter set of each of the N areas to obtain an initial parameter set of each area, wherein the initial parameter set of each area comprises parameter subsets in the D dimensions of the area;

obtaining a neighboring area in each of the D dimensions of each of the N areas based on the neighboring area information in the D dimensions of the N areas, wherein k=1, 2, ..., T and T is an integer greater than 1;

performing W inter-group negotiations based on the state information subsets in the D dimensions and initial parameter subsets in the D dimensions of each of the N areas and neighboring areas thereof in the D dimensions to obtain a $k^{th}$ one of T reference parameter sets and a $k^{th}$ one of T performance indicator expected value sets, wherein W is an integer greater than 0; and determining the target parameter set from the T reference parameter sets based on the T performance indicator expected value sets, wherein the target parameter set comprises the target parameter subsets in the D dimensions of each of the N areas.

18. The parameter configuration apparatus according to claim 17, wherein the performing W inter-group negotiations comprises the following steps:

S1: when performing a $g^{th}$ inter-group negotiation, marking each of the N areas as a non-negotiated area in the D dimensions, wherein g=1, 2, ..., W;

S2: selecting, from non-negotiated areas, an area j marked as a non-negotiated area in any dimension A, performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A, marking the area j as a negotiated area in the dimension A, and marking an area that is marked as a non-negotiated area in the dimension A among neighboring areas of the area j in the dimension A, as a negotiated area in the dimension A, wherein the dimension A is any one of the D dimensions, and when g is equal to 1, the first parameter subset in the dimension A of the area j is an initial parameter subset in the dimension A of the area j, and among the neighboring areas of the area j in the dimension A, a first parameter subset in the dimension A of a non-negotiated area is an initial parameter subset in the dimension A of the area, and a first parameter subset in the dimension A of a negotiated area is obtained based on an initial parameter subset in the dimension A of the negotiated area; or when g is greater than 1, the first parameter subset in the dimension A of the area j is a second parameter subset in the dimension A of the area j after a $(g-1)^{th}$ inter-group negotiation is performed, and among the neighboring areas of the area j in the dimension A, a first parameter subset in the dimension A of a non-negotiated area is a second parameter subset in the dimension A of the area, and a first parameter subset in the dimension A of a negotiated area is obtained based on a second parameter subset of the area that is obtained after the $(g-1)^{th}$ inter-group negotiation is performed; and S3: repeating step S2 until each of the N areas is marked as a negotiated area in the D dimensions, wherein the $k^{th}$ one of the T reference parameter sets comprises a reference parameter subset in each of the D dimensions of the area j, and the $k^{th}$ one of the T performance indicator expected value sets comprises performance indicator expected value subsets in the D dimensions, obtained based on reference parameter subsets in the D dimensions of the area j and neighboring areas thereof in the D dimensions and state information subsets in the D dimensions of the area j and the neighboring areas thereof in the D dimensions; and reference parameter subsets in the dimension A of the area j and the neighboring area thereof in the dimension A are respectively second parameter subsets in the dimension A of the area j and the neighboring area thereof in the dimension A after a $W^{th}$ inter-group negotiation is performed.

19. A non-transitory computer-readable storage medium storing program code configured to, when executed by one or more processors of a device, cause the device to perform operations comprising:

obtaining operational state information of a network device, the operational state information comprising a state information set of each of N areas covered by the network device and neighboring area information in D dimensions of the N areas, the state information set comprises state information subsets in D dimensions, N being an integer greater than 1, and D being an integer greater than 0;

performing negotiations to obtain target parameter subsets in the D dimensions of each of the N areas, wherein the negotiations are performed based on the state information subsets in the D dimensions of the N areas, the neighboring area information in D dimensions of the N areas and a parameter configuration model, wherein the parameter configuration model comprises a performance prediction model and a neighboring area information encoding model; and sending a configuration instruction, to the network device to instruct the network device to perform parameter configuration based on a target parameter set of each of the N areas that is carried in the configuration instruction, the target parameter set of each area being obtained based on the target parameter subsets in the D dimensions of each area;

wherein the performing the negotiations comprises:

when performing a $k^{th}$ round of T negotiations, initializing a parameter set of each of the N areas to obtain an initial parameter set of each area, wherein the initial parameter set of each area comprises parameter subsets in the D dimensions of the area;

obtaining a neighboring area in each of the D dimensions of each of the N areas based on the neighboring area information in the D dimensions of the N areas, wherein k=1, 2, ..., T and T is an integer greater than 1;

performing W inter-group negotiations based on the state information subsets in the D dimensions and initial parameter subsets in the D dimensions of each of the N areas and neighboring areas thereof in the D dimensions to obtain a $k^{th}$ one of T reference parameter sets and a $k^{th}$ one of T performance indicator expected value sets, wherein W is an integer greater than 0; and determining the target parameter set from the T reference parameter sets based on the T performance indicator expected value sets, wherein the target parameter set comprises the target parameter subsets in the D dimensions of each of the N areas.

20. The non-transitory computer-readable storage medium according to claim 19, wherein the performing W inter-group negotiations comprises the following steps:

S1: when performing a $g^{th}$ inter-group negotiation, marking each of the N areas as a non-negotiated area in the D dimensions, wherein g=1, 2, ..., W;

S2: selecting, from non-negotiated areas, an area j marked as a non-negotiated area in any dimension A, performing S intra-group negotiations based on a state information subset in the dimension A and a first parameter subset in the dimension A of the area j, and a state information subset in the dimension A and a first parameter subset in the dimension A of a neighboring area of the area j in the dimension A to obtain second parameter subsets in the dimension A of the area j and the neighboring area thereof in the dimension A, marking the area j as a negotiated area in the dimension A, and marking an area that is marked as a non-negotiated area in the dimension A among neighboring areas of the area j in the dimension A, as a negotiated area in the dimension A, wherein the dimension A is any one of the D dimensions, and when g is equal to 1, the first parameter subset in the dimension A of the area j is an initial parameter subset in the dimension A of the area j, and among the neighboring areas of the area j in the dimension A, a first parameter subset in the dimension A of a non-negotiated area is an initial parameter subset in the dimension A of the area, and a first parameter subset in the dimension A of a negotiated area is obtained based on an initial parameter subset in the dimension A of the negotiated area; or when g is greater than 1, the first parameter subset in the dimension A of the area j is a second parameter subset in the dimension A of the area j after a $(g-1)^{th}$ inter-group negotiation is performed, and among the neighboring areas of the area j in the dimension A, a first parameter subset in the dimension A of a non-negotiated area is a second parameter subset in the dimension A of the area, and a first parameter subset in the dimension A of a negotiated area is obtained based on a second parameter subset of the area that is obtained after the $(g-1)^{th}$ inter-group negotiation is performed; and S3: repeating step S2 until each of the N areas is marked as a negotiated area in the D dimensions, wherein the $k^{th}$ one of the T reference parameter sets comprises a reference parameter subset in each of the D dimensions of the area j, and the $k^{th}$ one of the T performance indicator expected value sets comprises performance indicator expected value subsets in the D dimensions, obtained based on reference parameter subsets in the D dimensions of the area j and neighboring areas thereof in the D dimensions and state information subsets in the D dimensions of the area j and the neighboring areas thereof in the D dimensions; and reference parameter subsets in the dimension A of the area j and the neighboring area thereof in the dimension A are respectively second parameter subsets in the dimension A of the area j and the neighboring area thereof in the dimension A after a $W^{th}$ inter-group negotiation is performed.

* * * * *